(12) United States Patent
Matsumura et al.

(10) Patent No.: US 6,770,010 B2
(45) Date of Patent: Aug. 3, 2004

(54) METHOD OF CONTROLLING A VEHICLE, APPARATUS FOR CONTROLLING THE SAME, TRANSMISSION AND APPARATUS FOR CONTROLLING THE SAME

(75) Inventors: Tetsuo Matsumura, Hitachinaka (JP); Naoyuki Ozaki, Hitachinaka (JP); Kinya Fujimoto, Hitachinaka (JP); Hiroshi Kuroiwa, Hitachi (JP); Takashi Okada, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 56 days.

(21) Appl. No.: 10/303,811

(22) Filed: Nov. 26, 2002

(65) Prior Publication Data

US 2003/0100404 A1 May 29, 2003

(30) Foreign Application Priority Data

Nov. 29, 2001 (JP) ........................ 2001-364951

(51) Int. Cl.$^7$ ................. F16H 59/30; B60K 41/02; G06F 17/00; G06F 19/00; G06F 7/00
(52) U.S. Cl. ............... 477/124; 477/174; 701/66; 701/67
(58) Field of Search ............... 477/124, 174, 477/79, 86; 701/53, 66, 67

(56) References Cited

U.S. PATENT DOCUMENTS 4,324,153 A * 4/1982 Sugimoto et al. ............ 477/70
6,502,474 B2 * 1/2003 Sakamoto et al. ........... 74/325

FOREIGN PATENT DOCUMENTS

JP 2703169 10/1997

OTHER PUBLICATIONS

US 20030100985A1 patent application publication filed Nov. 26, 2002.*
US 20020005077A1 patent application publication filed Feb. 26, 2001.*

* cited by examiner

Primary Examiner—Tisha D Lewis
(74) Attorney, Agent, or Firm—Crowell & Moring LLP

(57) ABSTRACT

Power train control unit 100 controls friction clutch 203 when shifting from one cogwheel row to the other cogwheel row, sets the target synchronous rotation speed based on the output rotation speed of a transmission and parameters indicative of the state of engine 1 or the transmission, and sets the command value to the friction clutch so that the input rotation speed can be synchronized with the target synchronous rotation speed. Control unit 100 sets the target shifting required time based on parameters indicative of the state of engine 1 or the transmission, and corrects the command value to the friction clutch so that the required shift time can approach the above target shift required time.

29 Claims, 44 Drawing Sheets

|  | MESH TYPE CLUTCH 1 | | | MESH TYPE CLUTCH 2 | | | MESH TYPE CLUTCH 3 | | |
|---|---|---|---|---|---|---|---|---|---|
|  | 1 | N | 2 | 3 | N | 4 | 5 | N | R |
| FIRST SPEED STAGE P1 | ○ | | | | | | | ○ | |
| SECOND SPEED STAGE P2 | | | ○ | | | | | ○ | |
| THIRD SPEED STAGE P3 | | ○ | | ○ | | | | ○ | |
| FOURTH SPEED STAGE P4 | | ○ | | | | ○ | | ○ | |
| FIFTH SPEED STAGE P5 | | ○ | | | | | ○ | | |
| BACKWARD STAGE PR | | ○ | | | | | | | ○ |

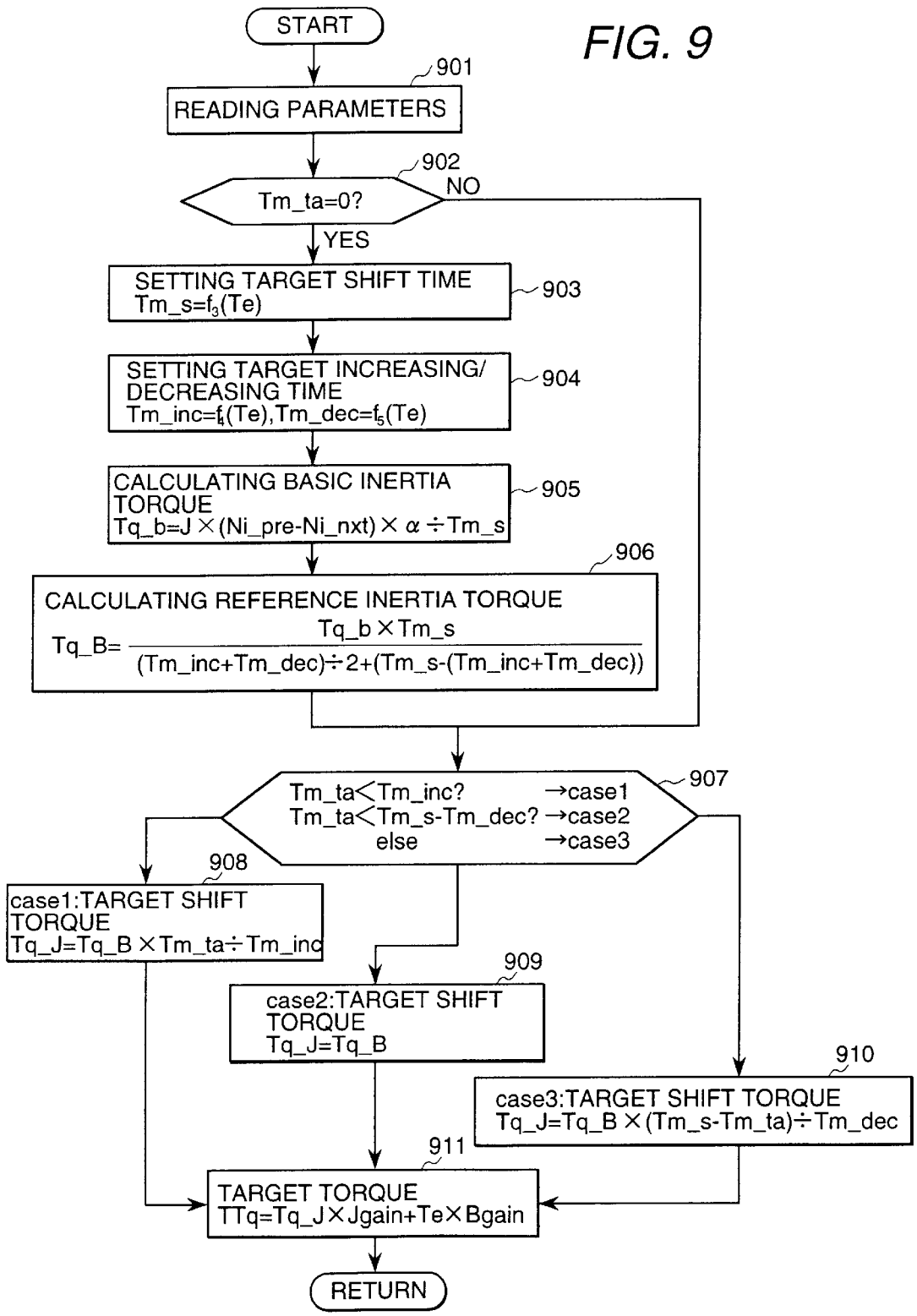

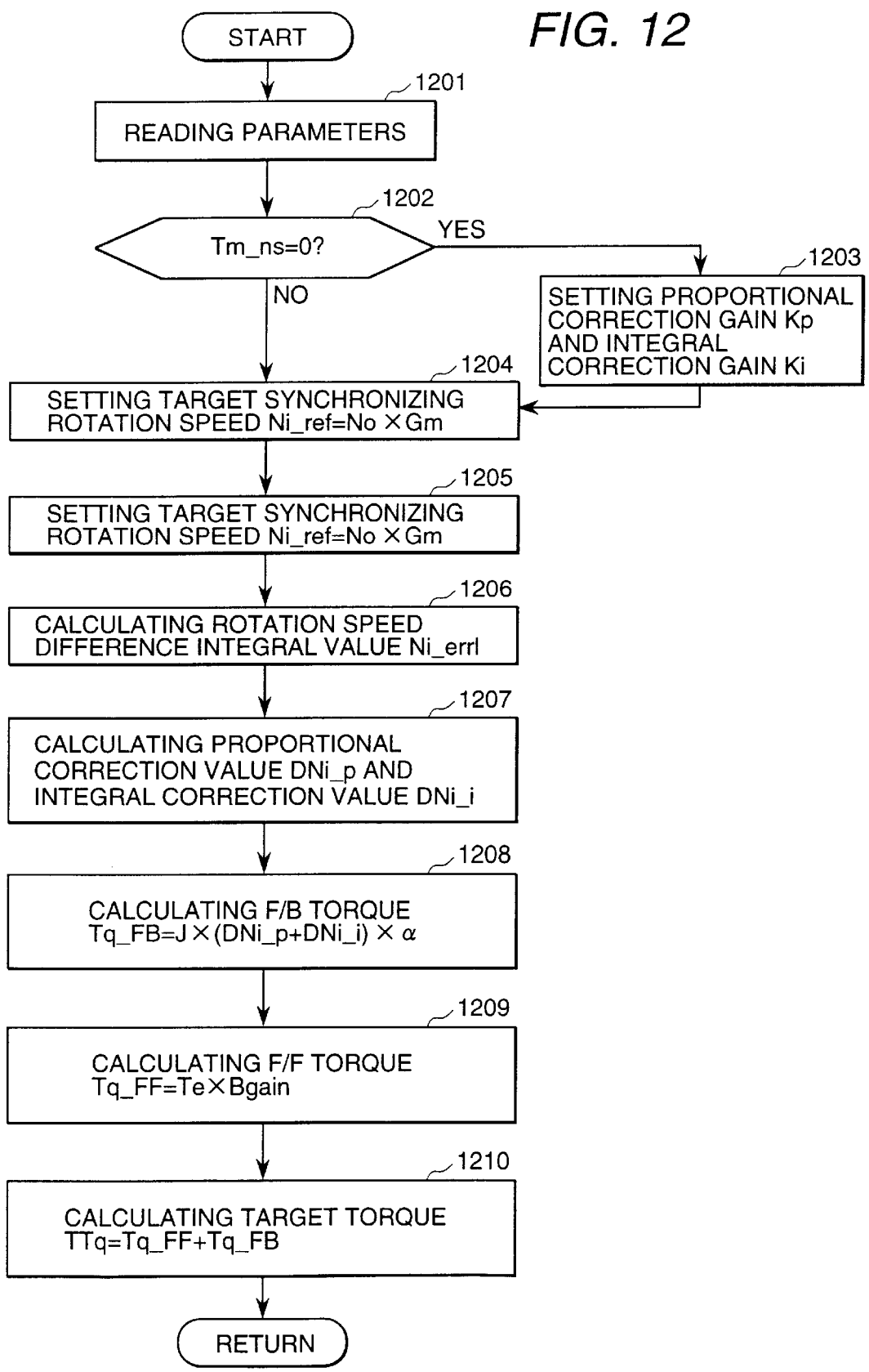

METHOD OF CONTROLLING A VEHICLE, APPARATUS FOR CONTROLLING THE SAME, TRANSMISSION AND APPARATUS FOR CONTROLLING THE SAME

BACKGROUND OF THE INVENTION

The present invention relates to a method of controlling a vehicle, a vehicle control apparatus, a transmission, and an apparatus for controlling a transmission, and particularly to a method of controlling a vehicle, a vehicle control apparatus, a transmission, and a transmission control apparatus, which are suitable to control the automatic transmission in the vehicle.

A vehicle of a manual transmission type is excellent in fuel economy compared to a vehicle mounting a transmission using a torque converter. However, coordination of the clutch and the accelerator at starting is difficult to be operated. If the coordination of the clutch and the accelerator at starting is not operated well, a large shock is generated at engaging the clutch, or rotation speed of the engine may be rapidly increased when the clutch pressure is insufficient, that is, what is called as a blowing-up phenomenon occurs. Further, when the clutch is suddenly engaged while rotation speed of the engine is insufficient, or when the vehicle is started to run on an uphill, the engine may be stopped, that is, what is called as uphill, the engine may be stopped, that is, what is called as engine stopping occurs.

In order to solve these problems, a system automatizing clutching and shifting using the mechanism of a manual transmission, that is, an automatized MT (an automatized manual transmission) has been developed. However, a driver sometimes feels incongruity because suspension of driving torque occurs by disengaging and engaging of the clutch in the control at shifting gear in the conventional automatized MT (the automatized manual transmission).

A system disclosed in, for example, U.S. Pat. No. 2,703,169 is known. In order to avoid the interruption of torque during shifting in the system, an assist clutch or a friction clutch of one form of a friction transfer means is added to the conventional automatized MT (the automatized manual transmission) to perform rotation speed synchronization and torque transmission for shifting gear by controlling the assist clutch when shifting is performed.

It is necessary to control the above assist clutch to synchronize the rotation speed of an input shaft of the transmission with the rotation speed which corresponds to the next gear position by the above assist clutch in such a vehicle. However, it was revealed that the time required to synchronize these rotation speeds gets longer in consequence of the change in characteristics due to the machine difference between assist clutches or the deterioration with age, the change in characteristics due to the replacement of the assist clutch or the changing of operating fluid, or the machine difference between engines or the deterioration with age, and shift quality is deteriorated by the sluggish feeling of shifting. Moreover, the striking-feeling occurs if the time required to synchronize the rotation speeds is occasionally shortened, and shift quality decreases.

SUMMARY OF THE INVENTION

A first object of the present invention is to provide a vehicle control method, a vehicle control apparatus, a transmission, and a transmission control apparatus, which can improve the shift quality by preventing the time required to synchronize the rotation speeds from becoming long or short even if the machine difference between assist clutches or the deterioration with age occurs, and improve the shift quality by suppressing the time required to synchronize the rotation speeds from becoming long or short even if the change in characteristics due to the replacement of a clutch or the changing of operating fluid.

A second object of the present invention is to provide a vehicle control method, a vehicle control apparatus, a transmission, and a transmission control apparatus, which can prevent the decrease of the shift quality without making the time required to synchronize the rotation speeds long even if the machine difference between engines or the deterioration with age occurs.

(1) The present invention adopts the following configuration in order to obtain the above first object.

A method of controlling a vehicle including a driving force source for generating the driving force, a cogwheel type transmission provided with a plurality of cogwheel rows, and a plurality of torque transfer means provided between an input shaft and an output shaft of said transmission, at least one above torque transfer means being the friction transfer means, comprising the Steps of controlling said friction transfer means when shifting from one cogwheel row to the other cogwheel row, setting a target synchronous rotation speed based on the output rotation speed of said transmission and at least one of parameters indicative of the state of said driving force source or said transmission, and setting an command value to said friction transfer means so that the input rotation speed of said transmission may be synchronized with said target synchronous rotation speed, further comprising the Steps of:

setting the target required shift time based on at least one of parameters indicative of the state of said driving force source or said transmission, and correcting the command value to said friction transfer means so that the required shift time from the shifting start to the shifting end may approach at said target required shift time.

Thereby, it is possible to prevent the time required to synchronize the rotation speeds from becoming long or short even if the machine difference between assist clutches or the deterioration with age occurs, and improve the shift quality by suppressing the time required to synchronize the rotation speeds from becoming long or short even if the change in characteristics due to the replacement of a clutch or the changing of operating fluid.

(2) Preferably, in the above (1), the command value to said friction transfer means is corrected so that the transfer torque of said friction transfer means may be increased when said input rotation speed is larger than said target synchronous rotation speed.

(3) Preferably, in the above (1), the command value to said friction transfer means is corrected so that the transfer torque of said friction transfer means may be decreased when said input rotation speed is smaller than said target synchronous rotation speed.

(4) Preferably, in the above (1), the command value to said friction transfer means is corrected so that said required shift time may approach at said target required shift time whenever shifting is repeated.

(5) The present invention adopts the following configuration in order to obtain the above second object.

A method of controlling a vehicle including a driving force source for generating the driving force, a cogwheel type transmission provided with a plurality of cogwheel rows, and a plurality of torque transfer means provided between an input shaft and an output shaft of said transmission, at least one above torque transfer means being the friction transfer means, comprising the Steps of controlling said friction transfer means when shifting from one cogwheel row to the other cogwheel row, setting a target synchronous rotation speed based on the output rotation speed of said transmission and at least one of parameters indicative of the state of said driving force source or said transmission, and setting an command value to said friction transfer means so that the input rotation speed of said transmission may be synchronized with said target synchronous rotation speed, further comprising the Steps of:

correcting the command value to said friction transfer means by calculating the correction of the command value to said friction transfer means based on the difference between said target synchronous rotation speed and said input rotation speed.

Thereby, it is possible to prevent the decrease of the shift quality without making the time required to synchronize the rotation speeds long even if the machine difference between engines or the deterioration with age occurs.

(6) The present invention adopts the following configuration in order to obtain the above second object.

A method of controlling a vehicle including a driving force source for generating the driving force, a cogwheel type transmission provided with a plurality of cogwheel rows, and a plurality of torque transfer means provided between an input shaft and an output shaft of said transmission, at least one above torque transfer means being the friction transfer means, comprising the Steps of controlling said friction transfer means when shifting from one cogwheel row to the other cogwheel row, setting a feed forward command value to said friction transfer means based on at least one of parameters indicative of the state of said driving force source or said transmission, setting a target synchronous rotation speed based on at least one of parameters indicative of the state of said driving force source or said transmission, setting a feedback command value to said friction transfer means based on the difference between said target synchronous rotation speed and said input rotation speed of the transmission, controlling the input rotation speed of said transmission and the output shaft torque of said transmission under shifting by setting the command value to said friction transfer means based on said feedforward command value and said feedback command value, further comprising the Steps of:

correcting the command value to said friction transfer means by calculating the correction of the command value to said friction transfer means based on the difference between said feedforward command value and the command value to said friction transfer means.

Thereby, it is possible to prevent the decrease of the shift quality without making the time required to synchronize the rotation speeds long even if the machine difference between engines or the deterioration with age occurs.

(7) Preferably, in the above (5) or (6), the command value to said friction transfer means is corrected by calculating the correction of said command value when the synchronous time required until said input rotation speed is synchronized with said target synchronous rotation speed becomes larger than the predetermined time.

(8) Preferably, in the above (5) or (6), the command value to said friction transfer means is corrected by calculating the correction of said command value when the amount of the change per unit time in said input rotation speed is within the fixed range.

(9) Preferably, in the above (5) or (6), the command value to said friction transfer means is corrected by calculating the correction of said command value when the amount of the change per unit time in said output rotation speed is within the fixed range.

(10) Preferably, in the above (5) or (6), the command value to said friction transfer means is corrected by calculating the correction of said command value when the amount of the change per unit time in said input torque is within the fixed range.

(11) Preferably, in the above (5) or (6), the command value to said friction transfer means is corrected by calculating the correction of said command value when the amount of the change per unit time in the opening of an accelerator pedal is within the fixed range.

(12) Preferably, in the above (5) or (6), the command value to said friction transfer means is corrected so that the required shift time may approach at said target required shift time whenever shifting is repeated.

(13) The present invention adopts the following configuration in order to obtain the above first object.

A method of controlling a vehicle including a driving force source for generating the driving force, a cogwheel type transmission provided with a plurality of cogwheel rows, and a plurality of torque transfer means provided between an input shaft and an output shaft of said transmission, at least one above torque transfer means being the friction transfer means, comprising the Steps of controlling said friction transfer means when shifting from one cogwheel row to the other cogwheel row, setting a feed forward command value to said friction transfer means based on at least one of parameters indicative of the state of said driving force source or said transmission, setting a target synchronous rotation speed based on at least one of parameters indicative of the state of said driving force source or said transmission, setting a feedback command value to said friction transfer means based on the difference between said target synchronous rotation speed and said input rotation speed of the transmission, controlling the input rotation speed of said transmission and the output shaft torque of said transmission under shifting by setting the command value to said friction transfer means based on said feedforward command value and said feedback command value, further comprising the Steps of:

correcting the command value to said friction transfer means by calculating the correction of the command value to said friction transfer means based on the difference between the integral value of said feedforward command value and the integral value of the command value to said friction transfer means.

Thereby, it is possible to prevent the time required to synchronize the rotation speeds from becoming long or short even if the machine difference between assist clutches or the deterioration with age occurs, and improve the shift quality by suppressing the time required to synchronize the rotation speeds from becoming long or short even if the change in characteristics due to the replacement of a clutch or the changing of operating fluid.

(14) The present invention adopts the following configuration in order to obtain the above first object.

A method of controlling a vehicle including a driving force source for generating the driving force, a cogwheel type transmission provided with a plurality of cogwheel rows, and a plurality of torque transfer means provided between an input shaft and an output shaft of said transmission, at least one above torque transfer means being the friction transfer means, comprising the Steps of controlling said friction transfer means when shifting from one cogwheel row to the other cogwheel row, setting a target input rotation speed based on at least one of parameters indicative of the state of said driving force source or said transmission, setting a feed forward command value to said friction transfer means based on at least one of parameters indicative of the state of said driving force source or said transmission, setting a target synchronous rotation speed based on at least one of parameters indicative of the state of said driving force source or said transmission, setting a feedback command value to said friction transfer means based on the difference between said target synchronous rotation speed and said input rotation speed of the transmission, controlling the input rotation speed of said transmission and the output shaft torque of said transmission under shifting by setting the command value to said friction transfer means based on said feedforward command value and said feedback command value, further comprising the Steps of:

correcting the command value to said friction transfer means by calculating the correction of the command value to said friction transfer means based on the difference between the integral value of said feedforward command value and the integral value of the command value to said friction transfer means.

Thereby, it is possible to prevent the time required to synchronize the rotation speeds from becoming long or short even if the machine difference between assist clutches or the deterioration with age occurs, and improve the shift quality by suppressing the time required to synchronize the rotation speeds from becoming long or short even if the change in characteristics due to the replacement of a clutch or the changing of operating fluid.

(15) Preferably, in the above (13) or (14), the command value to said friction transfer means is corrected by calculating the correction of said command value when the amount of the change per unit time in said output rotation speed is within the fixed range.

(16) Preferably, in the above (13) or (14), the command value to said friction transfer means is corrected by calculating the correction of said command value when the amount of the change per unit time in said input torque is within the fixed range.

(17) Preferably, in the above (13) or (14), the command value to said friction transfer means is corrected by calculating the correction of said command value when the amount of the change per unit time in the opening of an accelerator pedal is within the fixed range.

(18) Preferably, in the above (13) or (14), the command value to said friction transfer means is corrected so that the required shift time from the shifting start to the shifting end may approach at said target required shift time whenever shifting is repeated.

(19) Preferably, in any one of the above (1), (5), (6), (13) and (14), the shifting is carried out with said friction transfer means opened when the correction value of said friction transfer means becomes larger than a fixed value.

(20) Preferably, in any one of the above (1), (5), (6), (13) and (14), the shifting is carried out with said friction transfer means opened when the correction value of said friction transfer means becomes smaller than a fixed value.

(21) The present invention adopts the following configuration in order to obtain the above first object.

A vehicle control apparatus including a driving force source for generating the driving force, a cogwheel type transmission provided with a plurality of cogwheel rows, a plurality of torque transfer means provided between an input shaft and an output shaft of said transmission, at least one of said torque transfer means being the friction transfer means, and a shift control means for controlling said friction transfer means when shifting from one cogwheel row to the other cogwheel row, said shift control means setting a target synchronous rotation speed based on the output rotation speed of said transmission and at least one of parameters indicative of the state of said driving force source or said transmission, and setting an command value to said friction transfer means so that the input rotation speed of said transmission may be synchronized with said target synchronous rotation speed, wherein said shift control means sets the target required shift time based on at least one of parameters indicative of the state of said driving force source or said transmission, and corrects the command value to said friction transfer means so that the required shift time from the shifting start to the shifting end may approach at said target required shift time.

Thereby, it is possible to prevent the time required to synchronize the rotation speeds from becoming long or short even if the machine difference between assist clutches or the deterioration with age occurs, and improve the shift quality by suppressing the time required to synchronize the rotation speeds from becoming long or short even if the change in characteristics due to the replacement of a clutch or the changing of operating fluid.

(22) The present invention adopts the following configuration in order to obtain the above second object.

A vehicle control apparatus including a driving force source for generating the driving force, a cogwheel type transmission provided with a plurality of cogwheel rows, a plurality of torque transfer means provided between an input shaft and an output shaft of said transmission, at least one of said torque transfer means being the friction transfer means, and a shift control means for controlling said friction transfer means when shifting from one cogwheel row to the other cogwheel row, said shift control means setting a target synchronous rotation speed based on the output rotation speed of said transmission and at least one of parameters indicative of the state of said driving force source or said transmission, and setting an command value to said friction transfer means so that the input rotation speed of said transmission may be synchronized with said target synchronous rotation speed, wherein:

said shift control means corrects the command value to said friction transfer means by calculating the correction of the command value to said friction transfer means based on the difference between said target synchronous rotation speed and said input rotation speed.

Thereby, it is possible to prevent the decrease of the shift quality without making the time required to synchronize the rotation speeds long even if the machine difference between engines or the deterioration with age occurs.

(23) The present invention adopts the following configuration in order to obtain the above second object.

A vehicle control apparatus including a driving force source for generating the driving force, a cogwheel type transmission provided with a plurality of cogwheel rows, a plurality of torque transfer means provided between an input shaft and an output shaft of said transmission, at least one of said torque transfer means being the friction transfer means, and a shift control means for controlling said friction transfer means when shifting from one cogwheel row to the other cogwheel row, said shift control means setting a feed forward command value to said friction transfer means based on at least one of parameters indicative of the state of said driving force source or said transmission, setting a target synchronous rotation speed based on at least one of parameters indicative of the state of said driving force source or said transmission, setting a feedback command value to said friction transfer means based on the difference between said target synchronous rotation speed and said input rotation speed of the transmission, controlling the input rotation speed of said transmission and the output shaft torque of said transmission under shifting by setting the command value to said friction transfer means based on said feedforward command value and said feedback command value, wherein said shift control means corrects the command value to said friction transfer means by calculating the correction of the command value to said friction transfer means based on the difference between said feedforward command value and the command value to said friction transfer means.

Thereby, it is possible to prevent the decrease of the shift quality without making the time required to synchronize the rotation speeds long even if the machine difference between engines or the deterioration with age occurs.

(24) The present invention adopts the following configuration in order to obtain the above first object.

A transmission comprising a cogwheel type transmission provided with a plurality of cogwheel rows, a plurality of torque transfer means provided between an input shaft and an output shaft of said transmission, at least one of said torque transfer means being the friction transfer means, and a shift control means for controlling said friction transfer means when shifting from one cogwheel row to the other cogwheel row, said shift control means setting a target synchronous rotation speed based on the output rotation speed of said transmission and at least one of parameters indicative of the state of said driving force source or transmission, and setting an command value to said friction transfer means so that the input rotation speed of said transmission may be synchronized with said target synchronous rotation speed, wherein said shift control means sets the target required shift time based on at least one of parameters indicative of the state of said driving force source or said transmission, and corrects the command value to said friction transfer means so that the required shift time from the shifting start to the shifting end may approach at said target required shift time.

Thereby, it is possible to prevent the time required to synchronize the rotation speeds from becoming long or short even if the machine difference between assist clutches or the deterioration with age occurs, and improve the shift quality by suppressing the time required to synchronize the rotation speeds from becoming long or short even if the change in characteristics due to the replacement of a clutch or the changing of operating fluid.

(25) The present invention adopts the following configuration in order to obtain the above second object.

A transmission comprising a cogwheel type transmission provided with a plurality of cogwheel rows, a plurality of torque transfer means provided between an input shaft and an output shaft of said transmission, at least one of said torque transfer means being the friction transfer means, and a shift control means for controlling said friction transfer means when shifting from one cogwheel row to the other cogwheel row, said shift control means setting a target synchronous rotation speed based on the output rotation speed of said transmission and at least one of parameters indicative of the state of said driving force source or said transmission, and setting an command value to said friction transfer means so that the input rotation speed of said transmission may be synchronized with said target synchronous rotation speed, wherein said shift control means corrects the command value to said friction transfer means by calculating the correction of the command value to said friction transfer means based on the difference between said target synchronous rotation speed and said input rotation speed.

Thereby, it is possible to prevent the decrease of the shift quality without making the time required to synchronize the rotation speeds long even if the machine difference between engines or the deterioration with age occurs.

(26) The present invention adopts the following configuration in order to obtain the above second object.

A transmission comprising a cogwheel type transmission provided with a plurality of cogwheel rows, a plurality of torque transfer means provided between an input shaft and an output shaft of said transmission, at least one of said torque transfer means being the friction transfer means, and a shift control means for controlling said friction transfer means when shifting from one cogwheel row to the other cogwheel row, said shift control means setting a feed forward command value to said friction transfer means based on at least one of parameters indicative of the state of said driving force source or said transmission, setting a target synchronous rotation speed based on at least one of parameters indicative of the state of said driving force source or said transmission, setting a feedback command value to said friction transfer means based on the difference between said target synchronous rotation speed and said input rotation speed of the transmission, controlling the input rotation speed of said transmission and the output shaft torque of said transmission under shifting by setting the command value to said friction transfer means based on said feedforward command value and said feedback command value, wherein:

said shift control means corrects the command value to said friction transfer means by calculating the correction of the command value to said friction transfer means based on the difference between said feedforward command value and the command value to said friction transfer means.

Thereby, it is possible to prevent the decrease of the shift quality without making the time required to synchronize the rotation speeds long even if the machine difference between engines or the deterioration with age occurs.

(27) The present invention adopts the following configuration in order to obtain the above second object.

An apparatus for controlling a transmission comprising a shift control means for controlling a friction transfer means of a plurality of torque transfer means provided between an input shaft and an output shaft of said transmission when shifting from one cogwheel row of a cogwheel type transmission provided with a plurality of cogwheel rows to the other cogwheel row, said shift control means setting a target synchronous rotation speed based on the output rotation speed of said transmission and at least one of parameters indicative of the state of said driving force source or said transmission, and setting an command value to said friction transfer means so that the input rotation speed of said transmission may be synchronized with said target synchronous rotation speed, wherein said shift control means sets the target required shift time based on at least one of parameters indicative of the state of said driving force source or said transmission, and corrects the command value to said friction transfer means so that the required shift time from the shifting start to the shifting end may approach at said target required shift time.

Thereby, it is possible to prevent the decrease of the shift quality without making the time required to synchronize the rotation speeds long even if the machine difference between engines or the deterioration with age occurs.

(28) The present invention adopts the following configuration in order to obtain the above second object.

A transmission comprising a shift control means for controlling a friction transfer means of a plurality of torque transfer means provided between an input shaft and an output shaft of said transmission when shifting from one cogwheel row of a cogwheel type transmission provided with a plurality of cogwheel rows to the other cogwheel row, said shift control means setting a target synchronous rotation speed based on the output rotation speed of said transmission and at least one of parameters indicative of the state of said driving force source or said transmission, and setting an command value to said friction transfer means so that the input rotation speed of said transmission may be synchronized with said target synchronous rotation speed, wherein said shift control means corrects the command value to said friction transfer means by calculating the correction of the command value to said friction transfer means based on the difference between said target synchronous rotation speed and said input rotation speed.

Thereby, it is possible to prevent the decrease of the shift quality without making the time required to synchronize the rotation speeds long even if the machine difference between engines or the deterioration with age occurs.

(29) The present invention adopts the following configuration in order to obtain the above second object.

A transmission comprising a shift control means for controlling a friction transfer means of a plurality of torque transfer means provided between an input shaft and an output shaft of said transmission when shifting from one cogwheel row of a cogwheel type transmission provided with a plurality of cogwheel rows to the other cogwheel row, said shift control means setting a feed forward command value to said friction transfer means based on at least one of parameters indicative of the state of said driving force source or said transmission, setting a target synchronous rotation speed based on at least one of parameters indicative of the state of said driving force source or said transmission, setting a feedback command value to said friction transfer means based on the difference between said target synchronous rotation speed and said input rotation speed of the transmission, controlling the input rotation speed of said transmission and the output shaft torque of said transmission under shifting by setting the command value to said friction transfer means based on said feedforward command value and said feedback command value, wherein said shift control means corrects the command value to said friction transfer means by calculating the correction of the command value to said friction transfer means based on the difference between said feedforward command value and the command value to said friction transfer means.

Thereby, it is possible to prevent the decrease of the shift quality without making the time required to synchronize the rotation speeds long even if the machine difference between engines or the deterioration with age occurs.

BRIEF DESCRIPTION OF THE DRAWINGS

FIG. 9 is a flowchart showing the control content of the torque assist control phase in the shift control by the vehicle control apparatus according to the first embodiment of the present invention.

FIG. 12 is a time chart showing the control content of the rotation synchronous control phase in the shift control by the vehicle control apparatus according to the first embodiment of the present invention.

DETAILED DESCRIPTION OF THE PREFERRED EMBODIMENTS

The configuration and the operation of a first embodiment of a vehicle control apparatus according to the present invention will be described below, referring to FIG. 1 to FIG. 20.

Initially, a first configuration example of the system of controlling the vehicle of the present embodiment will be described, referring to FIG. 1.

Figure 1:
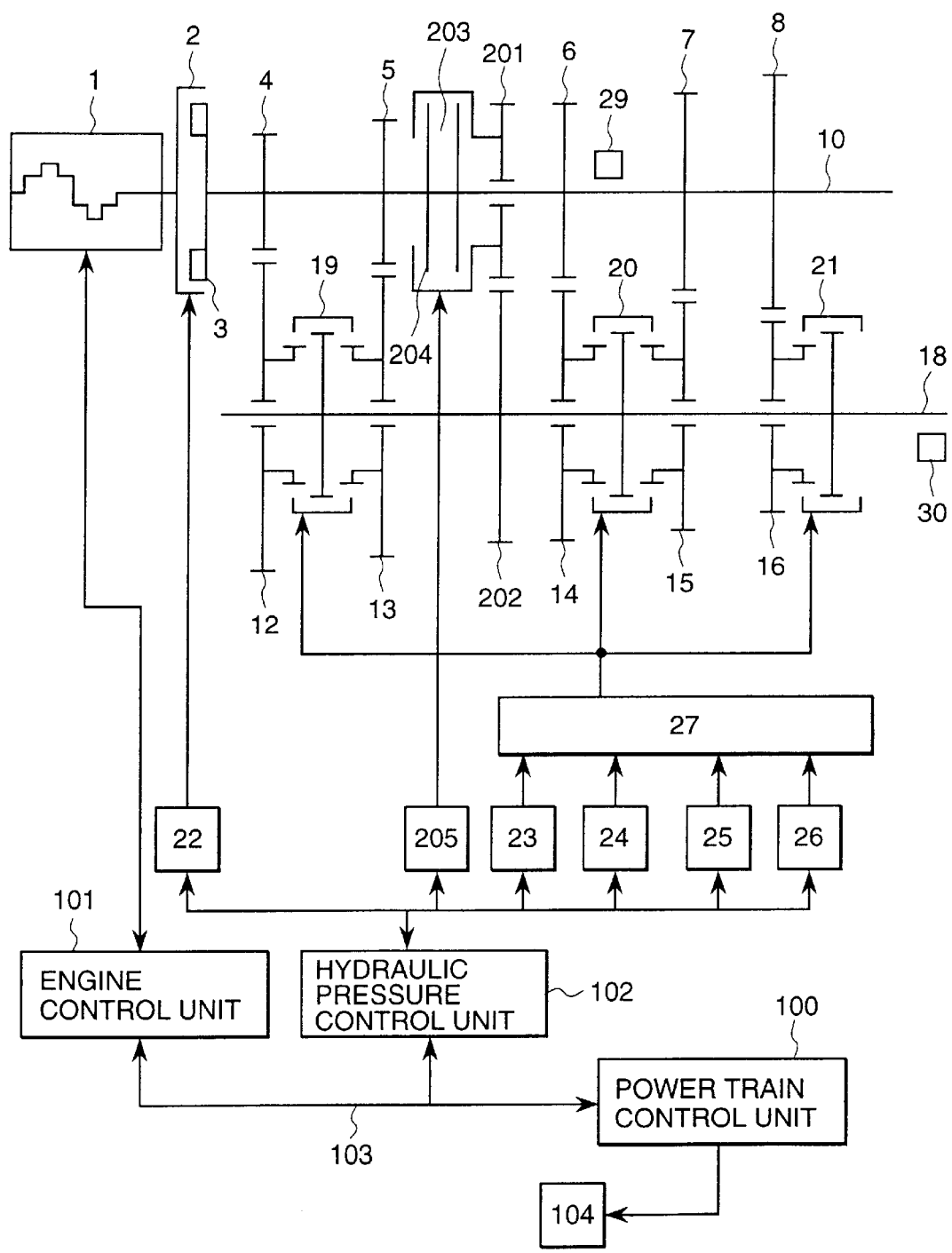
FIG. 1 is a system diagram showing a first configuration example of a vehicle control apparatus according to a first embodiment of the present invention.

FIG. 1 is a system diagram showing the first configuration example of the system of controlling the vehicle of the first embodiment of the present invention.

An engine 1 comprises an engine rotation speed sensor, not shown, for measuring rotation speed of the engine 1; an electronic control throttle (not shown in the figure) for controlling engine torque; and a fuel injector (not shown in the figure) for injecting an amount if fuel corresponding to an amount of intake air. An engine control unit 101 can control torque of the engine 1 with high accuracy by operating the amount of intake air, the amount of fuel, ignition timing and so on. As the fuel injector, there are an intake port injection type in which fuel is injected into an intake port, and an in-cylinder injection type in which fuel is directly injected into a cylinder. It is advantageous that which type of engine is used is determined by comparing the operating range (a range determined by an engine torque and an engine rotation speed) required for the engine and selecting one type capable of reducing fuel consumption and reducing the amount of emission gas.

A first clutch input disk 2 is connected to the engine 1, and torque of the engine 1 can be transmitted to a transmission input shaft 10 by engaging the first clutch input disk 2 with a first clutch output disk 3. A dry single-plate type clutch is generally used for the first clutch, but any type of a friction transmitting means such as a wet multi-plate clutch or a magnetic clutch may be used.

A first drive gear 4, a second drive gear 5, a third drive gear 6, a fourth drive gear 7, a fifth drive gear 8 and a backward drive gear (not shown) are provided to the input shaft 10. An actuator 22 driven by hydraulic pressure is used for controlling a pushing force (a clutch torque) between the first clutch input disk 2 and the first clutch output disk 3, and the output power of the engine 1 can be transmitted or cut off to the input shaft 10 by controlling the pushing force (the clutch torque).

The first drive gear 4, the second drive gear 5, the third drive gear 6, the fourth drive gear 7, the fifth drive gear 8 and the backward drive gear are fixed to the transmission input shaft 10. Further, a sensor 29 for detecting the rotation speed of the transmission input shaft 10 is provided.

On the other hand, a first driven gear 12, a second driven gear 13, a third driven gear 14, a fourth driven gear 15, a fifth driven gear 16 and a backward driven gear are rotatably provided to the output shaft 18 of the transmission. The first driven gear 16 is engaged with the first drive gear 4, and the second driven gear 13 is engaged with the second drive gear 5. The third driven gear 14 is engaged with the third drive gear 6, and the fourth driven gear 15 is engaged with the fourth drive gear 7. The fifth driven gear 16 is engaged with the fifth drive gear 8, and the backward driven gear is engaged with the backward drive gear.

Further, a second clutch (called as an engaging clutch or a dog clutch) 19 having a synchronizer mechanism for engaging the first driven gear 12 with the output shaft 18 of the transmission or engaging the second driven gear 13 with the output shaft 18 of the transmission is provided between the first driven gear 12 and the second driven gear 13. Therefore, the rotation torque transmitted from the first drive gear 4 or the second drive gear 5 to the first driven gear 12 or the second driven gear 13 is transmitted to the second clutch 19, and then transmitted to the output shaft 18 of the transmission through the second clutch 19.

Further, a third clutch (called as an engaging clutch or a dog clutch) 20 having a synchronizer mechanism for engaging the third driven gear 14 with the output shaft 18 of the transmission or engaging the fourth driven gear 15 with the output shaft 18 of the transmission is provided between the third driven gear 14 and the fourth driven gear 15. Therefore, the rotation torque transmitted from the third drive gear 6 or the fourth drive gear 7 to the third driven gear 14 or the fourth driven gear 15 is transmitted to the third clutch 20, and then transmitted to the output shaft 18 of the transmission through the third clutch 20.

Further, a fourth clutch (called as an engaging clutch or a dog clutch) 21 having a synchronizer mechanism for engaging the fifth driven gear 16 with the output shaft 18 of the transmission or engaging the backward driven gear through a reversing gear with the output shaft 18 of the transmission is provided between the fifth driven gear 16 and the backward driven gear. Therefore, the rotation torque transmitted from the fifth drive gear 8 or the backward drive gear 9 to the fifth driven gear 16 or the backward driven gear is transmitted to the fourth clutch 21, and then transmitted to the output shaft 18 of the transmission through the third clutch 21. In a case where the backward driven gear is engaged with the output shaft 18 of the transmission through a reversing gear, an engaging clutch not having the synchronizer mechanism different from the fourth clutch 21 may be used.

As described above, in order to transmit the rotation torque of the transmission input shaft 10 to the second clutch 19 or the third clutch 20 or the fourth clutch 21, it is necessary to move any one of the second clutch 19, the third clutch 20 and the fourth clutch 21 in the axial direction of the output shaft 18 of the transmission to engage with any one of the first driven gear 12, the second driven gear 13, the third driven gear 14, the fourth driven gear 15, the fifth driven gear 16 and the backward driven gear. In order to engage with any one of the first driven gear 12, the second driven gear 13, the third driven gear 14, the fourth driven gear 15, the fifth driven gear 16 and the backward driven gear with the output shaft 18 of the transmission, any one of the second clutch 19, the third clutch 20 and the fourth clutch 21 in the axial direction of the output shaft 18 of the transmission must be moved. In order to move any one of the second clutch 19, the third clutch 20 and the fourth clutch 21, a shift mechanism 27 and a select mechanism 28 are operated by actuators, that is, a shift first actuator 23, a shift second actuator 24, and a select first actuator 25 and a select second actuator 26 which are driven by hydraulic pressure. The operational relationship of the shift mechanism 27 and the select mechanism 28 using the shift first actuator 23 and the shift second actuator 24, and the select first actuator 25 and the select second actuator 26 is to be described later referring to FIG. 4. By engaging any one of the second clutch 19, the third clutch 20 and the fourth clutch 21 with any one of the first driven gear 12, the second driven gear 13, the third driven gear 14, the fourth driven gear 15, the fifth driven gear 16 and the backward driven gear, the rotation torque of the transmission input shaft 10 can be transmitted to the driving wheel output shaft 18 through any one of the second clutch 19, the third clutch 20 and the fourth clutch 21. Further, a sensor 30 for detecting the rotation speed of the output shaft 18 of the transmission is provided.

The shift first actuator 23 and the shift second actuator 24, and the select first actuator 25 and the select second actuator 26 may be constructed of solenoid valves or motors or the like. Further, the shift/select mechanisms 27 may be constructed of a shifter rail and a shifter folk, or constructed in a drum type. The operation of the shift first actuator 23, the shift second actuator 24, the select first actuator 25 and the select second actuator 26, and the operational relationship of the first engaging clutch 19, the second engaging clutch 20 and the third engaging clutch 21 are to be described later, referring to FIG. 3.

A seventh drive gear 201 is connected to an assist clutch input disk 203 of a second clutch (hereinafter, referred to as an assist clutch) of a friction clutch of one type of friction transmitting means, and the transmission input shaft 10 is connected to an assist clutch output disk 204. The torque of a seventh driven gear 202 can be transmitted to the output shaft 18 of the transmission by engaging the assist clutch input disk 203 with the assist clutch output disk 204.

An actuator 205 driven by hydraulic pressure is used for controlling a pushing force (an assist clutch torque) between the assist clutch input disk 203 and the assist clutch output disk 204, and the output power of the engine 1 can be transmitted or interrupted to the output shaft 18 of the transmission by controlling the pushing force (the assist clutch torque). The actuator 205 may be constructed of solenoid valves or motors or the like. Further, although a wet multi-plate clutch is generally used for the assist clutch of the one type of friction transmitting means, any type of friction transmitting means such as a magnetic clutch or the like may be used.

As described above, the rotation torque of the transmission input shaft 10 transmitted from the first drive gear 4, the second drive gear 5, the third drive gear 6, the fourth drive gear 7, the fifth drive gear 8 or the backward drive gear through the first driven gear 12, the second driven gear 13, the third driven gear 14, the fourth driven gear 15, the fifth driven gear 16 or the backward driven gear is transmitted to wheels (not shown in the figure) through a differential gear (not shown in the figure) connected to the output shaft 18 of the transmission.

The first clutch actuator 22 generating the thrust force (the clutch torque) between the first clutch input disk 2 and the first clutch output disk 3; the shift mechanism 27 operating the second clutch 19, the third clutch 20 and the fourth clutch 21; the shift first actuator 23, the shift second actuator 24 driving the shift mechanism 27; and the select first actuator 25, the select second actuator 26 control each clutch by controlling the hydraulic pressure applied to each actuator by and by adjusting stroke amounts of hydraulic pressure cylinders (not shown) provided to each actuator.

Further, the engine 1 is constructed so that the torque of the engine 1 is controlled with high accuracy by the engine control unit 101 operating the amount of intake air, the amount of fuel, the ignition timing and so on. Further, the hydraulic pressure control unit 102 and the engine control unit 101 are controlled by a power train control unit 100. The power train control unit 101, the engine control unit 101 and the hydraulic pressure control unit 102 mutually send and receive information through a communication means 103. Further, a warning lump is provided which is lit or extinguished by power train control unit 100.

Next, a second configuration example of the system of controlling the vehicle of the present embodiment will be described, referring to FIG. 2.

Figure 2:
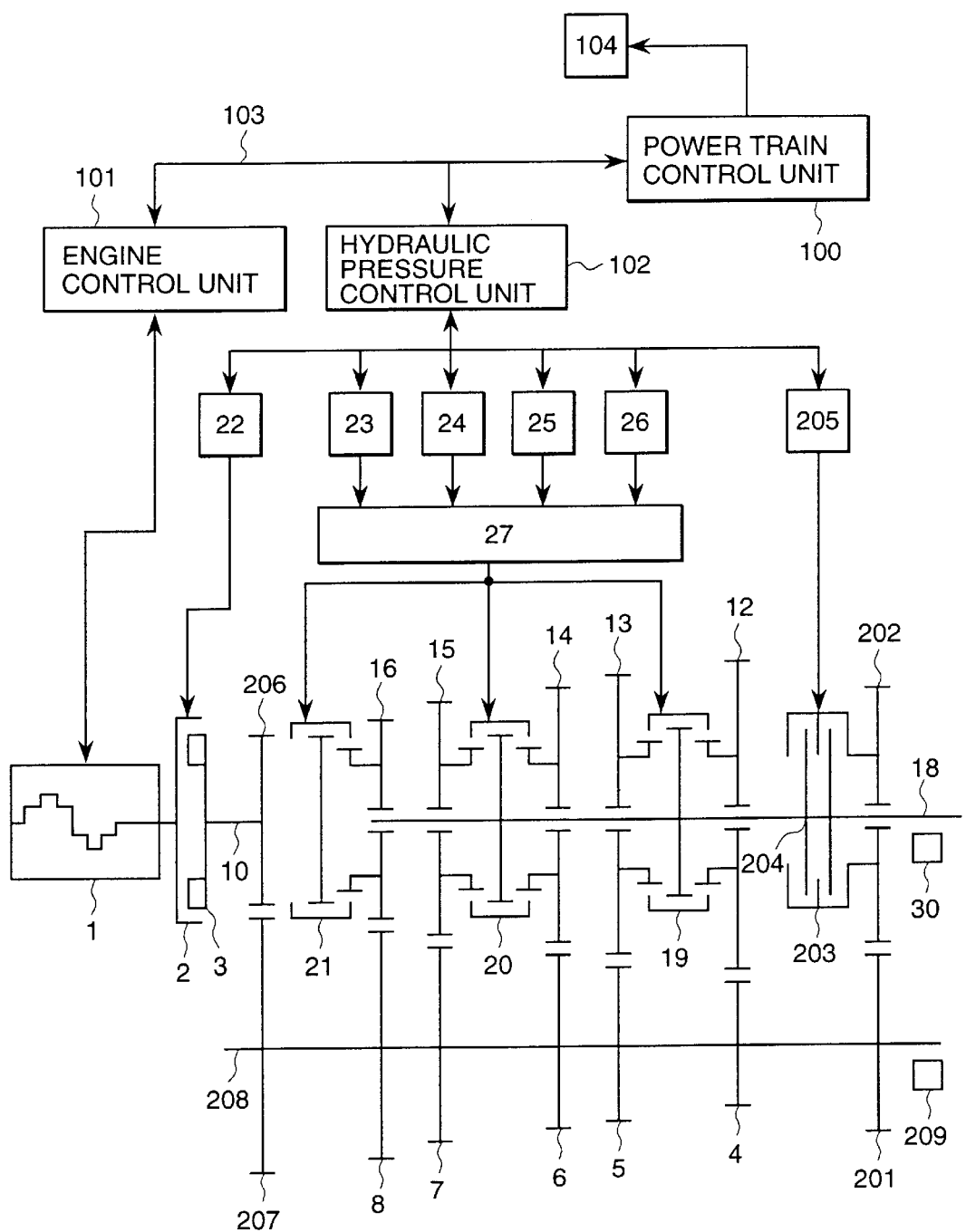
FIG. 2 is a system diagram showing a second configuration example of a vehicle control apparatus according to the first embodiment of the present invention.

FIG. 2 is a system diagram showing the second configuration example of the system of controlling the vehicle of the first embodiment of the present invention. In the figure, the same numerals as in FIG. 1 designates like parts.

Although the example shown in FIG. 1 is constructed of two shafts of the transmission input shaft 10 and the output shaft 18 of the transmission, the present example is constructed of three shafts including a counter shaft 208. That is, the power of the engine 1 is transmitted from an input drive gear 206 to an input driven gear 207, and then transmitted from the counter shaft 208 to the output shaft 18 of the transmission through the first drive gear 4, the second drive gear 5, the third drive gear 6, the fourth drive gear 7, the fifth drive gear 8, a backward drive gear (not shown in the figure) or the seventh drive gear 201; and the first driven gear 12, the second driven gear 13, the third driven gear 14, the fourth driven gear 15, the fifth driven gear 16, a backward driven gear (not shown in the figure) or the seventh driven gear 202. Further, the seventh drive gear 201 and the seventh driven gear 202 connected to the assist clutch may be constructed in a gear position.

As described above, the present invention comprises the gear type transmission having the plurality of gear trains and the plurality of torque transmitting means between the input shaft and the output shaft of the transmission, and can be applied to various kinds of transmissions using at least one of the above-described torque transmitting means as the friction transmitting means.

The engaging relationship between the clutch and the driven gear in the present embodiment of the system of controlling the vehicle will be described below, referring to FIG. 3.

Figures 3A, 3B:
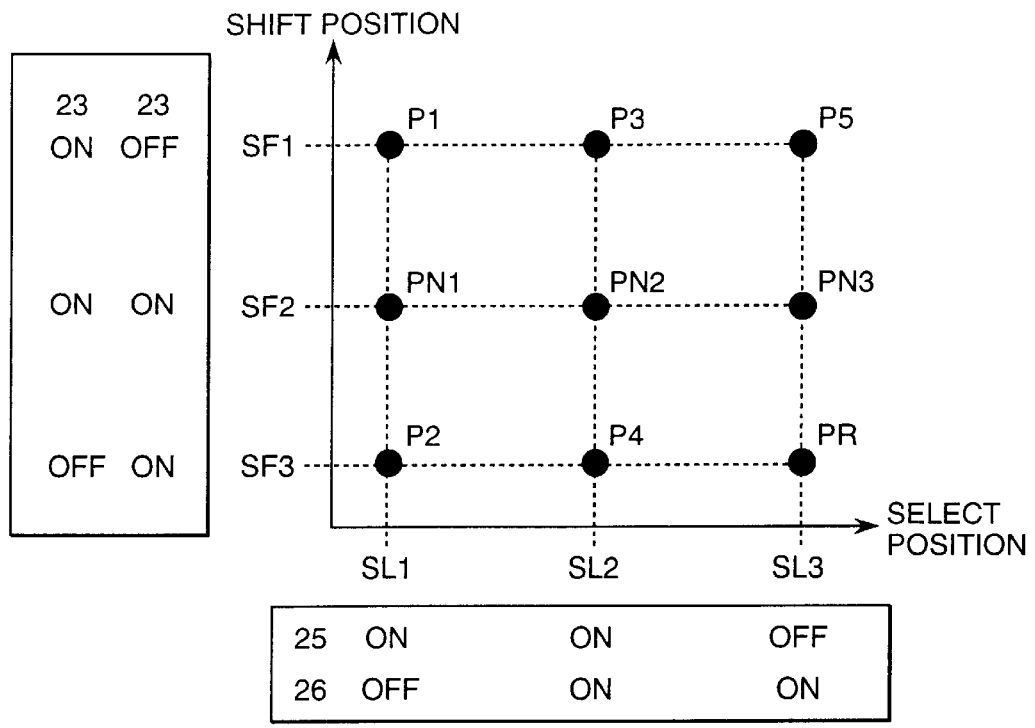
FIG. 3 is a diagram explaining the engaging relationship between the clutch and the driven gear in the vehicle control apparatus according to the first embodiment of the present invention.

FIGS. 3(A) and (B) are diagrams explaining the engaging relationship between the clutch and the driven gear in the system of controlling the vehicle of the first embodiment of the present invention.

FIG. 3 shows the engaging relationship between the second clutch 19, the third clutch 20, the fourth clutch 21 and the first driven gear 12, the second driven gear 13, the third driven gear 14, the fourth driven gear 15, the fifth driven gear 16, the backward driven gear 17 by controlling the shift mechanism 27 and the select mechanism 28, that is, the shift position and the select position using the shift first actuator 23 and the shift second actuator 24, and the select first actuator 25 and the select second actuator 26 shown in FIG. 1.

By setting the select position to a position SL1 by turning the select first actuator 25 ON and the select second actuator 26 OFF, and by setting the shift position to a position SF1 by turning the shift first actuator 23 ON and the shift second actuator 24 OFF, the shift position and the select position are moved to a point P1 to form a first speed stage by engaging the second clutch 19 with the first driven gear 12.

By setting the select position to the position SL1 by turning the select first actuator 25 ON and the select second actuator 26 OFF, and by setting the shift position to a position SF3 by turning the shift first actuator 23 OFF and the shift second actuator 24 ON, the shift position and the select position are moved to a point P2 to form a second speed stage by engaging the second clutch 19 with the second driven gear 13.

By setting the select position to a position SL2 by turning the select first actuator 25 ON and the select second actuator 26 ON, and by setting the shift position to the position SF1 by turning the shift first actuator 23 ON and the shift second actuator 24 OFF, the shift position and the select position are moved to a point P3 to form a third speed stage by engaging the third clutch 20 with the third driven gear 14.

By setting the select position to a position SL2 by turning the select first actuator 25 ON and the select second actuator 26 ON, and by setting the shift position to a position SF3 by turning the shift first actuator 23 OFF and the shift second actuator 24 ON, the shift position and the select position are moved to a point P4 to form a fourth speed stage by engaging the third clutch 20 with the fourth driven gear 15.

By setting the select position to a position SL3 by turning the select first actuator 25 OFF and the select second actuator 26 ON, and by setting the shift position to the position SF1 by turning the shift first actuator 23 ON and the shift second actuator 24 OFF, the shift position and the select position are moved to a point P5 to form a fifth speed stage by engaging the fourth clutch 21 with the fifth driven gear 16.

By setting the select position to the position SL3 by turning the select first actuator 25 OFF and the select second actuator 26 ON, and by setting the shift position to the position SF3 by turning the shift first actuator 23 OFF and the shift second actuator 24 ON, the shift position and the select position are moved to a point PR to form a backward stage by engaging the fourth clutch 21 with the backward driven gear 17.

By setting the select position to the position SL2 by turning the select first actuator 25 ON and the select second actuator 26 ON, engagement of the gear is released to form a neutral position.

Figure 4:
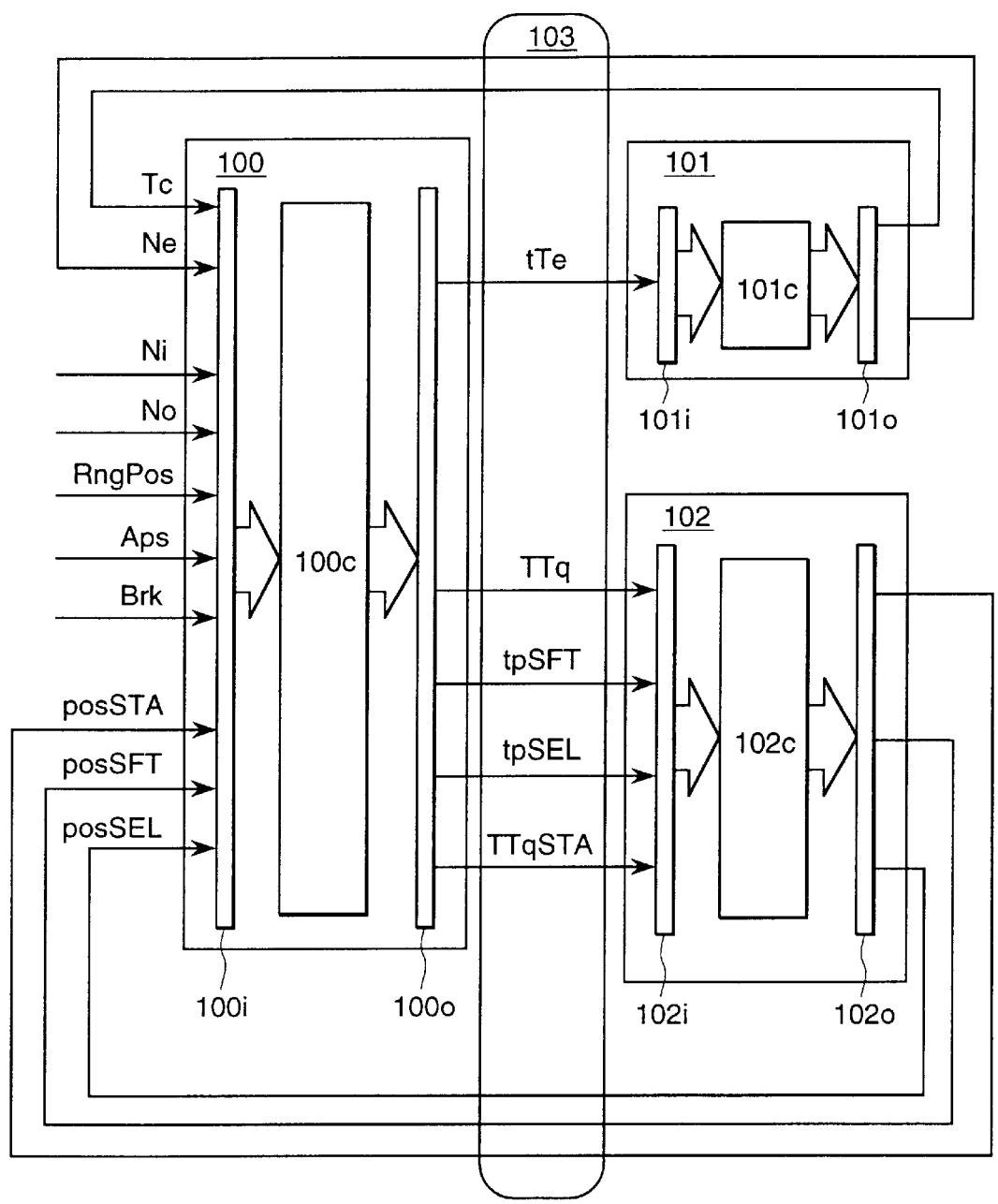
FIG. 4 is a block diagram showing the input and output signal relationship by a communication means 103 among a power train control unit 100, an engine control unit 101 and a hydraulic pressure control unit 102 in the vehicle control apparatus according to the first embodiment of the present invention.

Referring to FIG. 4, description will be made below on the input and output signal relationship among the power train control unit 100, the engine control unit 101 and the hydraulic pressure control unit 102 using the communication means 103.

FIG. 4 is a block diagram showing the input and output signal relationship by a communication means 103 among the power train control unit 100, the engine control unit 101 and the hydraulic pressure control unit 102 in the system of controlling the vehicle of the first embodiment of the present invention.

The power train control unit 100 is constructed as a control unit having an input part 100$i$, an output part 100$o$ and a computer 100$c$. Similarly, the engine control unit 101 is also constructed as a control unit having an input part 101$i$, an output part 101$o$ and a computer 101$c$. The hydraulic pressure control unit 102 is also constructed as a control unit having an input part 102$i$, an output part 102$o$ and a computer 102$c$.

An engine torque command value tTe is transmitted from the power train control unit 100 to the engine control unit 101 using the communication means 103, and the engine control unit 101 controls the amount of intake air, the amount of fuel and the ignition timing (not shown in the figure) so as to satisfy the engine torque command tTe. Further, a means (not shown in the figure) for detecting an engine torque to become an input torque to the transmission is provided inside the engine control unit 101, and the engine control unit 101 detects a rotation speed Ne of the engine 1 and an engine torque Te generated by the engine 1 and transmits them to the power train control unit 100 using the communication means 103. As the engine torque detecting means, a torque sensor may be used, or an estimating means from parameters of the engine such as an injection pulse width of the injector or a pressure inside the intake pipe, an engine rotation speed and the like may be used.

The power train control unit 100 sends a first clutch target torque TTqSTA, a target shift position tpSFT, a target select position tpSEL and an assist clutch target torque TTq to the hydraulic pressure control unit 102, and the hydraulic pressure control unit engages and disengages the first clutch input disk 2 and the first clutch output disk 3 by controlling the first clutch actuator 22 so as to satisfy the first clutch target torque TTqSTA. Further, the hydraulic pressure control unit controls the shift first actuator 23, the shift second actuator 24, the select first actuator 25 and the select second actuator 26 and controls the shift position and the select position by operating the shift/select mechanism 27 to engage and disengage the first engaging clutch 19, the second engaging clutch 20 and the third engaging clutch 21 so as to satisfy the target shift position tpSFT and the target select position tpSEL. Further, the hydraulic pressure control unit controls the assist clutch actuator 205 to engage and disengage the assist clutch input disk 203 and the assist clutch output disk 204 so as to satisfy the assist clutch target torque TTq.

Further, the hydraulic pressure control unit 102 detects a position signal posSTA expressing engaging and disengaging of the first clutch, a shift position signal rpSFT and a select position signal rpSEL, and sends the signals to the power train control unit 100.

Further, the power train control unit 100 receives an input shaft rotation speed Ni and an output shaft rotation speed No from the input shaft rotation sensor 29 and the output shaft rotation sensor 30, respectively. Further, the power train control unit 100 receives a range position signal RngPos expressing a shift lever position such as P-range, R-range, N-range or D-range, and a Stepping-in amount of accelerator pedal Aps, and an ON/OFF signal Brk from a brake switch for detecting whether or not the brake is Stepped in.

When a driver sets, for example, the shift range to the D-range and Steps in the accelerator, the power train control unit 100 judges that the driver intends to start and accelerate the vehicle. On the other hand, when the driver Steps in the brake pedal, the power train control unit judges that the driver intends to decelerate and stop the vehicle. Then, the power train control unit sets the engine torque command value tTe, the first clutch target torque TTqSTA, the target shift position tpSFT and the target select position tpSEL so as to satisfy the intension of the driver. Further, the power train control unit 100 sets a gear position from a vehicle speed Vsp calculated from the output shaft rotation speed tpSFT and the Stepping-in amount of the accelerator pedal Aps, and sets the engine torque command value tTe, the first clutch target torque TTqSTA, the target shift position tpSET, the target select position tpSEL and the assist clutch target torque TTq so as to perform the shifting operation to the set gear position.

The control content of shift control by the present embodiment of the system of controlling the vehicle will be described below, referring to FIG. 5 to FIG. 14.

Firstly, the overall control content of the shift control by the present embodiment of the system of controlling the vehicle will be described, referring to FIG. 5.

Figure 5:
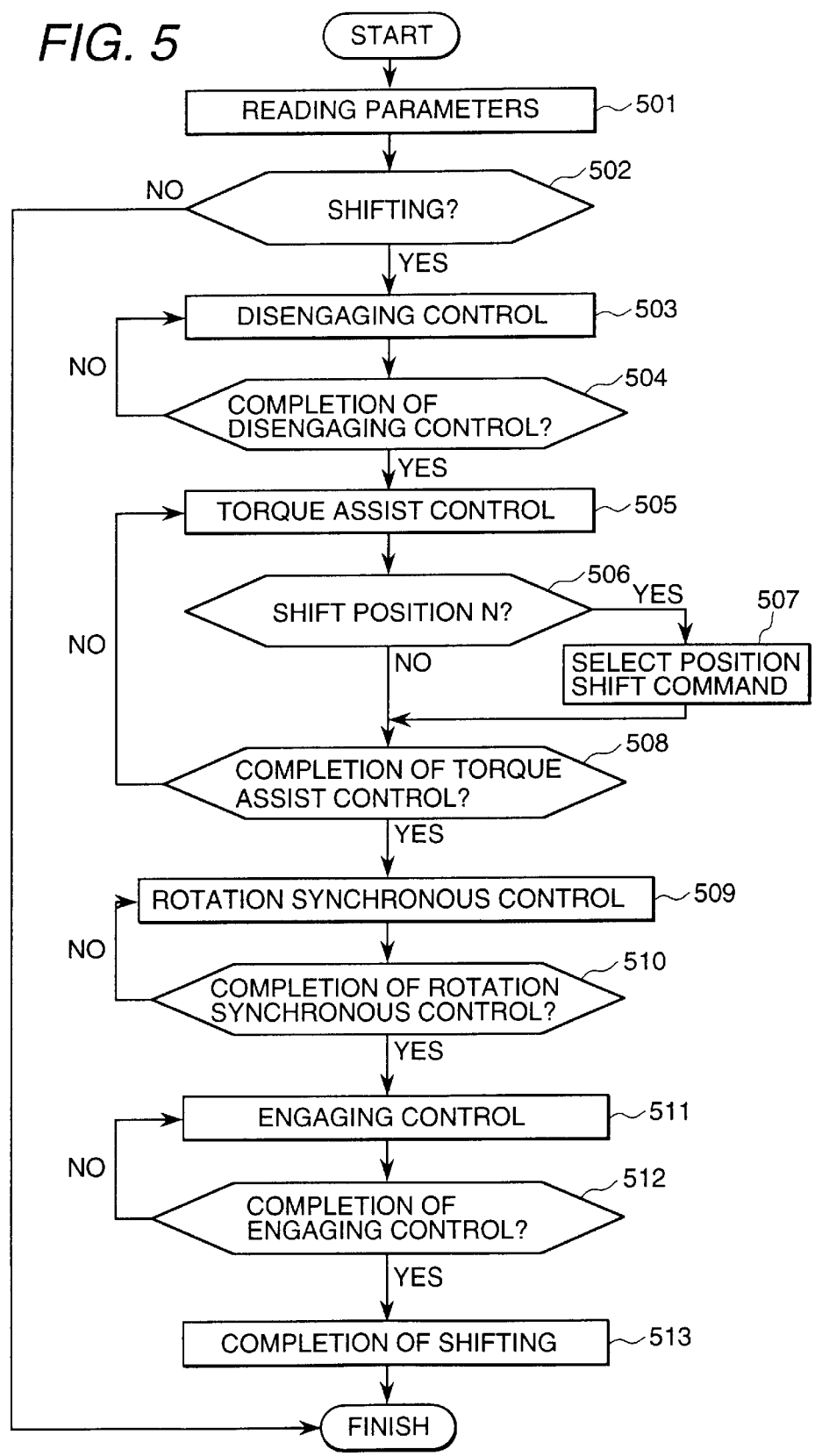
FIG. 5 is a flow chart showing the control content of the shift control by the vehicle control apparatus according to the first embodiment of the present invention.

FIG. 5 is a flowchart showing the control content of the shift control by the system of controlling the vehicle of the first embodiment of the present invention.

The control content of the shift control to be described below are programmed in the computer 100c of the power train control unit 100, and repetitively executed in a predetermined cycle. That is, the processing from Step 501 to 513 described below is executed by the power train control unit 100.

The power train control unit 100 reads parameters in Step 501, and judges in Step 502 whether the shift control is necessary or not. If the shift control is necessary, the processing advances to Step 503. If the shift control is not necessary, the shift control is completed. Whether or not the shift control is necessary is judged as follows. That is, a gear position is set from a vehicle speed Vsp and a Stepping-in amount of the accelerator Aps, and it is judged that the shift control is necessary if the set gear position is different from a present gear position. If the shift control is necessary, shifting operation is started by Step 503 and the flowing Steps.

As the shifting operation is started, disengaging control for disengaging the gear is executed in Step 503 (a disengaging control phase). The disengaging control is to be described later in detail, referring to FIG. 7.

Next, it is judged in Step 504 whether or not the disengaging control is completed. If the disengaging control is completed, the processing advances to Step 505. If the disengaging control is not completed yet, the processing of Step 503 is executed again. Therein, the judgment of Step 504 is executed by whether or not the shift position rpSFT is at a position which can be judged to be a disengaging position, that is, by whether or not the shift position rpSFT is within a preset range near the shift position SF2 in FIG. 3. Letting the thresholds for judging as the disengaging position be SF1OFF and SF3OFF, respectively, if the shift position rpSFT satisfies a condition of the threshold SF1OFF the shift position rpSFT the threshold SF3OFF, it is judged that the shift position rpSFT is in the disengaging position. There, it is preferable that the thresholds SF1OFF and SF3OFF are ranges as wide as possible within positions where the engaging clutch is out of the engaging condition.

After completion of the disengaging control, torque assist control is executed in Step 505 (a torque assist control phase). The torque assist control is to be described later in detail, referring to FIG. 9.

Next, in Step 506, it is judged whether or not the shift position is in the neutral position. The judgment of Step 506 is executed by whether or not the shift position rpSFT is at a position which can be judged to be a neutral position, that is, by whether or not the shift position rpSFT is within a preset range near the shift position SF2 in FIG. 3. If the shift position is in the neutral position, a select position shift command is made in Step 507. After completion of select position shift, the processing advances to Step 508. If the shift position is not in the neutral position, the processing advances to Step 508. In a case of, for example, 2nd to 3rd shifting, the target select position tpSEL is from the position SL1 to the position SL2 in FIG. 3.

Next, in Step 508, it is judged whether or not the torque assist control is completed. The completion condition of the torque assist control is the condition that elapsing time exceeds a target shift time set by the method to be described later referring to FIG. 11, or the condition that the difference between a rotation speed of the next gear position and an input rotation speed becomes small (when the condition of input rotation speed Ni−output rotation speed No×gear ratio of the target gear position $\gamma n \leq \Delta NiAT$ is satisfied).

If the torque assist control is completed, the processing advances to Step 509 (a rotation synchronous control phase) to execute rotation synchronous control to be described later referring to FIG. 12. If the torque assist control is not completed yet, the processing advances to Step 505 to continue the torque assist control.

Next, in Step 510, it is judged whether or not the rotation synchronous control is completed. The completion condition of the rotation synchronous control is the condition that the difference between a rotation speed of the next gear position and an input rotation speed becomes small (when the condition of input rotation speed Ni−output rotation speed No×gear ratio of the target gear position $\gamma n \leq \Delta NiNS$ is satisfied) and the select position is in the target position. In a case of, for example, 2 3 shifting, the judgment of the select position is executed by whether or not the select position rpSEL in FIG. 3 is within a predetermined range near the position SL2. It is preferable that a time delay is provided in the judgment of both of the rotation difference condition and the select position condition. Further, in the case where the rate of change in the input rotation speed Ni per unit time becomes small, it is preferable that the condition of (rate of change in the input rotation speed $\Delta Ni \leq \Delta DNiNS$) is also added.

If the synchronizing control is completed, in order to engage the gear the processing advances to Step 511 (an engaging control phase) to execute engaging control. The engaging control is to be described in detail, referring to FIG. 13. If the synchronizing control is not completed yet, the processing advances to Step 509 again to continue the synchronizing control.

Next, in Step 512, it is judged whether or not the engaging control is completed. Therein, the completion condition of the engaging control is the condition that the difference between a rotation speed of the next gear position and an input rotation speed becomes small (when the condition of input rotation speed Ni−output rotation speed No×gear ratio of the target gear position $\gamma n. \leq \Delta NiCN$ is satisfied) and the shift position is in the target position. In a case of, for example, 2nd to 3rd shifting, the judgment of the shift position is executed by whether or not the shift position rpSFT in FIG. 3 is within a predetermined range near the position SF1.

If the engaging control is completed, the processing advances to Step 513 (a shifting completion phase), and the target torque TTq of the assist clutch is set to 0, and then the shift control is completed. If the engaging control is not completed yet, the processing advances to Step 511 again to continue the engaging control.

While, the correction value is calculated by using the correction value calculating processing in Step 514. The details of the correction value calculating processing will be described later with reference to FIG. 16.

Description will be made below on the content of timers showing elapsing time of the shift control by the present embodiment of the system of controlling the vehicle, referring to FIG. 6.

Figure 6:
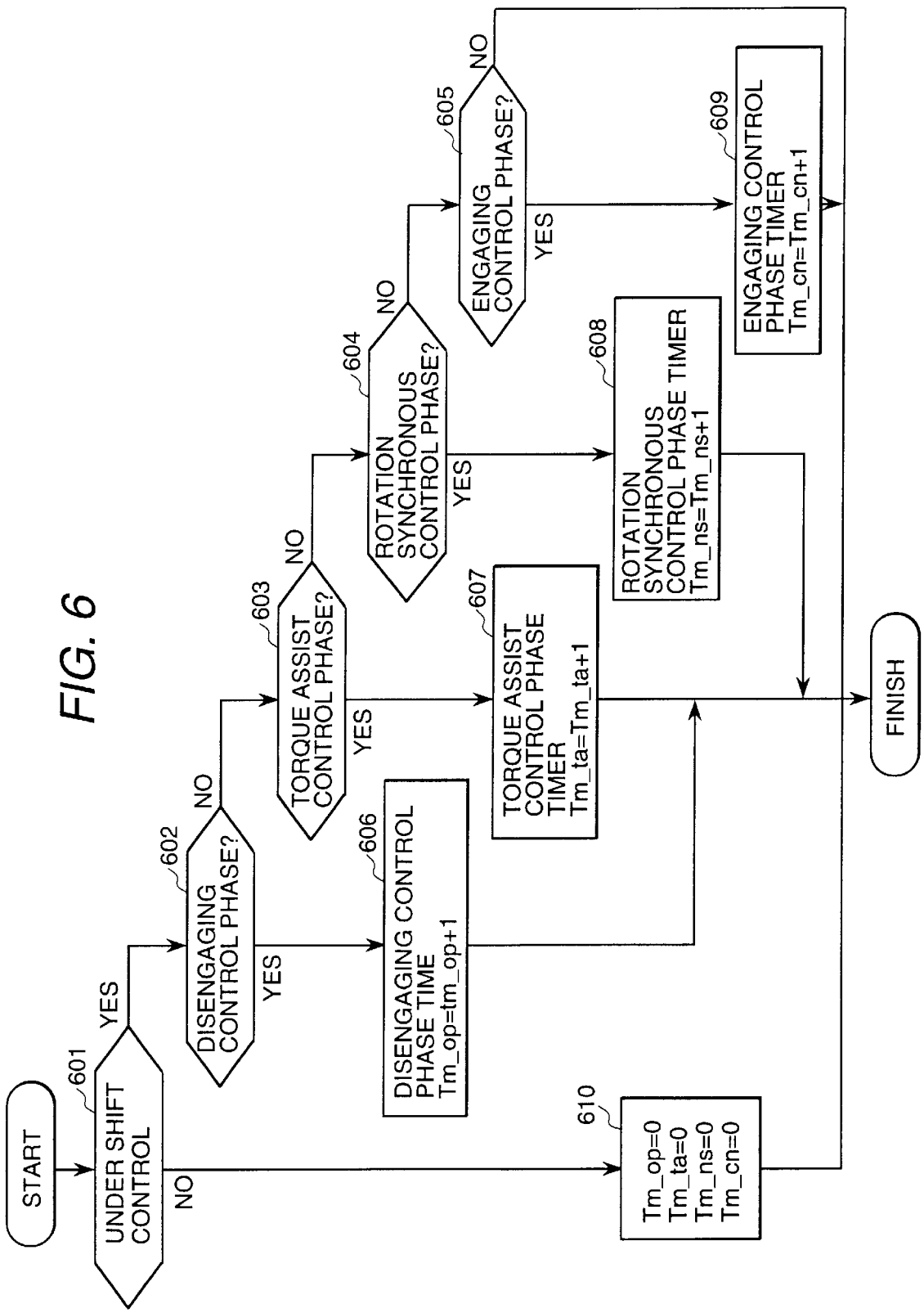
FIG. 6 is a flowchart showing the content of timers indicating elapsing time of the shift control by the vehicle control apparatus according to the first embodiment of the present invention.

FIG. 6 is a flowchart showing the content of timers showing elapsing time of the shift control by the system of controlling the vehicle of the first embodiment of the present invention.

The control content of the timers to be described below are programmed in the computer 100c of the power train control unit 100, and repetitively executed in a predetermined cycle. That is, the processing from Step 601 to 510 described below is executed by the power train control unit 100.

The power train control unit 100 judges in Step 601 whether the shift control is being progressed or not. If the shift control is being progressed, the processing advances to Step 602. If the shift control is not being progressed, the processing advances to Step 610 to reset disengaging control phase timer Tm_op, torque assist control phase timer Tm_ta, rotation synchronous control timer phase timer Tm_ns and engaging control phase timer Tm_cn.

If the shift control is being progressed, it is judged in Step 602 whether or not it is in a disengaging control phase. If it is in the disengaging control phase, the processing advances to Step 606 to count up the disengaging control phase timer Tm_op. If it is not in the disengaging control phase, the processing advances to Step 603.

If it is not in the disengaging control phase, it is judged in Step 602 whether or not it is in a torque assist control phase. If it is in the torque assist control phase, the processing advances to Step 607 to count up the torque assist control phase timer Tm_ta. If it is not in the torque assist control phase, the processing advances to Step 604.

If it is not in the torque assist control phase, it is judged in Step 604 whether or not it is in a rotation synchronous control phase. If it is in the rotation synchronous control phase, the processing advances to Step 608 to count up the rotation synchronous control phase timer Tm_ns. If it is not in the rotation synchronous control phase, the processing advances to Step 605.

If it is not in the rotation synchronous control phase, it is judged in Step 605 whether or not it is in an engaging control phase. If it is in the engaging control phase, the processing advances to Step 609 to count up the engaging control phase timer Tm_cn. If it is not in the engaging control phase, the processing not executed.

The control content of the disengaging control phase of Step 503 of the shift control by the present embodiment of the system of controlling the vehicle will be described below, referring to FIG. 7, FIG. 8 and FIG. 14.

Figure 7:
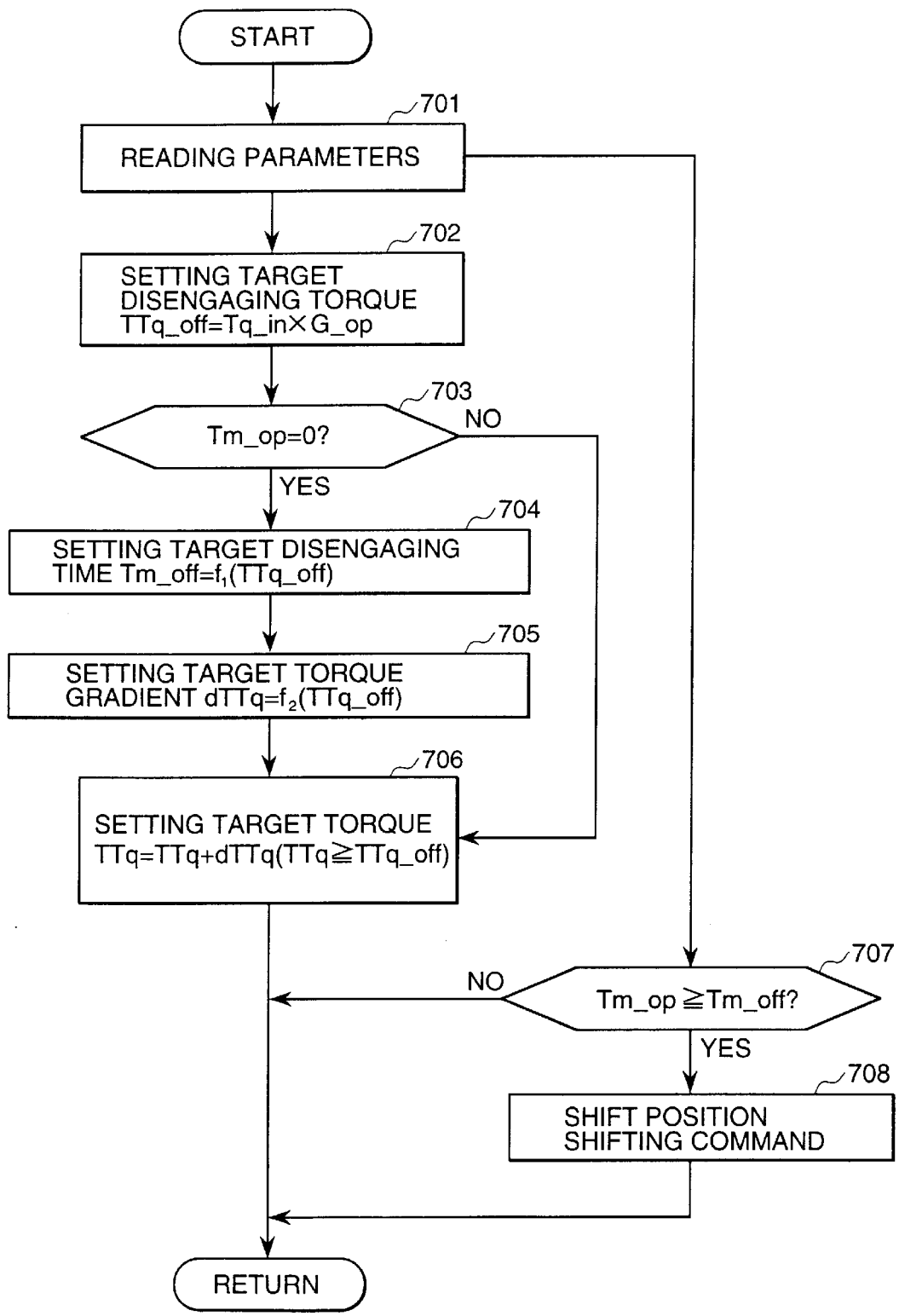
FIG. 7 is a flowchart showing the control content of the disengaging control phase in the shift control by the vehicle control apparatus according to the first embodiment of the present invention.

FIG. 7 is a flowchart showing the control content of the disengaging control phase in the shift control by the system of controlling the vehicle of the first embodiment of the present invention. FIG. 8 is illustrations explaining methods of calculating the target disengaging time Tm_off and the target torque gradient dTTq in the disengaging control phase in the shift control by the system of controlling the vehicle of the first embodiment of the present invention. FIG. 14 is a time chart showing the control content of the shift control by the system of controlling the vehicle of the first embodiment of the present invention.

Figure 14:
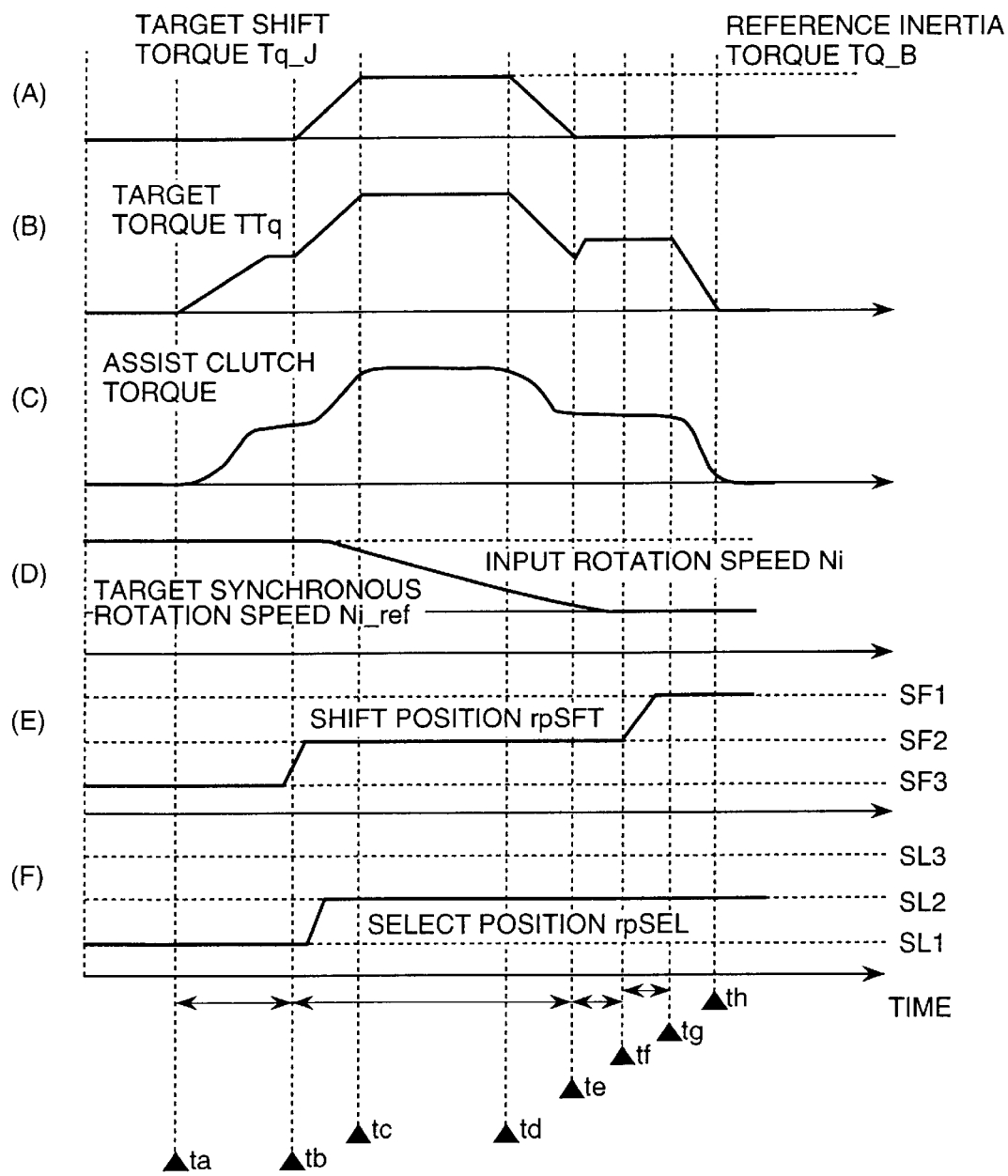
FIG. 14 is a time chart showing the control content of the shift control by the vehicle control apparatus according to the first embodiment of the present invention.

FIG. 14 shows a time chart of the control at up-shift from the second gear position to the third gear position. In FIG. 14, a period from the time point ta to the time point tb corresponds to the disengaging control phase, a period from the time point tb to the time point te corresponds to the torque assist control phase, a period from the time point te to the time point tf corresponds to the rotation synchronous control phase, a period from the time point tf to the time point tg corresponds to the engaging control phase, and a period from the time point tg to the time point th corresponds to the shifting completion phase. FIG. 14(A) shows the target shift torque Tq_J. FIG. 14(B) shows the target torque TTq of the assist clutch of (B). FIG. 14(C) shows the transmitted torque of the assist clutch. FIG. 14(D) shows the input rotation speed Ni and the target synchronizing rotation speed Ni_ref. FIG. 14(E) shows the shift position rpSFT. FIG. 14(F) shows the select position rpSEL.

The control content of the disengaging control phase to be described below are programmed in the computer 100c of the power train control unit 100, and repetitively executed in a predetermined cycle. That is, the processing from Step 701 to 708 described below is executed by the power train control unit 100.

In Step 701 of FIG. 7, the power train control unit 100 reads parameters, and then in Step 702, sets a target disengaging torque TTq_off. The target disengaging torque TTq_off is calculated by multiplying an inpur torque Tq_in by a gain G_op. The input torque Tq_in is calculated by subtracting inertia variation caused by the change ΔNi per unit time in the input rotation speed from the engine torque Te as the base. It is preferable that the gain G_op is set every gear position to be disengaged.

Next, in Step 703, it is judged whether or not it is just after starting the disengaging control phase. If the disengaging control phase timer Tm_op=0, it is regarded as just after starting the disengaging control phase. Then, a target disengaging time Tm_off is set in Step 704, and a target torque gradient dTTq is set in Step 705, and the processing advances to Step 706. Each of the target disengaging time Tm_off and the target torque gradient dTTq is assumed to be a function of the target disengaging torque TTq_off. As shown in FIG. (A), the target disengaging time Tm_off is calculated by inputting the target disengaging torque TTq_off, and is separately set for each gear position to be disengaged. Further, as shown in FIG. (B), the target torque gradient dTTq is calculated by inputting the target disengaging torque TTq_off, and is separately set for each gear position to be disengaged.

On the other hand, in Step 703, if the disengaging control phase timer Tm_op≠0, the processing advances to Step 706.

Next, in Step 706, the target torque TTq of the assist clutch is set. The target torque TTq is asymptotically brought up to the target disengaging torque TTq_off by adding the target torque gradient dTTq set in Step 705 to the preceding target torque TTq.

On the other hand, time judgment is performed in Step 707. If the disengagning control phase timer Tm_op≧the target disengaging time Tm_off, the shift position is shifted in Step 708. In a case of, for example, 2nd to 3rd shifting, the target shift position tpSET is moved from the position SF3 to the position SF2 in FIG. 3.

In the disengaging control phase, as the target torque TTq of the assist clutch shown in FIG. 14(B) rises, the actual assist clutch transmitting torque of FIG. 14(C) rises, and the shift position rpSFT of FIG. 14(E) is started to move from the position SF3 to the position SF2.

The control content of the torque assist control phase of Step 505 of the shift control by the present embodiment of the system of controlling the vehicle will be described below, referring to FIG. 9 to FIG. 11 and FIG. 14.

Figure 10:
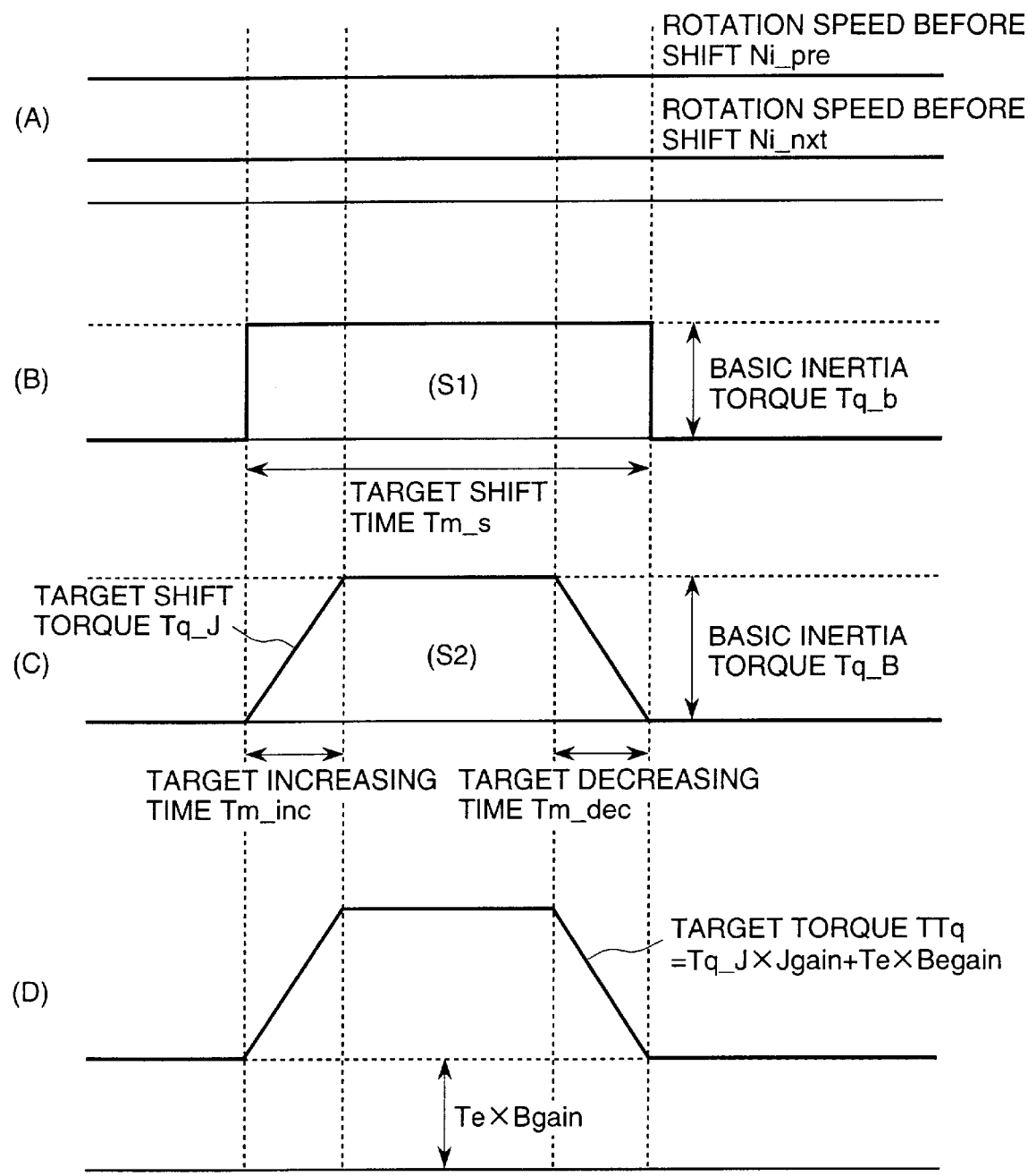
FIG. 10 is a time chart showing the control content of the torque assist control phase in the shift control by the vehicle control apparatus according to the first embodiment of the present invention.

FIG. 9 is a flowchart showing the control content of the torque assist control phase in the shift control by the system of controlling the vehicle of the first embodiment of the present invention. FIG. 10 is a time chart showing the control content of the torque assist control phase in the shift control by the system of controlling the vehicle of the first embodiment of the present invention. FIG. 11 is an illustration explaining methods of calculating the target shift time Tm_s, the target increasing time Tm_inc and the target decreasing time Tm_dec in the torque assist control phase in the shift control by the system of controlling the vehicle of the first embodiment of the present invention.

FIG. 10 shows a case of up-shift (the input rotation speed before shifting Ni_pre>the input rotation speed after shifting Ni_nxt). FIG. 10(A) shows the input rotation speed before shifting Ni_pre and the input rotation speed after shifting Ni_nxt. FIG. 10(B) shows the basic inertia torque Tq_b. FIG. 10(C) shows target shift torque Tq_J. FIG. 10(D) shows the target torque of the assist clutch TTq.

The control content of the torque assist control phase to be described below are programmed in the computer 100c of the power train control unit 100, and repetitively executed in a predetermined cycle. That is, the processing from Step 901 to 911 described below is executed by the power train control unit 100.

In Step 901 of FIG. 9, the power train control unit 100 reads parameters, and then in Step 902, judges by a value of the torque assist control phase timer Tm_ta whether or not it is just after starting of the torque assist control phase. If the torque assist control phase timer Tm_ta=0, it is judged that it is just after starting the torque assist control phase. Then, Step 903, Step 904, Step 905 and Step 906 are executed, and after that, the processing advances to Step 907. If the torque assist control phase timer Tm_ta≠0, the processing advances to Step 907.

Figure 11A:
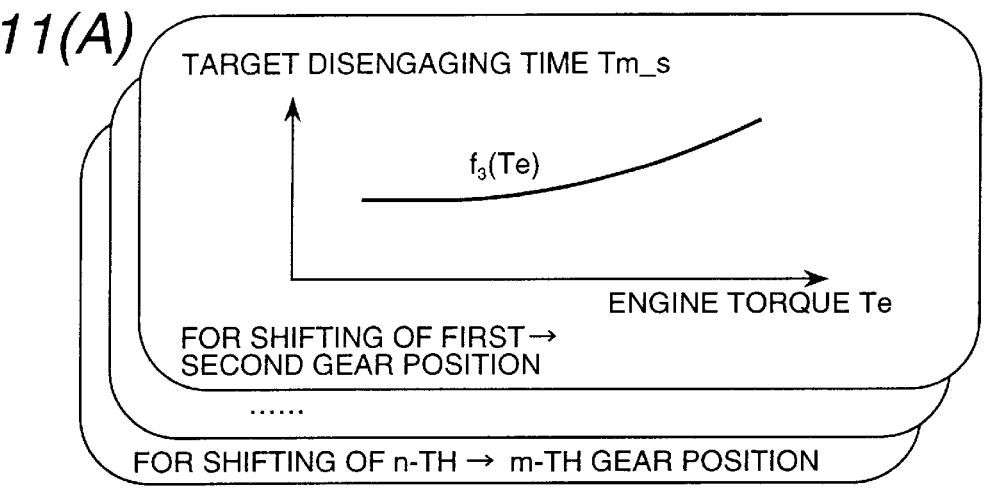
FIG. 11 is an illustration showing a calculating method of the target shift time Tm_s, the target increasing time Tm_inc and the target decreasing time Tm_dec in the torque assist control phase in the shift control by the vehicle control apparatus according to the first embodiment of the present invention.

In Step 903 (the target shift time setting processing), the target shift time Tm_s is set. The target shift time Tm_s is assumed to be a function of the engine torque Te. As shown in FIG. 11(A), the target shift time Tm_s is calculated by inputting the engine torque Te, and is separately set for each shifting pattern.

Figure 11B:
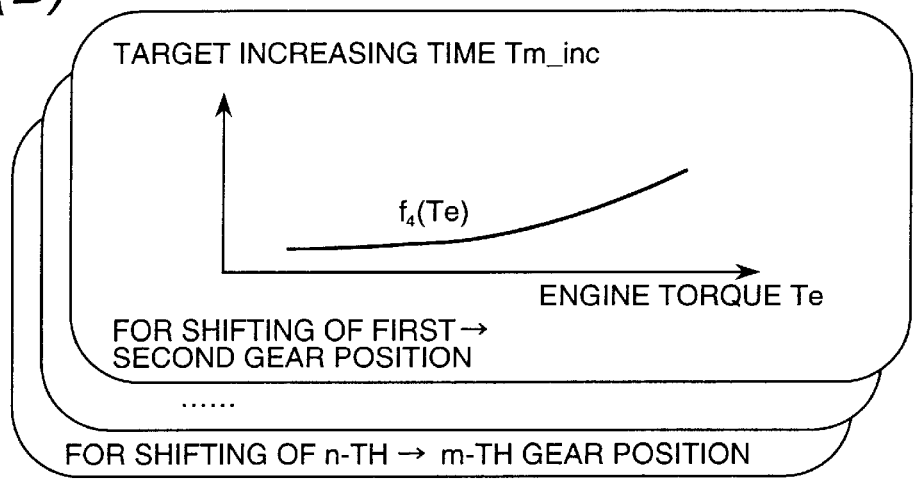
Figure 11C:
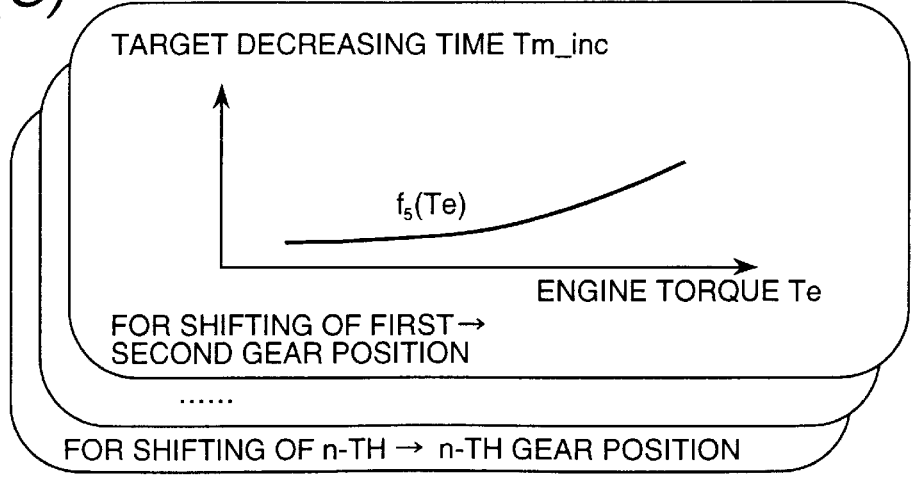

Next, in Step 904 (the target increasing time setting processing, and the target decreasing time setting processing), the target increasing time Tm_inc and the target decreasing time Tm_dec shown in FIG. 10(C) are set. As shown in FIG. 11(B) and FIG. 11(C), each of the target increasing time Tm_inc and the target decreasing time Tm_dec is assumed to be a function of the engine torque Te. As shown in FIG. 11(B) and FIG. 11 (C), the target shift time Tm_s is calculated by inputting the engine torque Te, and is separately set for each shifting pattern.

Next, in Step 905, the basic inertia torque Tq_b shown in FIG. 10(C) is calculated. The basic inertia torque Tq_b is a torque necessary for shifting from the rotation speed Ni_pre equivalent to an input power before shifting to the rotation speed Ni_nxt equivalent to an input power after shifting. Letting an inertia coefficient from the engine to the input shaft be J, and the unit conversion coefficient be a, the basic inertia torque Tq_b of the torque necessary for shifting becomes J×(Ni_pre−Ni_nxt)×α/Tm_s.

Next, in Step 906, a reference inertia torque Tq_B shown in FIG. 10(C) is calculated. The reference inertia torque Tq_B is a torque which has an area equal to an area of the basic inertia torque Tq_b×the target shift time Tm_s when the reference inertia torque Tq_B increases (decreases, in the case of downshift) in the target increasing time Tm_inc and decreases (increases, in the case of downshift) in the target decreasing time Tm_dec within the target shift time Tm_s, and calculated according to the equation shown in Step 906 of FIG. 9. The reference inertia torque Tm_B when the reference inertia torque Tq_B is increased in the target increasing time Tm_inc and decreased in the target decreasing time Tm_dec within the target shift time Tm_s is calculated so that the area S1 of FIG. 10 (B) may become equal to the area S2 of FIG. 10(C). At that time, a torque which increases from 0 to the reference inertia torque Tq_B in the target increasing time Tm_inc and decreases from the reference inertia torque Tq_B to 0 in the target decreasing time Tm_dec becomes the target shift torque Tq_J. Further, the correction in the calculation of reference inertia torque Tq_B is vehiclericd out by assist torque learning correction value LatDSTTq. the calculation method of the assist torque learning correction value LatDSTTq will be described later with reference to FIG. 16.

Step 907, Step 908, Step 909 and Step 910 are the target shift torque setting processing. In Step 907, classification of cases is performed using the torque assist control phase timer Tm_ta to determine the method of calculating the target shift torque Tq_J. If the torque assist control phase timer Tm_ta<the target increasing time Tm_inc, the processing advances to Step 908. If the torque assist control phase timer Tm_ta<the target shift time Tm_s−the target decreasing time Tm_dec, the processing advances to Step 909. If the case is a case other than the above, the processing advances to Step 910.

When the torque assist control phase timer Tm_ta<the target increasing time Tm_inc, in Step 908 the target shift torque Tq_J is increased up to the reference inertia torque Tq_B in the target increasing time Tm_inc (decreased down when down-shifting). It is set that the target shift torque Tq_J=the reference inertia torque Tq_B×the torque assist control phase timer Tm_ta/the target increasing time Tm_inc.

When the torque assist control phase timer Tm_ta<the target shift time Tm_s−the target decreasing time Tm_dec, in Step 909 it is set that the target shift torque Tq_J=the reference inertia torque Tq_B.

In the cases other than the above, in Step 910 the target shift torque Tq_J is decreased down to 0 in the target decreasing time Tm_dec (increased up when down-shifting). It is set that the target shift torque Tq_J=the reference inertia torque Tq_B×(the target shift time Tm_s−the torque assist control phase timer Tm_ta)/the target decreasing time Tm_dec.

Next, in Step 911, the target torque TTq of the assist clutch shown in FIG. 10(D) is calculated. It is set that the target torque TTq=the target shift torque Tq_J×the shift torque adjustment gain Jgain+the engine torque Te×the engine torque adjustment gain Bgain. It is preferable that each of the shift torque adjustment gain Jgain and the engine torque Te×the engine torque adjustment gain Bgain is set for each shifting pattern. Further, it is preferable that each of the shift torque adjustment gain Jgain and the engine torque Te×the engine torque adjustment gain Bgain is a function of the input torque (or the engine torque) before shifting.

As shown in FIG. 14(E), when the shift position rpSFT is close to the position SF2 (the time tb), the control phase becomes the torque assist control phase. In the torque assist control phase, as the target shift torque Tq_J of FIG. 14(A) increases up to the reference inertia torque Tq_B and then decreases down to 0, the assist clutch target torque of FIG. 14(B) increases up and then decreases down. As the assist clutch target torque TTq of FIG. 14(B) increases up and then decreases down, the actual transmitting torque of the assist clutch of FIG. 14(C) is increased and decreased, and the input rotation speed Ni of FIG. 14(D) is decreased. Thereby, the input rotation speed Ni can be controlled while the target shift torque Tq_J is satisfied. Further, the select position rpSEL of FIG. 14(F) is shifted from the position SL1 to the position SL2.

Although in the description of FIG. 9, the target shift torque Tq_J is calculated using the target increasing time Tm_inc and the target decreasing time Tm_dec, the target shift torque Tq_J may be calculated by setting a target increasing torque and a target decreasing torque.

Further, the target shift torque Tq_J may be calculated by inputting a rotation speed difference before shifting (the input rotation speed before shifting Ni_pre–the input rotation speed after shifting Ni_nxt) instead of the engine torque Te. Further, the target shift torque Tq_J may be calculated by inputting an accelerator opening degree instead of the engine torque Te.

The control content of the rotation synchronous control phase of Step 509 of the shift control by the present embodiment of the system of controlling the vehicle will be described below, referring to FIG. 12 and FIG. 14.

FIG. 12 is a time chart showing the control content of the rotation synchronous control phase in the shift control by the system of controlling the vehicle of the first embodiment of the present invention.

The control content of the rotation synchronous control phase to be described below are programmed in the computer 100c of the power train control unit 100, and repetitively executed in a predetermined cycle. That is, the processing from Step 1201 to 1210 described below is executed by the power train control unit 100.

In Step 1201, the power train control unit 100 reads parameters, and then in Step 1202, judges by a value of the rotation synchronous control phase timer Tm_ns whether or not it is just after starting of the rotation synchronous control phase. If the rotation synchronous control phase timer Tm_ns=0, it is judged that it is just after starting the rotation synchronous control phase. Then, Step 1203 is executed, and after that, the processing advances to Step 1204. If the rotation synchronous control phase timer Tm_ns 0, the processing advances to Step 1204.

When it is just after starting the rotation synchronous control phase, in Step 1203, a proportional correction gain Kp and an integral correction gain Ki for rotation speed feedback are set. There, it is preferable that each of the proportional correction gain Kp and the integral correction gain Ki is separately set for each shifting pattern or for each target gear position.

Next, in Step 1204, the target synchronizing rotation speed (the target input rotation speed) Ni_ref is set. The target synchronizing rotation speed is to be a value around the input rotation speed calculated by multiplying the output rotation speed No by the gear ratio Gm after shifting.

Next, in Step 1205, a difference Ni_err between the target synchronizing rotation speed Ni_ref and the input rotation speed Ni is calculated, and then in Step 1206, an integral value Ni_errI of the rotation speed difference Ni_err is calculated.

Next, in Step 1207, a proportional correction value DNi_p and an integral correction value DNi_i are calculated using the rotation speed difference Ni_err, the rotation speed difference integral value Ni_errI, the proportional correction gain Kp and the integral correction gain Ki.

Next, in Step 1208, a feedback torque Tq_FB is set. Letting the inertia coefficient from the engine to the input shaft be J, and the unit conversion coefficient be α, the feedback torque Tq_FB is calculated by J×(DNi_p–DNi_i)×α.

Next, in Step 1209, a feed-forward torque Tq_FF is set. It is set that the feed-forward torque Tq_FF=the engine torque Te×the engine torque adjustment gain Bgain. Similarly to FIG. 9 (the torque assist control phase), it is preferable that the engine torque adjustment gain Bgain is set for each shifting pattern. Further, it is preferable that the engine torque adjustment gain Bgain is a function of the engine torque.

Next, in Step 1210, the assist clutch target torque TTq is set. The target torque TTq is set as TTq=Tq_FB+Tq_FF using the feedback torque Tq_FB and the feed-forward torque Tq_FF.

In the rotation synchronous control phase, the actual assist clutch transmitting torque of FIG. 14(C) is controlled by changing the target torque TTq of the assist clutch of FIG. 14(B) so that the input rotation speed Ni of FIG. 14(D) may follow the target synchronizing rotation speed Ni_ref.

The control content of the engaging control phase of Step 511 of the shift control by the present embodiment of the system of controlling the vehicle will be described below, referring to FIG. 13 and FIG. 14.

Figure 13:
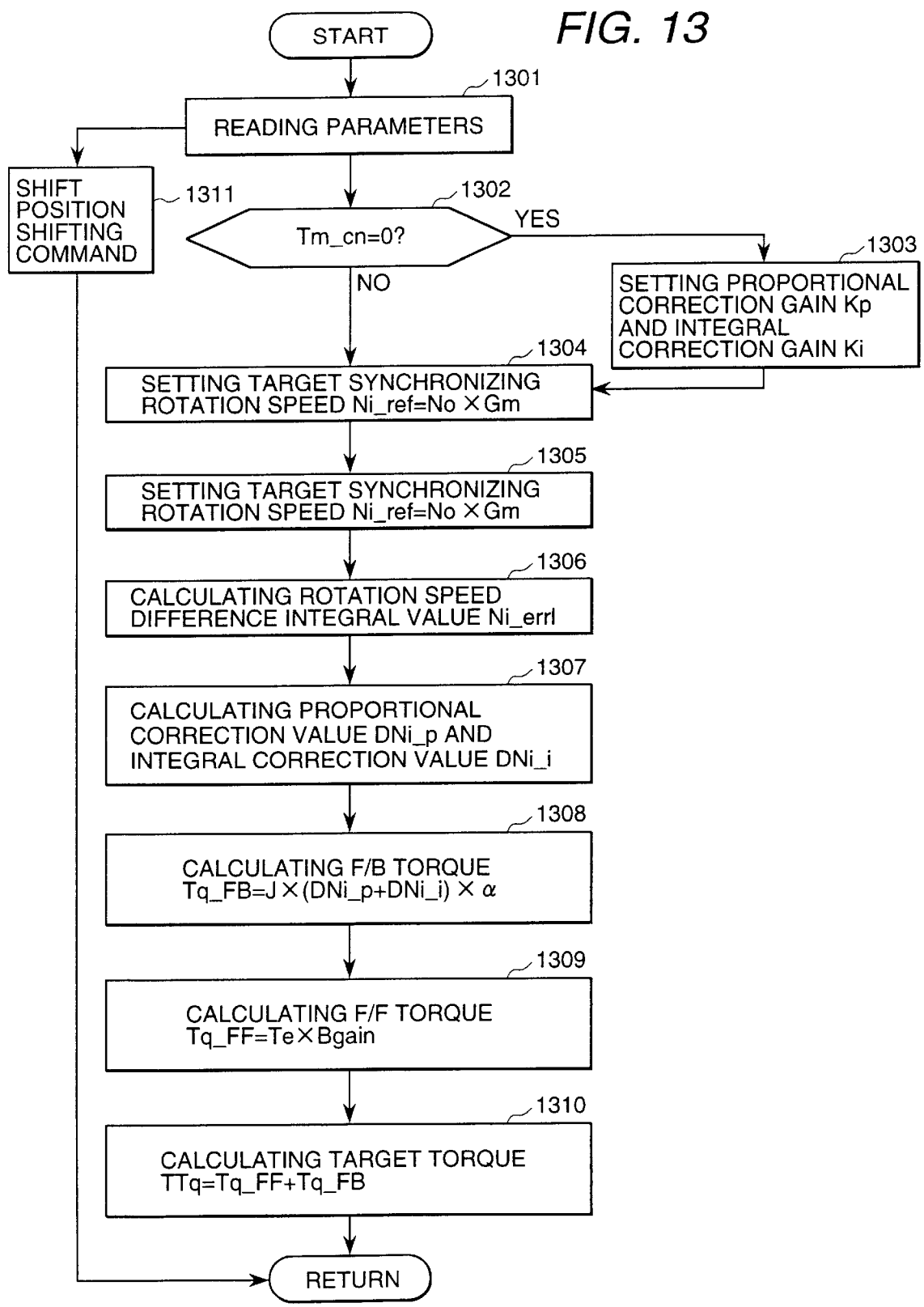
FIG. 13 is a time chart showing the control content of the engaging control phase in the shift control by the vehicle control apparatus according to the first embodiment of the present invention.

FIG. 13 is a time chart showing the control content of the engaging control phase in the shift control by the system of controlling the vehicle of the first embodiment of the present invention.

The control content of the engaging control phase to be described below are programmed in the computer 100c of the power train control unit 100, and repetitively executed in a predetermined cycle. That is, the processing from Step 901 to 911 described below is executed by the power train control unit 100.

In Step 1301 of FIG. 13, the power train control unit 100 reads parameters, and then in Step 1302, judges by a value of the engaging control phase timer Tm_cn whether or not it is just after starting of the engaging control phase. If the engaging control phase timer Tm_cn=0, it is judged that it is just after starting the engaging control phase. Then, Step 1303 is executed, and after that, the processing advances to Step 1304. If the engaging control phase timer Tm_cn 0, the processing advances to Step 1304.

In Step 1303, a proportional correction gain Kp and an integral correction gain Ki for rotation speed feedback are set. There, similarly to FIG. 12 (the rotation synchronous control phase), it is preferable that each of the proportional correction gain Kp and the integral correction gain Ki is separately set for each shifting pattern or for each target gear position.

Next, in Step 1304, the target synchronizing rotation speed Ni_ref for the rotation speed feedback is set. The target synchronizing rotation speed is to be a value around the input rotation speed calculated by multiplying the output rotation speed No by the gear ratio Gm after shifting.

Next, in Step 1305, a difference Ni_err between the target synchronizing rotation speed Ni_ref and the input rotation speed Ni is calculated, and then in Step 1306, an integral value Ni_errI of the rotation speed difference Ni_err is calculated.

Next, in Step 1307, a proportional correction value DNi_p and an integral correction value DNi_i are calculated using the rotation speed difference Ni_err, the rotation speed difference integral value Ni_errI, the proportional correction gain Kp and the integral correction gain Ki.

Next, in Step 1308, a feedback torque Tq_FB is set. Letting the inertia coefficient from the engine to the input shaft be J, and the unit conversion coefficient be α, the feedback torque Tq_FB is calculated by J×(DNi_p–DNi_i)×α.

Next, in Step 1309, a feed-forward torque Tq_FF is set. It is set that the feed-forward torque Tq_FF=the engine torque Te×the engine torque adjustment gain Bgain. Similarly to FIG. 9 (the torque assist control phase) and to FIG. 12 (the rotation synchronous control phase), it is preferable that the engine torque adjustment gain Bgain is set for each shifting pattern. Further, it is preferable that the engine torque adjustment gain Bgain is a function of the engine torque.

Next, in Step 1310, the assist clutch target torque TTq is set. The assist clutch target torque TTq is set as TTq=Tq_FB+Tq_FF using the feedback torque Tq_FB and the feed-forward torque Tq_FF.

On the other hand, the shift position is shifted in Step 1311. In a case of, for example, 2 3 shifting, the target shift position tpSET is moved from the position SF3 to the position SF2 in FIG. 3.

In the engaging control phase, the actual assist clutch transmitting torque of FIG. 14(C) is controlled by changing the target torque TTq of the assist clutch of FIG. 14(B) so that the input rotation speed Ni of FIG. 14(D) may further follow the target synchronizing rotation speed Ni_ref, and the shift position rpSFT of FIG. 14(E) is shifted from the position SF2 to the position SF1. The control phase becomes the shifting completion phase at the time tg when shifting of the shift position rpSFT to the position SF1 is completed, and the target torque TTq of the assist clutch of FIG. 14(B) becomes 0 to complete the shift control.

The shift time when there is no correction by assist torque learning correction value LatDSTTq in Step 906 of FIG. 8 in the shift control by the vehicle control apparatus according to the present embodiment will be explained with reference to FIG. 15.

Figure 8A:
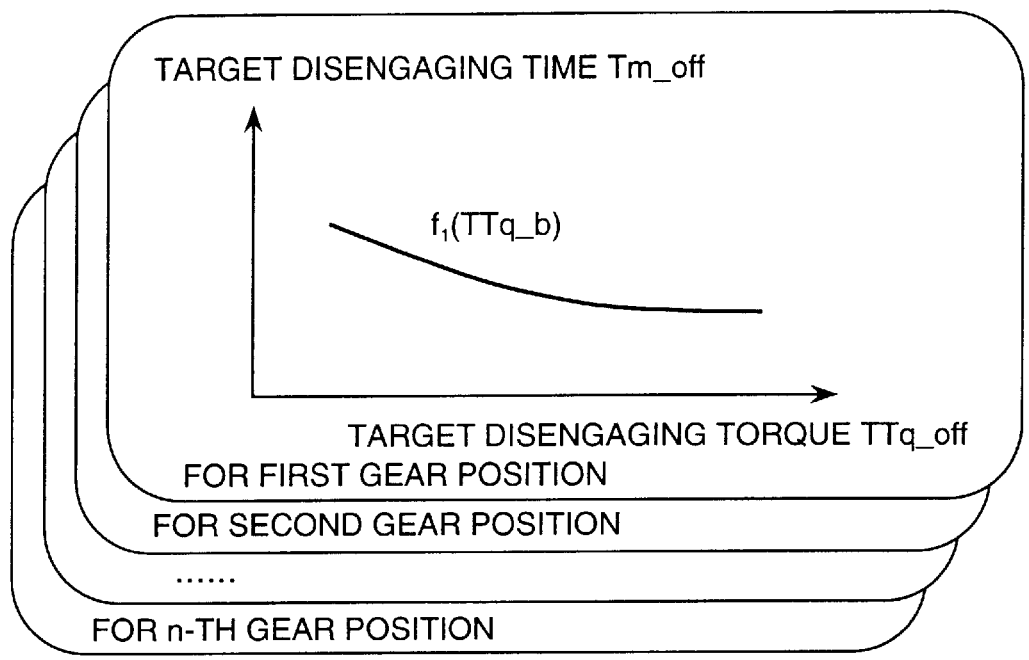
FIG. 8 is an illustration of calculating methods of the target disengaging time Tm_off and the target torque gradient dTTq in the disengaging control phase in the shift control by the vehicle control apparatus according to the first embodiment of the present invention.
Figure 8B:
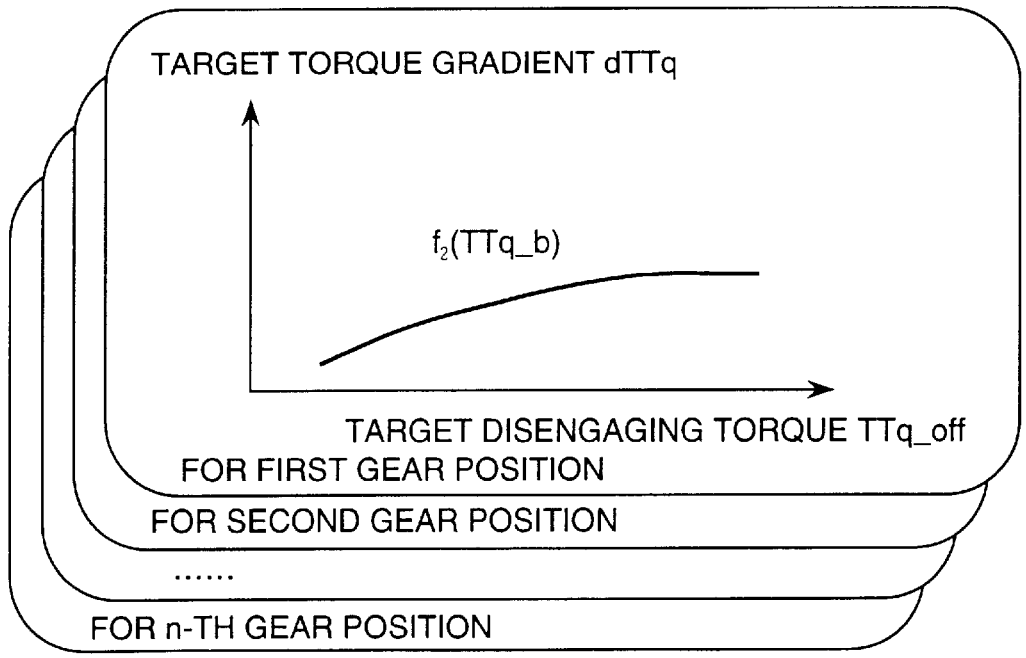
Figure 15:
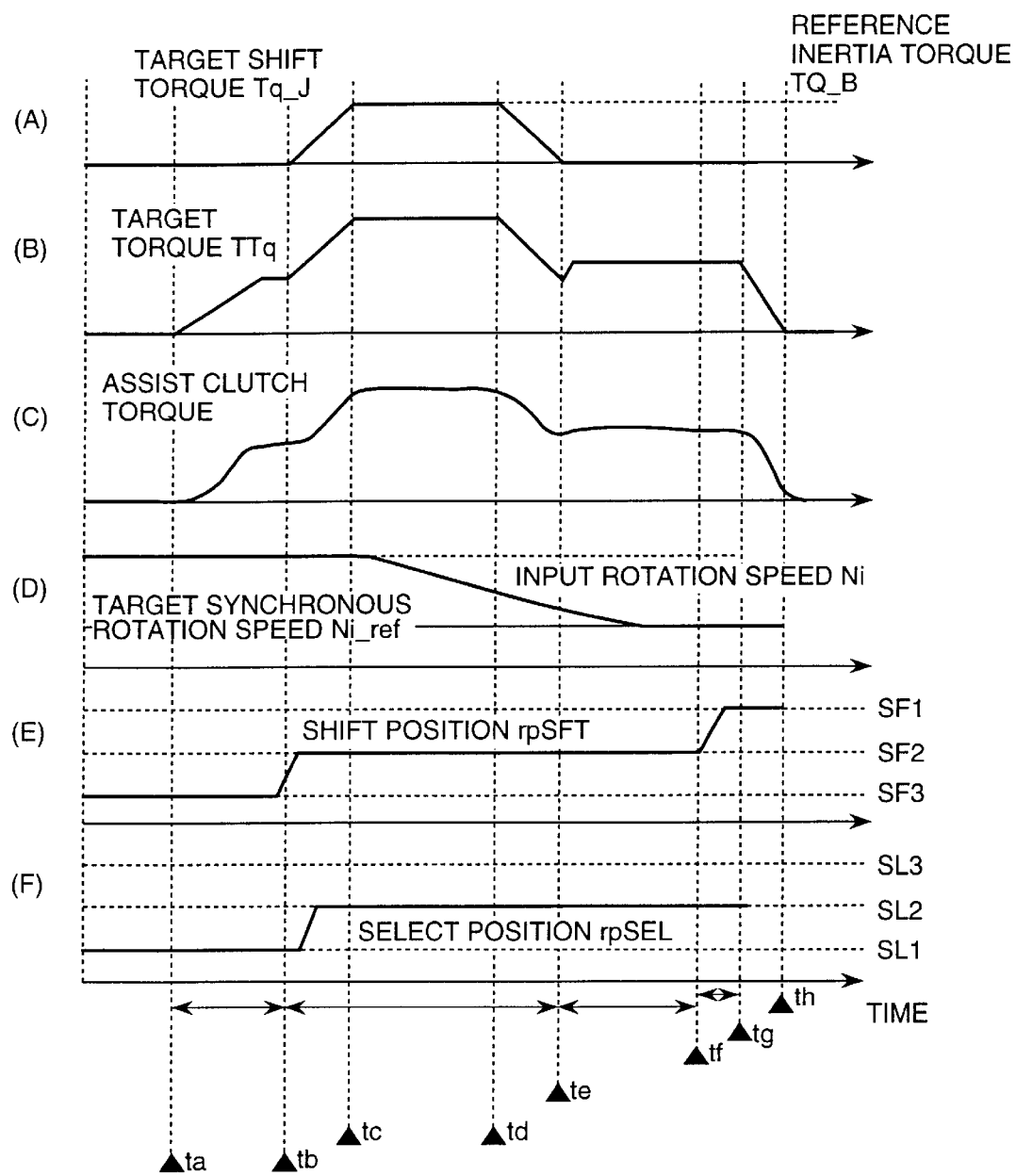
FIG. 15 is a time chart showing the control content when there is no correction by assist torque learning correction value LatDSTTq in Step 906 of FIG. 8 in the shift control by the vehicle control apparatus according to the first embodiment of the present invention.

FIG. 15 is a time chart showing the control content when there is no correction by assist torque learning correction value LatDSTTq in Step 906 of FIG. 8 in the shift control by the vehicle control apparatus according to the first embodiment of the present invention.

FIG. 15 shows the time chart during up-shifting from the 2nd gear position to the 3rd gear position, and shows an example of the shift time extended by the machine difference between assist clutches and the deterioration with age.

Compared with the example shown in FIG. 14, the decrease in input rotation speed Ni of FIG. 15(D) is slower. The time until input rotation speed Ni synchronizes with target synchronous rotation speed Ni_ref is longer. Therefore, the required time of the rotation synchronous control phase from time te to time tf becomes longer, and the entire shift time is longer.

On the other hand, when the shift time shortens contrary to the example shown in FIG. 15, the decrease in input rotation speed Ni becomes faster oppositely. Therefore, the striking-feeling occurs at shifting due to the increase of the inertia torque caused by the change in input rotation speed Ni, and shift quality deteriorates.

Next, the content of the correction value calculating processing in the shift control by the vehicle control apparatus according to the present embodiment will be explained with reference to FIG. 16 and FIG. 17.

Figure 16:
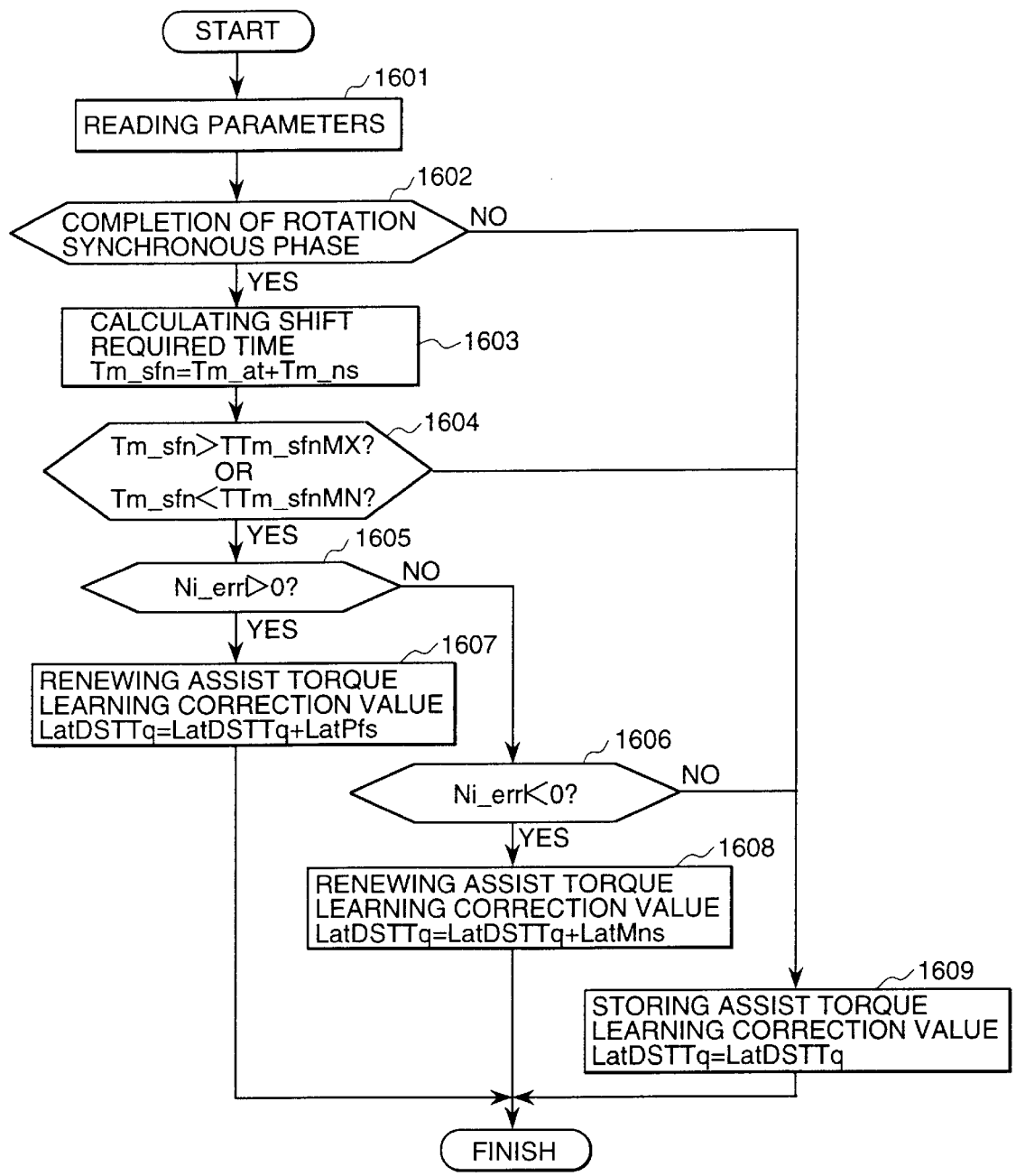
FIG. 16 is a flow chart showing the content of the correction value calculating processing in the shift control by the vehicle control apparatus according to the first embodiment of the present invention.

FIG. 16 is a flow chart showing the content of the correction value calculating processing in the shift control by the vehicle control apparatus according to the first embodiment of the present invention. FIG. 17 is an illustration showing a calculating method of the target shift required time upper limit TTm_sfnMX and the target shift required time lower limit TTm_sfnMN in the correction value calculating processing in the shift control by the vehicle control apparatus according to the first embodiment of the present invention.

The content of the following correction value calculating processing is programmed in computer 100c of power train control unit 100, and carried out at a predetermined repeatedly. That is, the processing of the following Steps 1601–1609 is executed by power train control unit 100.

In Step 1601 of FIG. 16, power train control unit 100 reads parameters, and next judges whether the rotation synchronous phase ends in Step 1602.

When the rotation synchronous phase has ended in Step 1602, the processing advances to Step 1603. When the rotation synchronous phase does not end, the processing advances to Step 1609. In the Step, the value of assist torque learning correction LatDSTTq is stored, and the processing is completed.

When the rotation synchronous phase has ended, required shift time Tm_sfn is calculated in Step 1603. Required shift time Tm_sfn is assumed to be the time required from the open control to the engagement control. In the example of FIG. 16, required shift time Tm_sfn is calculated as the sum of torque assist control phase timer Tm_at and rotation synchronous control phase timer Tm_ns. Required shift time Tm_sfn may be calculated by the time when shift position rpSFT is a neutral position. Moreover, required shift time Tm_sfn may be calculated by the time when the command value of the assist clutch is one except the open command.

Next, it is judged whether required shift time Tm_sfn is within the fixed range in Step 1604. The processing advances to Step 1605 when required shift time Tm_sfn is larger than target required shift time upper limit TTm_sfnMX or when required shift time Tm_sfn is smaller than target required shift time lower limit TTm_sfnMN. Otherwise, the processing advances to Step 1609, and assist torque learning correction value LatDSTTq is stored, and the processing is completed.

Figure 17A:
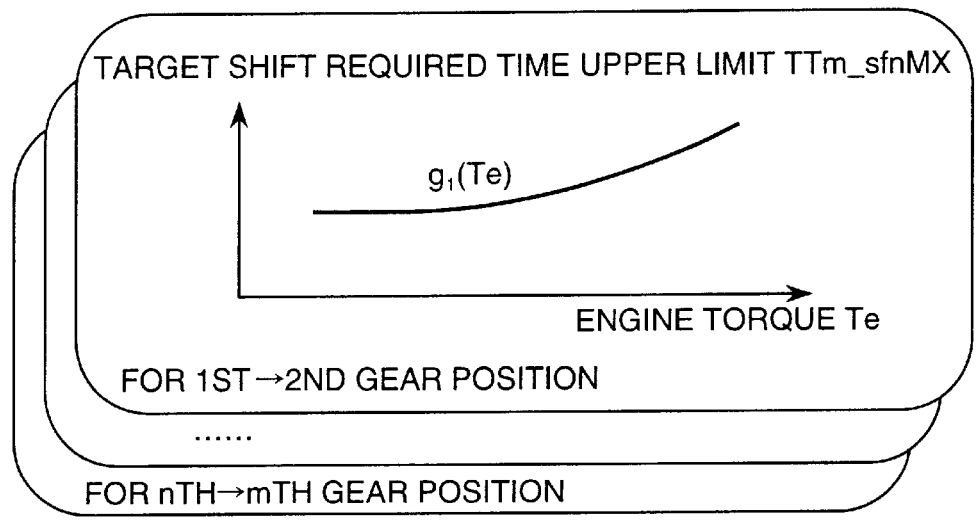
FIG. 17 is an illustration showing a calculating method of the target shift required time upper limit TTm_sfnMX and the target shift required time lower limit TTm_sfnMN in the correction value calculating processing in the shift control by the vehicle control apparatus according to the first embodiment of the present invention.
Figure 17B:
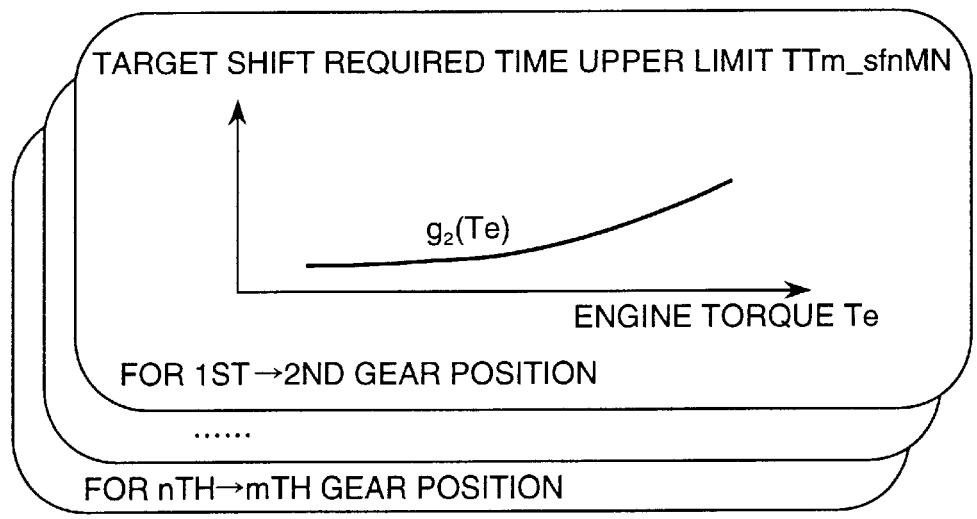

Here, target required shift time upper limit TTm_sfnMX and target required shift time lower limit TTm_sfnMN are calculated by using the engine torque Te as an input respectively as shown in FIG. 17(A) and FIG. 17(B). Further, this is set separately in each shifting pattern. Moreover, It is possible to calculate it by using the before-shifting rotation difference (input rotation speed Ni_pre before shifting–input rotation speed Ni_nxt after shifting) as an input instead of the engine torque Te. Further, it is possible to calculate by using amount Aps of the accelerator pedal control as an input instead of the engine torque Te.

Next, in Step 1605 and Step 1606, a large and small relation between target synchronous rotation speed Ni_ref and input rotation speed Ni is provided depending on the sign of rotation speed difference integral value Ni_errI calculated in Step 1206 of FIG. 12.

The processing advances to Step 1607 when rotation speed difference integral value Ni_errI>0. In the Step, the processing is ended by adding positive side correction value LatPls to assist torque learning correction value LatDSTTq, and updating assist torque learning correction value LatDSTTq.

The processing advances to Step 1608 when rotation speed difference integral value Ni_errI<0. In the Step, the processing is ended by adding negative side correction value LatMns to assist torque learning correction value LatDSTTq, and updating assist torque learning correction value LatDSTTq.

the processing advances to Step 1609 when rotation speed difference integral value Ni_errI=0. In the Step, assist torque learning correction value LatDSTTq is stored, and processing is ended. Here, positive side correction value LatPls and negative side correction value LatMns are assumed to be the predetermined constants or the table structure of the parameters indicative of the state of the transmission. Further, it is preferable that these are separately set by the shifting pattern. Moreover, it is preferable to update assist torque learning correction value LatDSTTq by dividing according to the operation area of the assist clutch.

It is possible to judge whether required shift time Tm_sfn is larger than the target required shift time in Step 1604 by setting the target required shift time instead of target required shift time upper limit TTm_sfnMX and target required shift time lower limit TTm_sfnMN in Step 1604. Alternatively, it is possible to judge whether required shift time Tm_sfn is smaller than the target required shift time in Step 1604 by setting the target required shift time instead of target required shift time upper limit TTm_sfnMX and target required shift time lower limit TTm_sfnMN in Step 1604.

By constructing as described above, it is possible to shift as shown in FIG. 14 to improve the shift quality by preventing the required shift time from becoming long or oppositely short even if the machine difference between assist clutches or the deterioration with age occurs.

Next, the content of the control when the transfer characteristics of the assist clutch is changed by the vehicle control apparatus according to this embodiment will be explained with reference to FIG. 18–FIG. 20.

Figure 18:
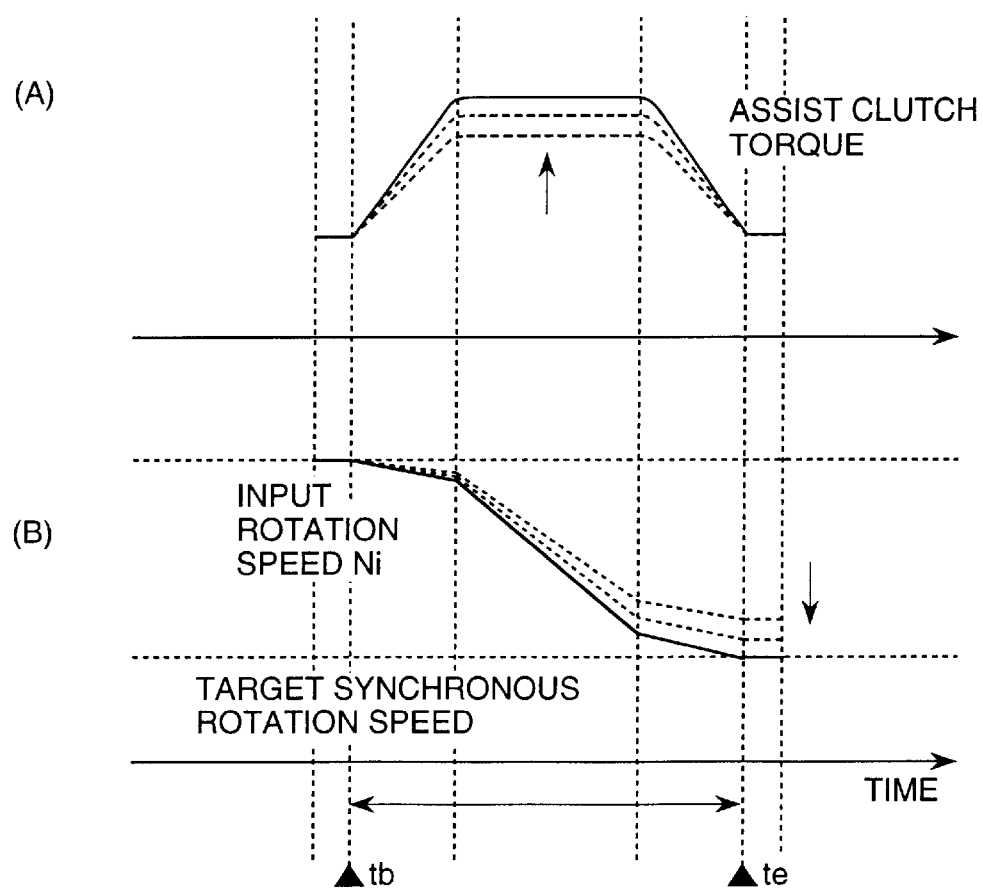
FIG. 18 is an illustration showing the content of the control when the transfer characteristics of the assist clutch is changed into a smaller value by vehicle control apparatus according to the first embodiment of the present invention.

FIG. 18 is an illustration showing the content of the control when the transfer characteristics of the assist clutch is changed into a smaller value by vehicle control apparatus according to the first embodiment of the present invention. FIG. 19 is an illustration showing the content of the control when transfer characteristics of the assist clutch is changed into a larger value by vehicle control apparatus according to the first embodiment of the present invention. FIG. 20 is an illustration showing the transition of the shift time when the transfer characteristics of the assist clutch is changed by vehicle control apparatus according to the first embodiment of the present invention.

FIG. 18 shows the change in input rotation speed Ni and assist clutch torque by the learning correction in the torque assist control phase (corresponding to time tb–time te in FIG. 15) when the transfer torque characteristics of the assist clutch is changed into a smaller value by the replacement of the assist clutch or the exchange of the assist clutch hydraulic operating fluid.

Whenever shifting is repeated, assist clutch torque increases in the torque assist control phase as shown in FIG. 18(A). Input rotation speed Ni approaches gradually target synchronous rotation speed Ni_ref at the end (time te) of the torque assist control phase as shown in FIG. 18(B). The time required of the rotation synchronous control phase after time te shortens, and the required shift time can be shortened because the rotation speed difference becomes small at the end (time te) of the torque assist control phase.

Figure 19:
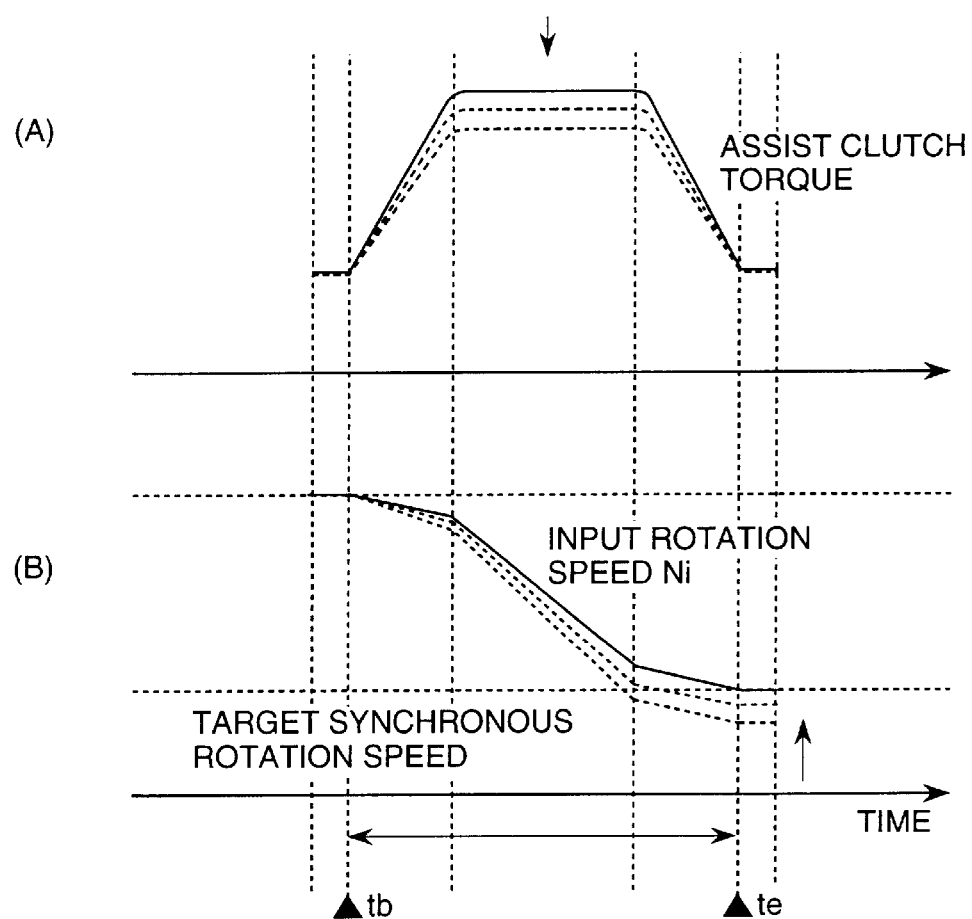
FIG. 19 is an illustration showing the content of the control when transfer characteristics of the assist clutch is changed into a larger value by vehicle control apparatus according to the first embodiment of the present invention.

FIG. 19 shows the change in input rotation speed Ni and assist clutch torque by the learning correction in the torque assist control phase (corresponding to time tb–time te in FIG. 15) when the transfer torque characteristics of the assist clutch is changed into a larger value by the replacement of the assist clutch or the exchange of the assist clutch hydraulic operating fluid.

Whenever shifting is repeated, assist clutch torque increases in the torque assist control phase as shown in FIG. 19(A). Input rotation speed Ni approaches gradually target synchronous rotation speed Ni_ref at the end (time te) of the torque assist control phase as shown in FIG. 19(B). The time required of the rotation synchronous control phase after time te shortens, and the required shift time can be shortened because the rotation speed difference becomes small at the end (time te) of the torque assist control phase. While, the end time (time te) of the torque assist control phase becomes early, because input rotation speed Ni decreases fast. As a result, it is possible to avoid generating the striking-feeling because the inertia torque increases.

Figure 20:
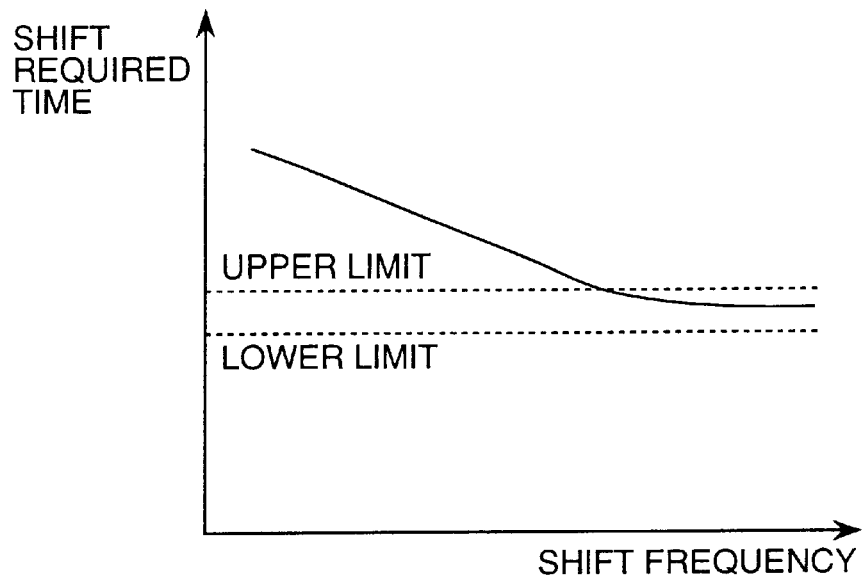
FIG. 20 is an illustration showing the transition of the shift time when the transfer characteristics of the assist clutch is changed by vehicle control apparatus according to the first embodiment of the present invention.

When the transfer torque characteristics of the assist clutch is changed by the replacement of the assist clutch or the exchange of the assist clutch hydraulic operating fluid, the required shift time is shortened whenever shifting is repeated as shown in FIG. 20 and it settles between the target required shift time lower limit and the target required shift time upper limit as shown in FIG. 18 or FIG. 19. Similarly, the required shift time gradually becomes long whenever shifting is repeated also when the required shift time is smaller than the target required shift time lower limit, and it settles between the target required shift time lower limit and the target required shift time upper limit.

As described above, it is possible to avoid the decrease of the shift quality by preventing the time required to synchronize the rotation speeds from becoming long or short even if the machine difference between assist clutches or the deterioration with age occurs. Further, it is possible to improve the shift quality by suppressing the time required to synchronize the rotation speeds from becoming long or short even when the characteristics is changed by the replacement of the assist clutch or the exchange of the assist clutch hydraulic operating fluid.

The configuration and the operation of a vehicle control apparatus according to the present embodiment will be explained below, referring to FIG. 21 to FIG. 27.

Figure 26:
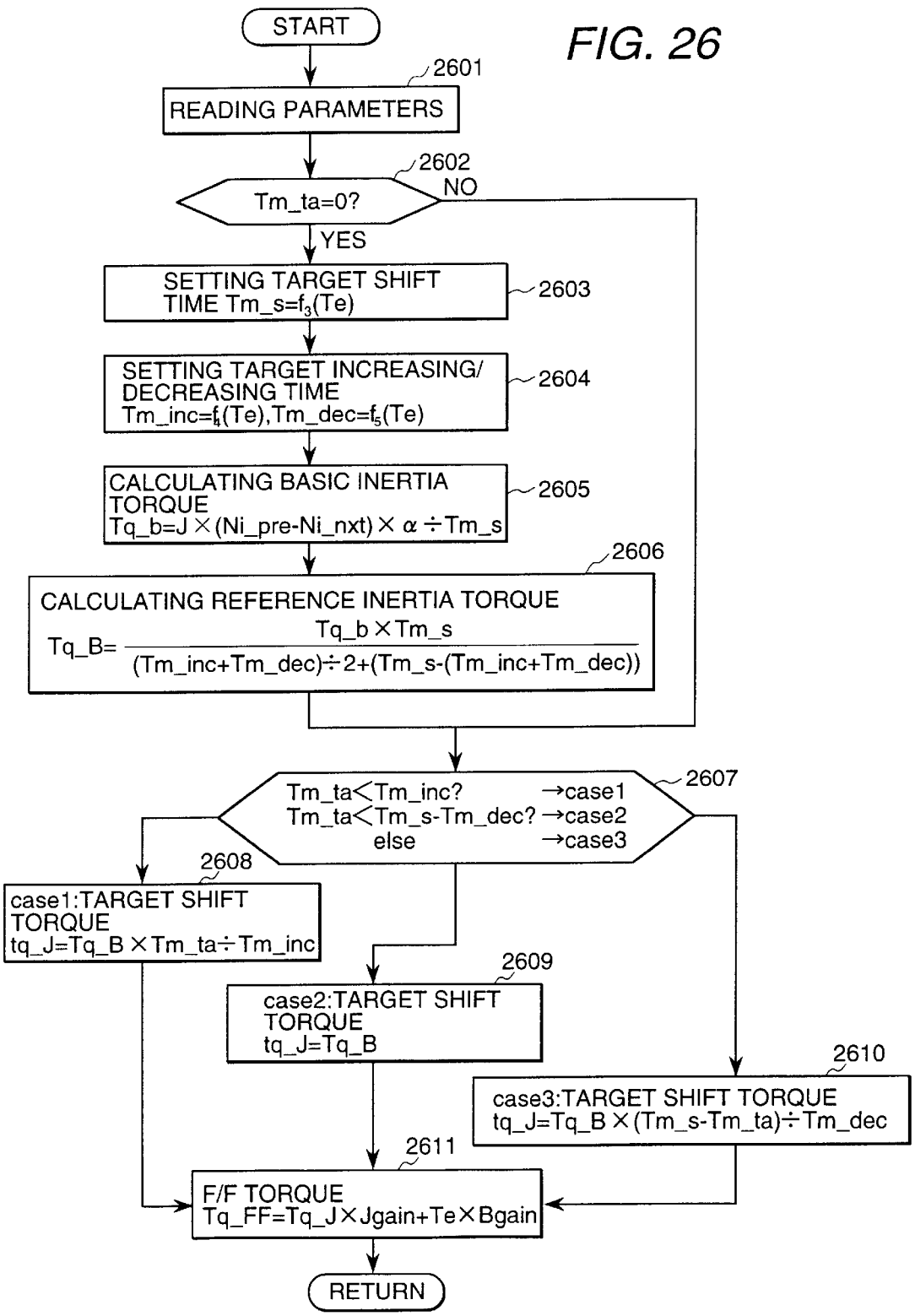
FIG. 26 is an illustration showing the content of the control of the torque assist control phase in the shift control by the vehicle control apparatus according to the second embodiment of the present invention.
Figure 27:
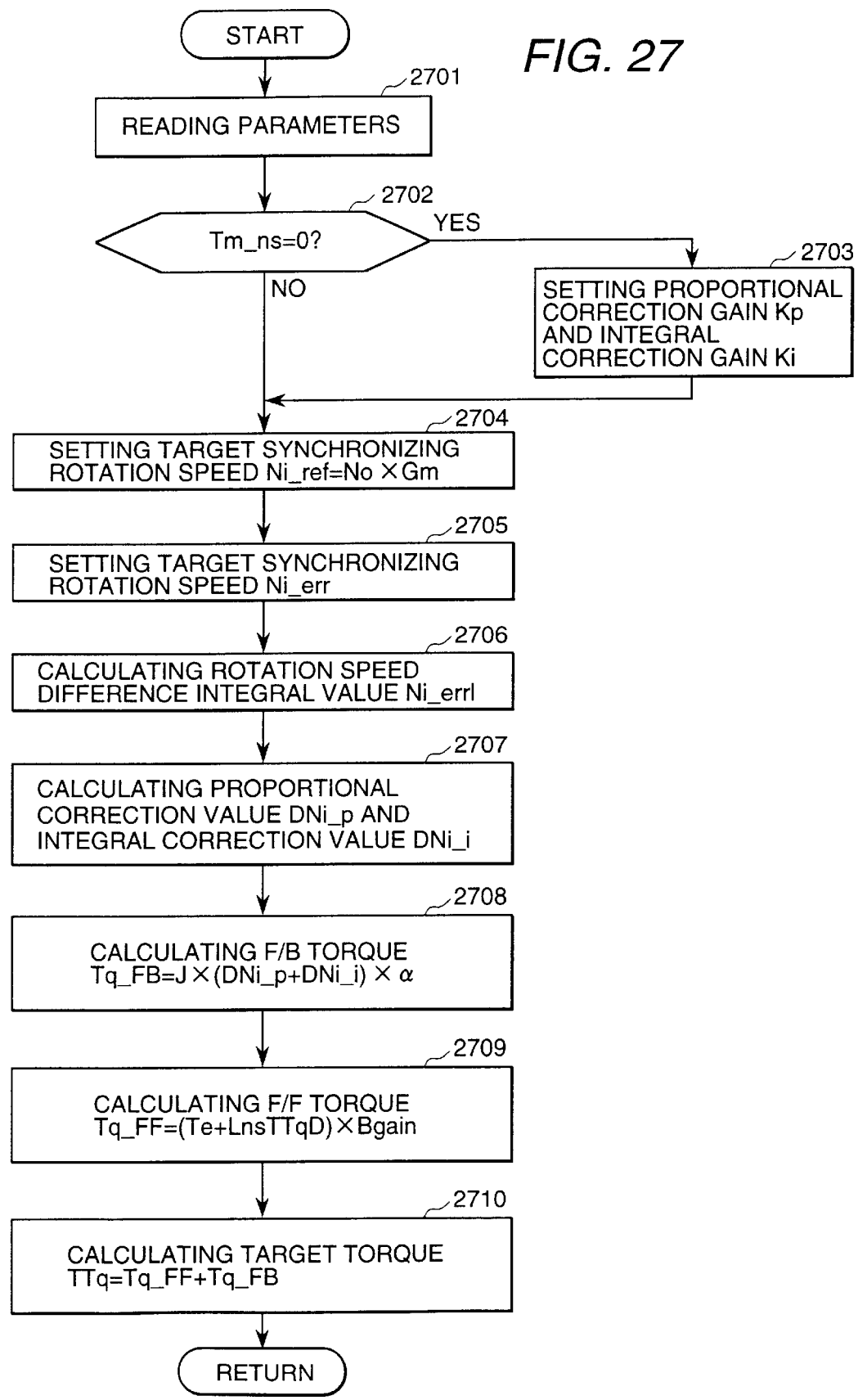
FIG. 27 is an illustration showing the content of the control of the rotation synchronous control phase in the shift control by the vehicle control apparatus according to the second embodiment of the present invention.

Here, the configuration of a vehicle control apparatus according to second embodiment is similar to that shown in FIG. 1 or FIG. 2. The engaging relationship between the clutch and the driven gear in the present embodiment is similar to that shown in FIG. 3. The input-output signal relationship by the communication means 103 among the power train control unit 100, the engine control unit 101 and the hydraulic pressure control unit 102 in the control apparatus of the vehicle according to the present embodiment is similar to that shown in FIG. 4. The overall control content of the vehicle control apparatus according to the present embodiment are similar to those shown in FIG. 5. The content of the timer indicative of the elapsed time of the shift control by the vehicle control apparatus according to the present embodiment are similar to those shown in FIG. 6. The control content of the disengaging control phase of Step 503 of the shift control by the vehicle control apparatus according to the present embodiment are similar to those shown in FIG. 7, FIG. 8 and FIG. 14. Although the control content of the torque assist control phase of Step 505 of the shift control by the vehicle control apparatus according to the present embodiment are similar to those shown in FIGS. 9 to FIG. 11 and FIG. 14, the control content described later with reference to FIG. 26 is adopted instead of that of FIG. 9. Although the control content of the rotation synchronous control phase of Step 509 of the shift control by the vehicle control apparatus according to the present embodiment are similar to those shown in FIG. 12 and FIG. 14, the control contenthown in FIG. 27 is adopted instead of that of FIG. 12. The control content of the engaging control phase of Step 511 of the shift control by the vehicle control apparatus according to the present embodiment are similar to those shown in FIG. 13 and FIG. 14. The content of the correction value calculating processing is different from that shown in FIG. 16.

First, the shift time when there is no correction by assist torque learning correction value LatDSTTq in Step 906 of FIG. 9 in the shift control by the vehicle control apparatus according to the second embodiment of the present invention will be explained with reference to FIG. 21.

Figure 21:
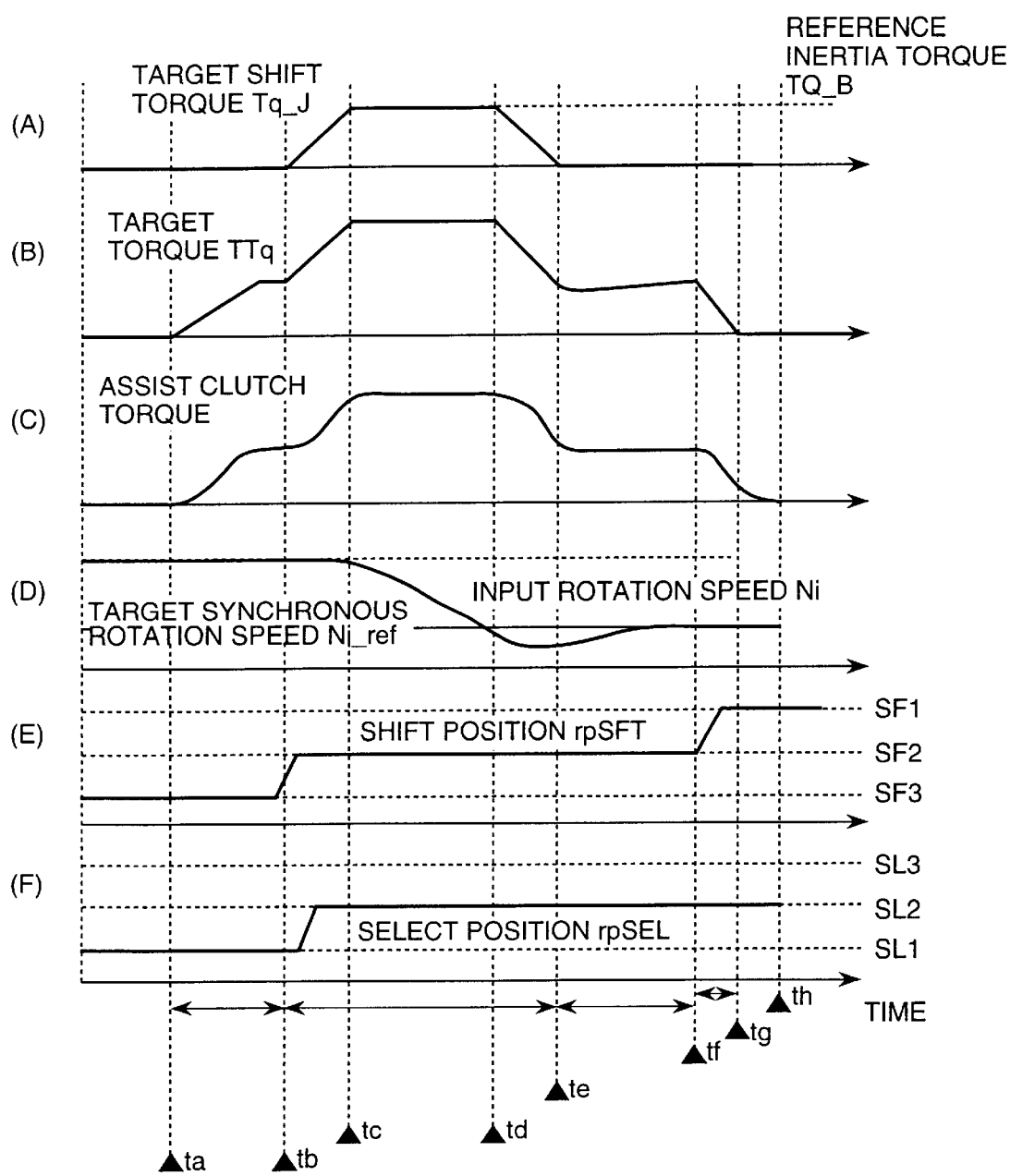
FIG. 21 is a time chart showing the control content when there is no correction by assist torque learning correction value LatDSTTq in Step 906 of FIG. 9 in the shift control by the vehicle control apparatus according to the second embodiment of the present invention.

FIG. 21 is a time chart showing the control content when there is no correction by assist torque learning correction value LatDSTTq in Step 906 of FIG. 9 in the shift control by the vehicle control apparatus according to the second embodiment of the present invention.

FIG. 21 shows a time chart of up-shift from the 2nd gear position to the 3rd gear position, and shows the example when the input torque changes and the shift time becomes long by the machine difference of engine 1 or the deterioration with age.

The decrease in input rotation speed Ni of FIG. 21(D) is earlier than that of FIG. 14, as shown in FIG. 21. Input rotation speed Ni is dropped far more than target synchronous rotation speed Ni_ref. Therefore, the time until input rotation speed Ni synchronizes with target synchronous rotation speed Ni_ref is long, the time required of the rotation synchronous control phase from time te to time tf becomes long. As a result, the entire shift time becomes long.

Next, the content of the processing of the correction value calculating processing in the shift control by the vehicle control apparatus according to this embodiment will be explained with reference to FIG. 22–FIG. 27.

Figure 22:
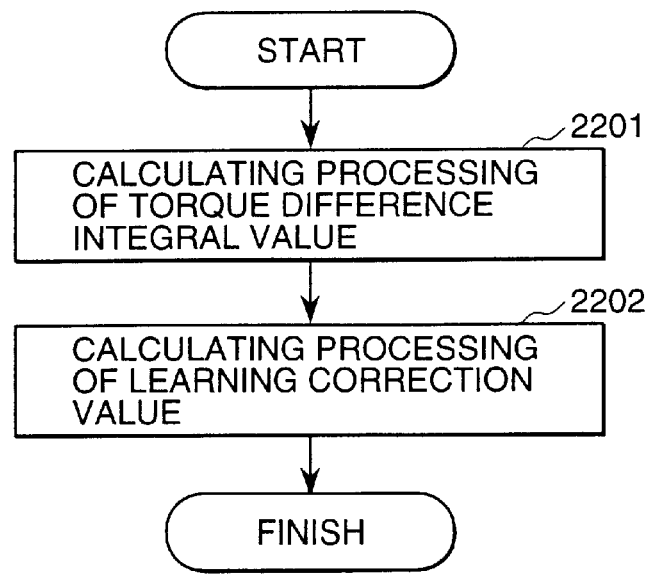
FIG. 22 is a flow chart showing the content of the correction value calculating processing in the shift control by the vehicle control apparatus according to the second embodiment of the present invention.
Figure 23:
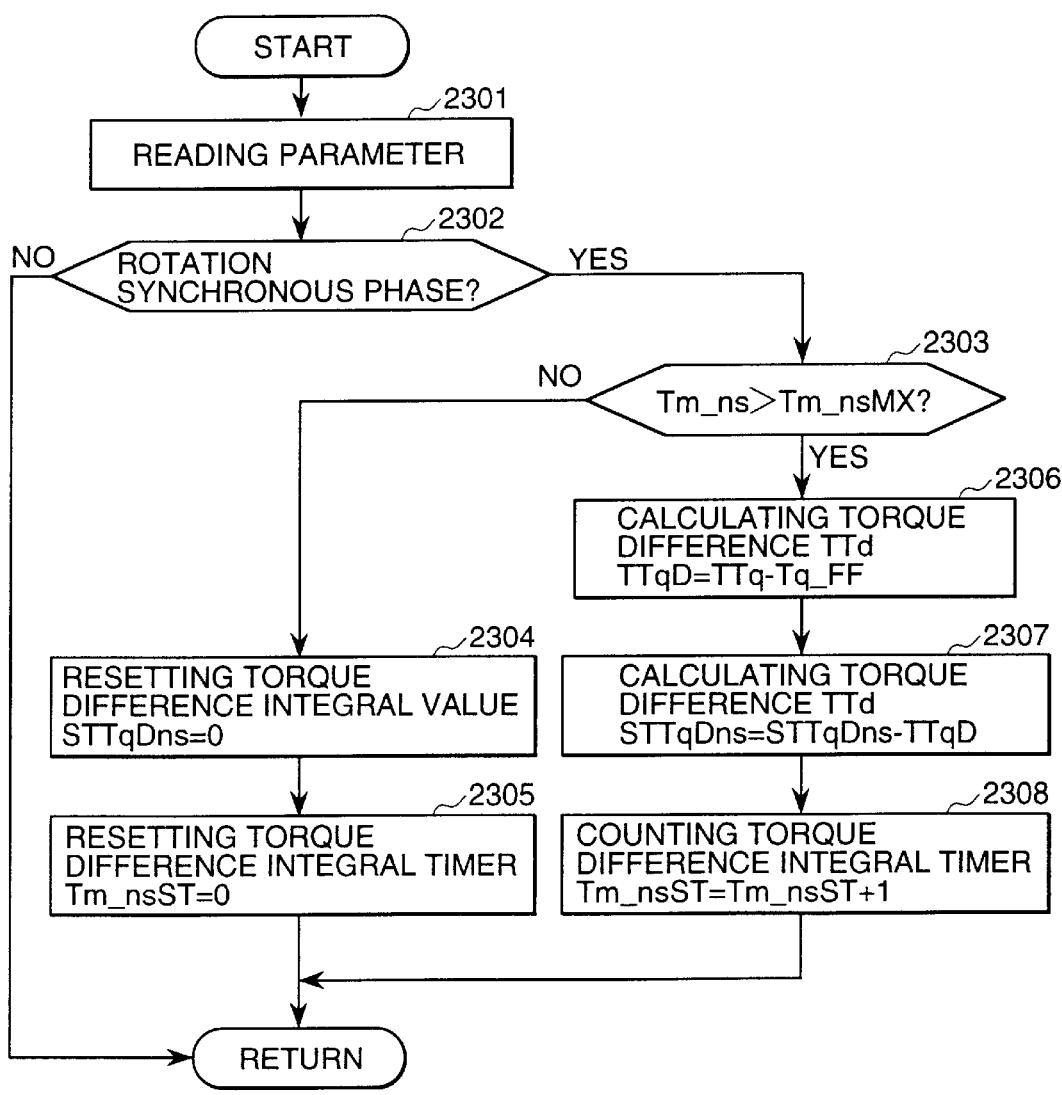
FIG. 23 is a flow chart showing the content of the torque difference integral value calculating processing shown in FIG. 22.
Figure 24:
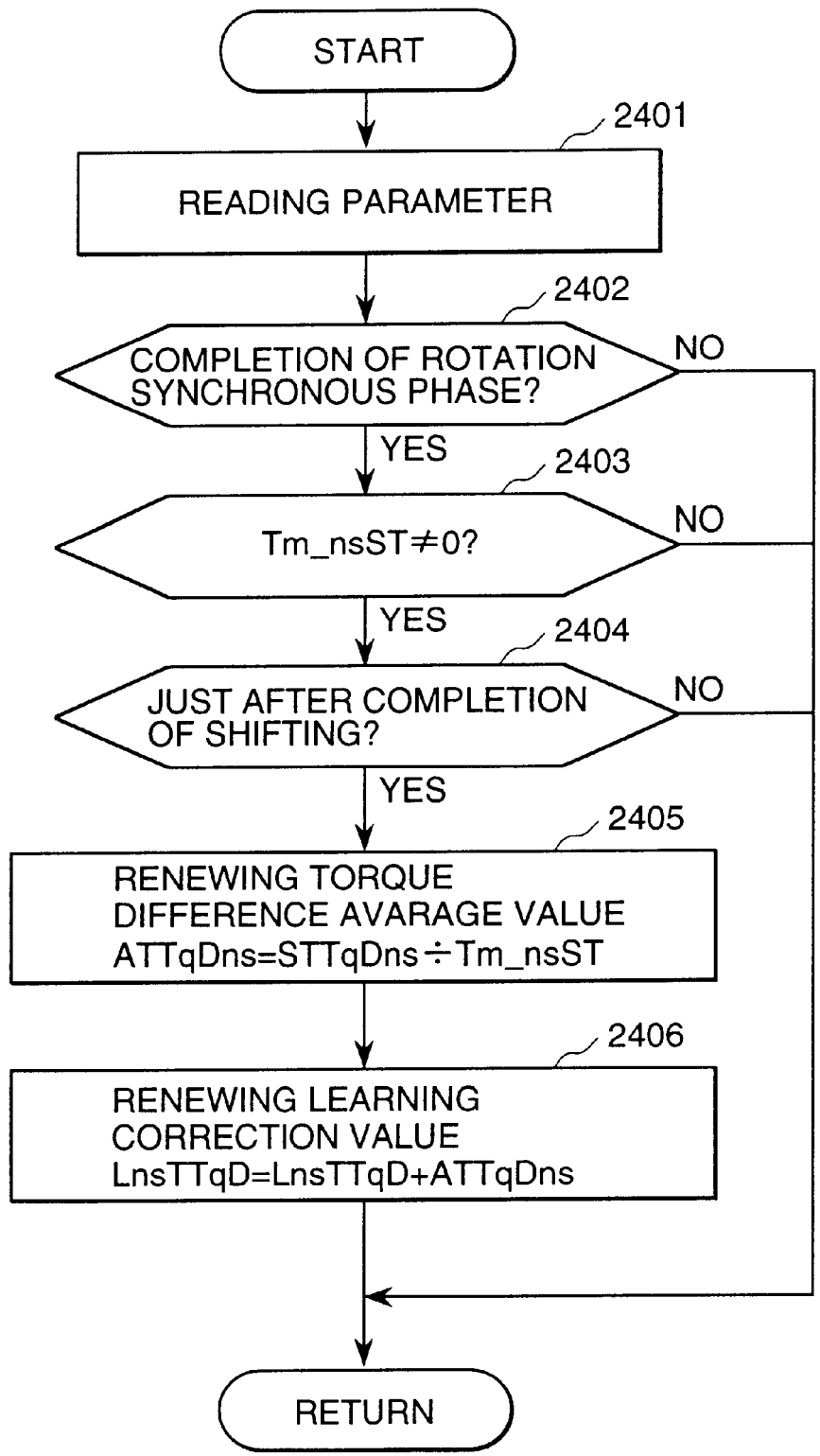
FIG. 24 is a flow chart showing the content of the learning correction value calculating processing shown in FIG. 22.
Figure 25:
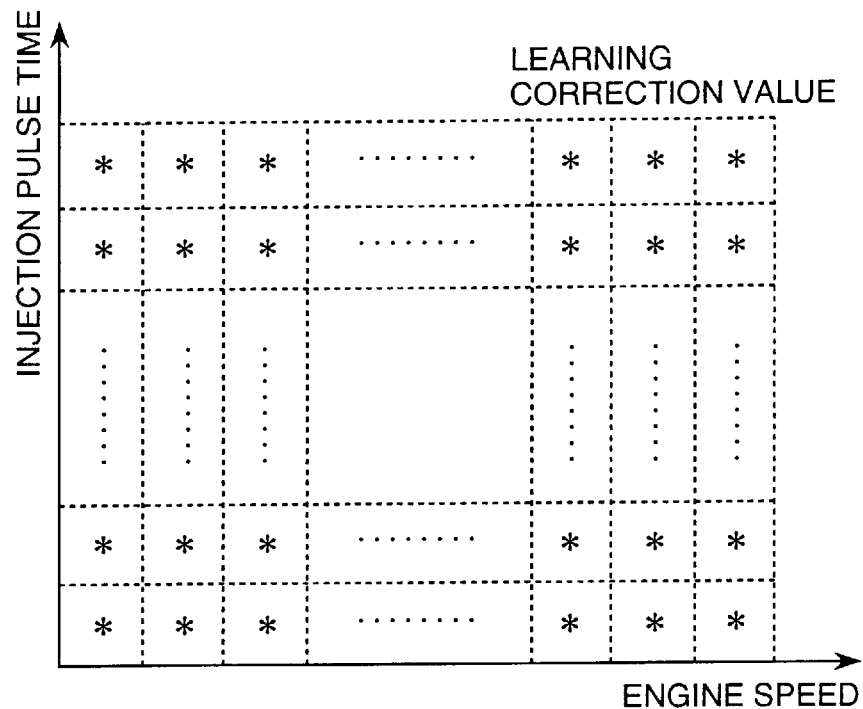
FIG. 25 is an illustration showing a renewing method of the learning correction value in the shift control by the vehicle control apparatus according to the second embodiment of the present invention.

FIG. 22 is a flow chart showing the content of the correction value calculating processing in the shift control by the vehicle control apparatus according to the second embodiment of the present invention. FIG. 23 is a flow chart showing the content of the torque difference integral value calculating processing shown in FIG. 22. FIG. 24 is a flowchart showing the content of the learning correction value calculating processing shown in FIG. 22. FIG. 25 is an illustration showing a renewing method of the learning correction value in the shift control by the vehicle control apparatus according to the second embodiment of the present invention.

The control content of the correction value calculating processing are programmed in the computer 100c of the power train control unit 100, and repetitively executed in a predetermined cycle. That is, the processing from Step 2201 to 2202 described below is executed by the power train control unit 100.

The correction value calculating processing in Step 514 shown in FIG. 5 is composed of the torque difference integral value calculating processing in Step 2201 and the learning correction value calculating processing in Step 2202 in this embodiment. The content of each processing is described later with reference to FIG. 23 and FIG. 24. Step 2201 and Step 2202 are called as the subroutine in the correction value calculating processing.

Here, the detailed content of the calculating processing of the torque difference integral value in Step 2201 of FIG. 22 will be explained with reference to FIG. 23.

The power train control unit 100 reads parameters in Step 2301, and judges whether it is in a rotation synchronous phase in Step 2302. If it is in the rotation synchronous phase, the processing advances to Step 2303. Otherwise, the processing is ended.

When it is in the rotation synchronous phase, it is judged whether the time required of a rotation synchronous phase is long in Step 2303. When rotation synchronous control phase timer Tm_ns>rotation synchronous phase required upper limit time Tm_nsMX, the processing advances to Step 2306. When the rotation synchronous control phase timer Tm_ns≦the rotation synchronous phase required upper limit time Tm_nsMX, It is assumed torque difference integral value STTqDns=0 in Step 2304, and torque difference integrating timer Tm_nsST=0 in Step 2305, and then the processing is ended.

When rotation synchronous control phase timer Tm_ns>rotation synchronous phase required upper limit time Tm_nsMX, the processing advances to Step 2306. Torque difference TTqD between target torque TTq and feedforward command value torque Tq_FF is calculated in Step 2306.

Next, the torque difference integral value STTqDns is updated as torque difference integral value STTqDns+TTqD in Step 2307.

In addition, torque difference integrating timer Tm_nsST is counted up in Step 2308, and The processing is ended. Here, rotation synchronous phase required upper limit time Tm_nsMX is calculated by inputting the engine torque Te. Moreover, this is set separately in each shifting pattern. Further, it may be calculated by inputting the rotation speed difference before shifting (the input rotation speed before shifting Ni_pre-the input rotation speed after shifting Ni_nxt) instead of the engine torque Te. Further, it may be calculated by inputting an accelerator pedal control amount Aps instead of the engine torque Te.

After the end of the processing of FIG. 23, the processing returns to correction value calculating processing 514 of FIG. 22, and the next Step 2202 is executed.

Next, the content of the calculating processing of the learning correction value of Step 2202 in FIG. 22 will be explained with reference to FIG. 24.

The power train control unit 100 reads parameters in Step 2401, and judges whether the rotation synchronous phase is ended in Step 2402. The processing advances to Step 2403 when the rotation synchronous phase has ended. Otherwise, the processing is ended.

Next, it is judged whether torque difference integrating timer Tm_nsST is counted up in Step 2403. The processing advances to Step 2404 when torque difference integrating timer Tm_nsST is counted up (≠0). While, the processing is ended when torque difference integrating timer Tm_nsST=0.

Next, it is judged in Step 2404 whether it is immediately after the shifting ends. The processing advances to Step 2405 immediately after the shifting ends, otherwise the processing is ended.

Next, the torque difference integral value STTqDns calculated in Step 2307 and Step 2308 of FIG. 23 is divided with torque difference integrating timer Tm_nsST to obtain torque difference average value ATTqDns in Step 2405.

Next, the learning correction LnsTTqD is updated as learning correction LnsTTqD+torque difference average value ATTqDns, and the processing is ended in Step 2406.

Here, it is preferable to update learning correction value LnsTTqD after the upper limit and the lower limit of torque difference average value ATTqDns are limited to a fixed value in Step 2406. Further, it is preferable to update learning correction value LnsTTqD after torque difference average value ATTqDns is multiplied by the gain for adjusting the amount of the learning correction.

In addition, it is preferable to update learning correction LnsTTqD with dividing the area by the operation area in the drive force source. When the drive force source is engine 1, it is preferable to update learning correction value LnsTTqD of each area after making the map structure by dividing the area according to the injection pulse width of engine 1 and engine rotation speed Ne, etc. as shown in FIG. 25. Other parameters indicative of the state of engine 1 such as a command value of the throttle opening or the engine torque, etc. may be used here instead of the injection pulse width.

Next, the content of the control of the torque assist control phase in the shift control by the vehicle control apparatus according to this embodiment will be explained with reference to FIG. 26.

FIG. 26 is an illustration showing the content of the control of the torque assist control phase in the shift control by the vehicle control apparatus according to the second embodiment of the present invention.

In Step 2601, the power train control unit 100 reads parameters, and then in Step 2602, judges whether it is just after starting of the torque assist control phase. If the the torque assist control phase timer Tm_ta=0, Step 2603, Step 2604, Step 2605 and Step 2606 are executed, and after that, the processing advances to Step 2607. If the torque assist control phase timer Tm_ta≠0, the processing advances to Step 2607.

The target shift time Tm_s is set in Step 2603 (target shift time setting processing) immediately after the starting of the torque assist control phase. Target shift time Tm_s is assumed to be a function of the engine torque Te as well as FIG. 9.

Next, the target increase time Tm_inc and target decrease time Tm_dec are set in Step 2604 (target increase time setting processing and target decrease time setting processing). Both target increase time Tm_inc and target decrease time Tm_dec are assumed to be a function of the engine torque Te as well as FIG. 8.

Next, when shifting from rotation speed Ni_pre corresponding to the input before the shifting to rotation speed Ni_nxt corresponding to the input after the shifting during target shift time Tm_s, the necessary torque for the shifting is calculated in Step 2605. Assumed that the inertia coefficient from the engine to the input shaft is J and the unit conversion coefficient is á, the torque necessary for the shifting or basic inertia torque becomes Tq_b is J×(Ni_pre−Ni_nxt)×á÷Tm_s. That is, the basic inertia torque Tq_b>0 for the up-shift and the basic inertia torque becomes Tq_b<0 for the downshift. Where, input rotation speed Ni_pre before the shifting=output rotation speed No×the gear ratio before the shifting, and input rotation speed Ni_nxt after the shifting=output rotation speed No×the gear ratio after the shifting.

Next, the reference inertia torque Tq_B which is the torque that the area becomes equal to basic inertia torque Tq_b×target shift time Tm_s when increasing at target increase time Tm_inc (decrease in case of downshift), and decreasing at target decrease time Tm_dec (increase in case of downshift) within target shift time Tm_s is calculated in Step 2606.

Step 2607, Step 2608, Step 2609, and Step 2610 are the target shifting torque setting processing, and the content of processing is similar to that of FIG. 9.

Next, the target torque TTq of the assist clutch is calculated in Step 2611. It is assumed target torque TTq=target shifting torque Tq_J×shifting torque adjustment gain Jgain+ (engine torque Te+learning correction value LnsTTqD)× engine torque adjustment gain Bgain by using learning correction LnsTTqD calculated in Step 2406. It is preferable to set shifting torque adjustment gain Jgain and engine torque adjustment gain Bgain in each shifting pattern as well as FIG. 9. Further, it is preferable to do as a function of the input torque before the shifting (or engine torque).

Moreover, target shifting torque Tq_J can be calculated by setting the increase torque to be aimed and the decrease torque to be aimed although target shifting torque Tq_J is calculated by target increase time Tm_inc and target decrease time Tm_dec.

Next, the content of the control of the rotation synchronous control phase of Step 509 in the shift control by the vehicle control apparatus according to the present embodiment will be explained with reference to FIG. 27.

FIG. 27 is an illustration showing of the present invention.

In Step 2701, the power train control unit 100 reads parameters, and then in Step 2702, judges whether it is just after starting of the rotation synchronous control phase. If the rotation synchronous control phase timer Tm_ns=0, Step 2703 is executed, and after that, the processing advances to Step 2704. If the rotation synchronous control phase timer Tm_ns 0, the processing advances to Step 2704.

When it is just after starting the rotation synchronous control phase, in Step 2703, a proportional correction gain Kp and an integral correction gain Ki for rotation speed feedback are set. There, it is preferable that each of the proportional correction gain Kp and the integral correction gain Ki is separately set for each shifting pattern or for each target gear position as well as FIG. 12.

Next, in Step 2704, the target synchronizing rotation speed (the target input rotation speed) Ni_ref for the feedback of the rotation speed is set. The target synchronizing rotation speed Ni_ref is to be a value around the input rotation speed calculated by multiplying the output rotation speed No by the gear ratio Gm after the shifting.

Next, in Step 2705, a difference Ni_err between the target synchronizing rotation speed Ni_ref and the input rotation speed Ni is calculated, and then in Step 2706, an integral value Ni_errI of the rotation speed difference Ni_err is calculated.

Next, in Step 2707, a proportional correction value DNi_p and an integral correction value DNi_i are calculated using the rotation speed difference Ni_err, the rotation speed difference integral value Ni_errI, the proportional correction gain Kp and the integral correction gain Ki.

Next, feedforward torque Tq_FB is set in Step 2708.

Next, feedforward torque Tq_FF is set in Step 2709. Feedforward torque Tq_FF is assumed to be Tq_FF= (engine torque Te+learning correction value LnsTTqD)× engine torque adjustment gain Bgain by using learning correction value LnsTTqD calculated in Step 2406.

Next, the target torque TTq of the assist clutch is set in Step 2710.

Further, it is preferable to set TTq_off=Tq_in+LnsTTqD by correcting the torque of the target disengaging torque by learning correction value LnsTTqD in Step 702 of FIG. 7.

As described above, it is possible to prevent the shift time from becoming long as shown in FIG. 20 even if the machine difference between assist clutches or the deterioration with age occurs according to the present embodiment. Therefore, it becomes possible to shift as shown in FIG. 14, and the decrease in shift quality can be prevented.

The configuration and the operation of a vehicle control apparatus according to the present embodiment will be explained below, referring to FIG. 28 to FIG. 31.

Here, the configuration of a vehicle control apparatus according to the present embodiment is similar to that shown in FIG. 1 or FIG. 2. The engaging relationship between the clutch and the driven gear in the present embodiment is similar to that shown in FIG. 3. The input-output signal relationship by the communication means 103 among the power train control unit 100, the engine control unit 101 and the hydraulic pressure control unit 102 in the control apparatus of the vehicle according to the present embodiment is similar to that shown in FIG. 4. The overall control content of the vehicle control apparatus according to the present embodiment are similar to those shown in FIG. 5. The content of the timer indicative of the elapsed time of the shift control by the vehicle control apparatus according to the present embodiment are similar to those shown in FIG. 6. The control content of the disengaging control phase of Step 503 of the shift control by the vehicle control apparatus according to the present embodiment are similar to those shown in FIG. 7, FIG. 8 and FIG. 14. The control content of the torque assist control phase of Step 505 of the shift control by the vehicle control apparatus according to the present embodiment are similar to those shown in FIG. 26, FIG. 10, FIG. 11 and FIG. 14. The control content of the rotation synchronous control phase of Step 509 of the shift control by the vehicle control apparatus according to the present embodiment are similar to those shown in FIG. 27 and FIG. 14. The control content of the engaging control phase of Step 511 of the shift control by the vehicle control apparatus according to the present embodiment are similar to those shown in FIG. 13 and FIG. 14. The content of the correction value calculating processing is different from those shown in FIG. 16 and FIG. 22.

First, the content of the correction value calculating processing in the shift control by the vehicle control apparatus according to the present embodiment will be explained with reference to FIG. 28 and FIG. 29.

Figure 28:
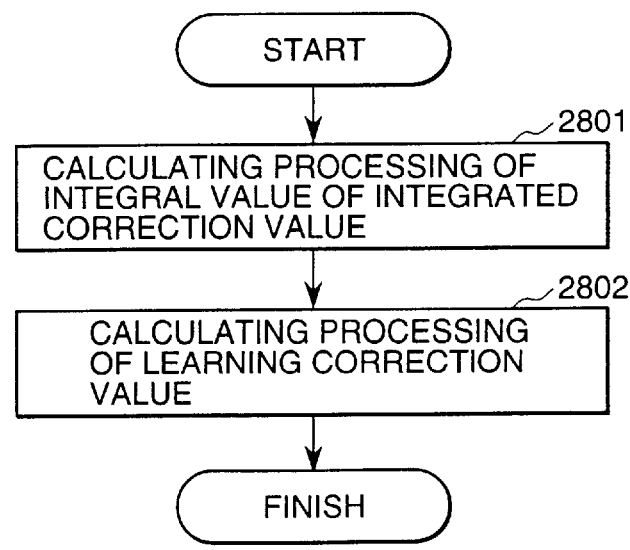
FIG. 28 is a flow chart showing the content of the correction value calculating processing in the shift control by the vehicle control apparatus according to the third embodiment of the present invention.

FIG. 28 is a flow chart showing the content of the correction value calculating processing in the shift control by the vehicle control apparatus according to the third embodiment of the present invention. FIG. 29 is a flow chart showing the content of the torque difference integral value calculating processing shown in FIG. 28. FIG. 30 is a flow chart showing the content of the learning correction value calculating processing shown in FIG. 28.

The content of the correction calculating processing to be described below are programmed in the computer 100c of the power train control unit 100, and repetitively executed in a predetermined cycle. That is, the processing from Step 2801 and 2802 described below is executed by the power train control unit 100.

The correction value calculating processing in Step 514 shown in FIG. 5 is composed of the torque difference integral value calculating processing in Step 2801 and the learning correction value calculating processing in Step 2802 in this embodiment. The content of each processing is described later with reference to FIG. 29 and FIG. 30. Step 2801 and Step 2802 are called as the subroutine in the correction value calculating processing.

Here, the detailed content of the calculating processing of the torque difference integral value in Step 2801 of FIG. 28 will be explained with reference to FIG. 29.

The power train control unit 100 reads parameters in Step 2901, and judges whether it is in a rotation synchronous phase in Step 2902. If it is in the rotation synchronous phase, the processing advances to Step 2903. Otherwise, the processing is ended.

When it is in the rotation synchronous phase, it is judged whether the time required of a rotation synchronous phase is long in Step 2903. When rotation synchronous control phase timer Tm__ns>rotation synchronous phase required upper limit time Tm__nsMX, the processing advances to Step 2907. When rotation synchronous control phase timer Tm__ns≦rotation synchronous phase required upper limit time Tm__nsMX, the processing advances to Step 2904.

When rotation synchronous control phase timer Tm__ns rotation synchronous phase required upper limit time Tm__nsMX, it is assumed integration correction integral value SDNi__i=0 in Step 2904, and integration correction integrating timer Tm__nsSI=0 in Step 2905, and then the processing is ended.

When rotation synchronous control phase timer Tm__ns>rotation synchronous phase required upper limit time Tm__nsMX, integration correction integral value SDNi__i is updated to SDNi__i+Dni__i in Step 2907. Integration correction integrating timer Tm__nsSI is counted up in Step 2908 and the processing is ended.

Here, rotation synchronous phase required upper limit time Tm__nsMX is calculated by inputting the engine torque Te as well as FIG. 23. Moreover, this is set separately in each shifting pattern. Further, it may be calculated by inputting a rotation speed difference before shifting (the input rotation speed before shifting Ni__pre–the input rotation speed after shifting Ni__nxt) instead of the engine torque Te. Further, it may be calculated by inputting an accelerator pedal control amount Aps instead of the engine torque Te.

Figure 29:
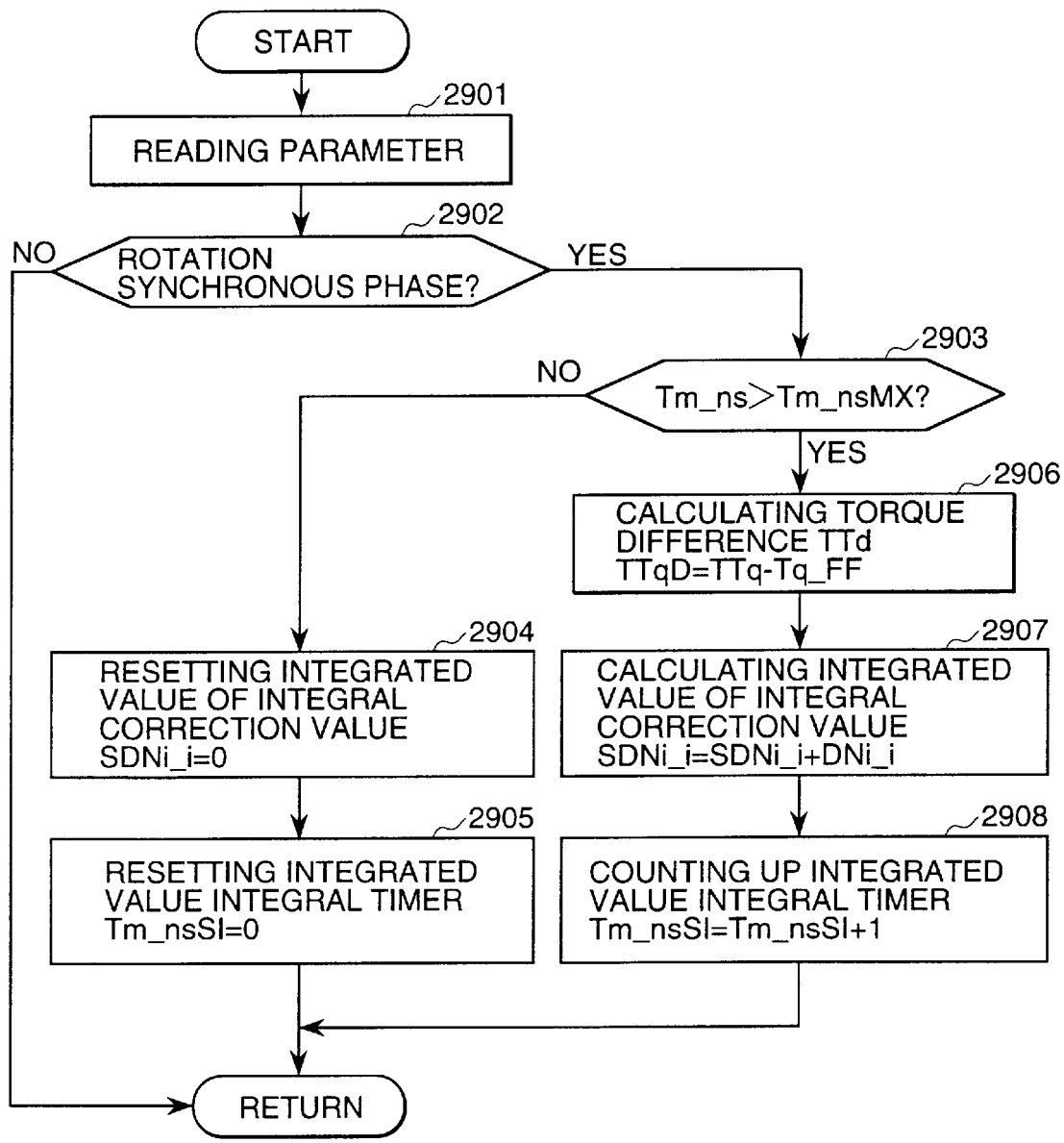
FIG. 29 is a flow chart showing the content of the torque difference integral value calculating processing shown in FIG. 28.
Figure 30:
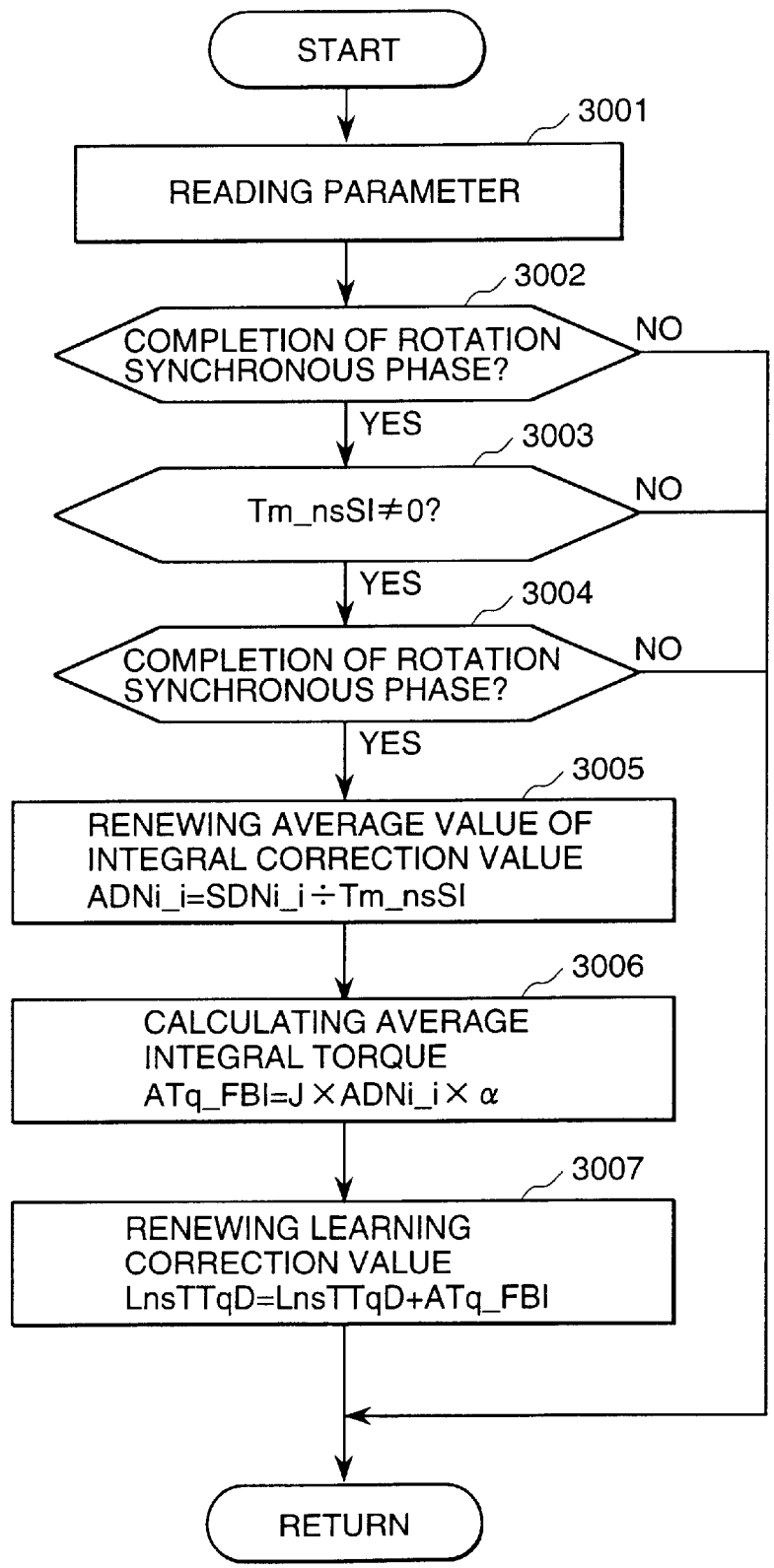
FIG. 30 is a flowchart showing the content of the learning correction value calculating processing shown in FIG. 28.

After the end of the processing in FIG. 29, the processing returns to correction value calculating processing of FIG. 28, and the next Step 2802 is executed.

Next, the content of the calculating processing of the learning correction value of Step 2802 in FIG. 30 will be explained with reference to FIG. 30.

The power train control unit 100 reads parameters in Step 3001, and judges whether the rotation synchronous phase is ended in Step 3002. The processing advances to Step 3003 when the rotation synchronous phase has ended. Otherwise, the processing is ended.

When the rotation synchronous phase has ended, it is judged whether integration correction value integrating timer Tm__nsSI is counted up in Step 3003.

When integration correction integrating timer Tm__nsSI is counted up (≠0), the processing advances to Step 3004. When integration correction integrating timer Tm__nsSI=0, the processing is ended.

Next, it is judged whether it is immediately after the shifting is ended in Step 3004. If so, the processing advances to Step 3005. Otherwise, the processing is ended.

Next, in Step 3005, integration correction average value ADNi__i is calculated by integration correction integrating timer Tm__nsSI and integration correction integral value SDNi__i calculated in Step 2907 and Step 2908 of FIG. 29, and the processing advances to Step 3006.

Next, in Step 3006, assumed that the inertia coefficient from the engine to the input shaft is J and the unit conversion coefficient is á, average integral torque Atq__FBI is calculated.

Next, the learning correction LnsTTqD is updated according to learning correction value LnsTTqD+average integration torque ATq__FBI in Step 3007, and the processing is ended.

Here, it is preferable to update learning correction value LnsTTqD after the upper limit and the lower limit of average integral torque Atq__FBI are limited to a fixed value in Step 3007. Further, it is preferable to update learning correction value LnsTTqD after average integral torque Atq FBI is multiplied by the gain for adjusting the amount of the learning correction.

In addition, it is preferable to update learning correction LnsTTqD with dividing the area by the operation area in the drive force source as well as FIG. 24.

Moreover, it is preferable to correct the setting of the target disengaging torque to TTq_off=Tq_in+LnsTTqD according to learning correction value LnSTTqD in Step 702 of FIG. 7.

As described above, it is possible to prevent the shift time from becoming long as shown in FIG. 20 even if the machine difference between assist clutches or the deterioration with age occurs according to the present embodiment. Therefore, it becomes possible to shift as shown in FIG. 14, and the decrease in shift quality can be prevented.

Next, an example of the modification of the torque difference integral value calculating processing shown in FIG. 29 will be explained with reference to FIG. 31.

Figure 31:
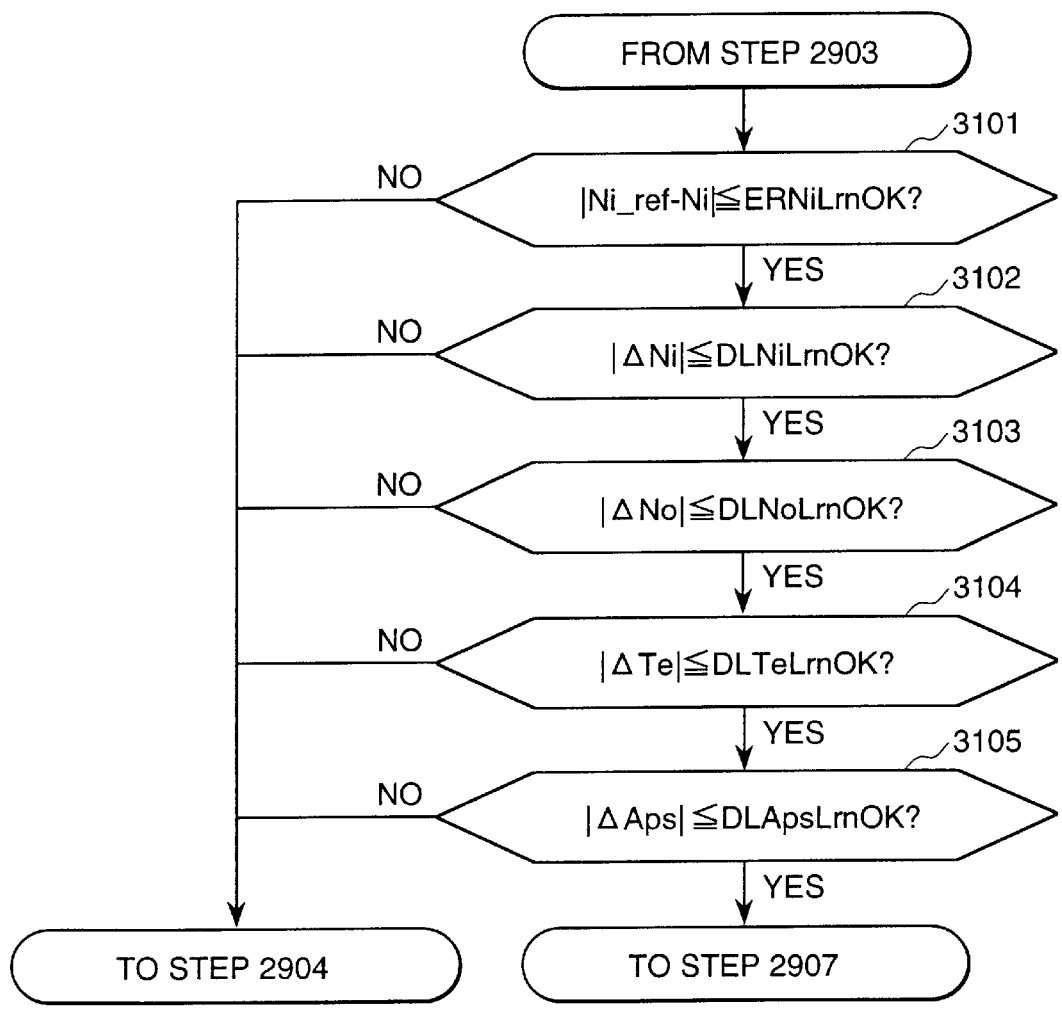
FIG. 31 is an illustration showing an example of the modification of the torque difference integral value calculating processing of the correction value calculating processing in the shift control by the vehicle control apparatus according to the third embodiment of the present invention.

FIG. 31 is an illustration showing an example of the modification of the torque difference integral value calculating processing of the correction value calculating processing in the shift control by the vehicle control apparatus according to the third embodiment of the present invention.

The processing in Step 3101 to Step 3105 of FIG. 31 is added between Step 2903 and Step 2907 of FIG. 29.

It is judged whether the rotation difference between target synchronous rotation speed Ni_ref and input rotation speed Ni is small in Step 3101. When the rotation difference is small, the processing advances to Step 3102, and when the rotation difference is large, the processing advances to Step 2904 in FIG. 29.

Next, it is judged whether or not the amount of the change per unit time of input rotation speed Ni is small in Step 3102. When |ÄNi| is small, the processing advances to Step 3103, and when |ÄNi| is large, the processing advances to Step 2904 in FIG. 29.

Next, it is judged whether or not the amount of the change per unit time of output rotation speed No is small in Step 3103. When |ÄNo| is small, the processing advances to Step 3104, and when |ÄNo| is large, the processing advances to Step 2904 in FIG. 29.

Next, it is judged whether or not the amount of the change per unit time of engine torque Te is small in Step 3104. When |ÄTe| is small, the processing advances to Step 3105, and when |ÄTe| is large, the processing advances to Step 2904 in FIG. 29.

Next, it is judged whether or not the amount of the change per unit time of accelerator control amount Aps is small in Step 3105. When |ÄApe| is small, the processing advances to Step 2907 in FIG. 29, and when |ÄApe| is large, the processing advances to Step 2904 in FIG. 29.

It is possible to improve more the accuracy of the learning correction by composing like this modification.

As described above, it is possible to prevent the shift time from becoming long as shown in FIG. 20 even if the machine difference between assist clutches or the deterioration with age occurs according to the present embodiment. Therefore, it becomes possible to shift as shown in FIG. 14, and the decrease in shift quality can be prevented.

The configuration and the operation of the vehicle control apparatus according to a fourth embodiment of the present invention will be described below, referring to FIG. 32 to FIG. 41.

Figure 32:
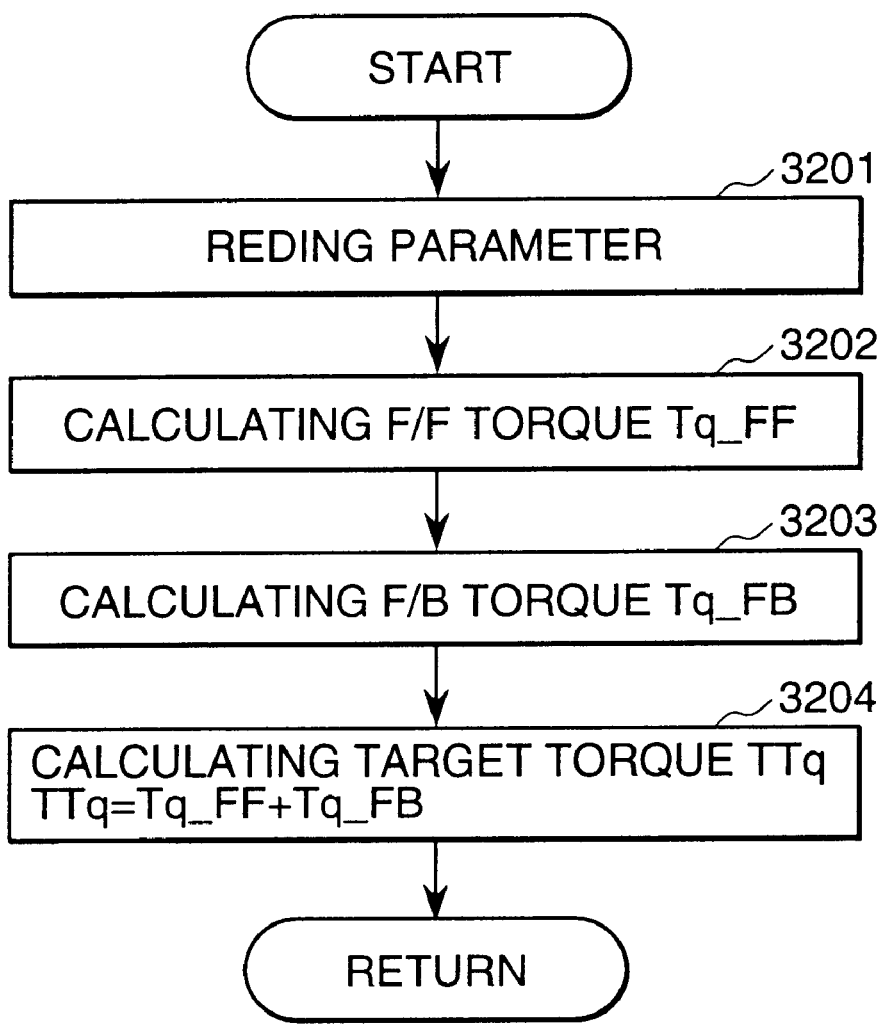
FIG. 32 is a flowchart showing the processing content of the torque assist phase in the shift control by the vehicle control apparatus according to the fourth embodiment of the present invention.
Figure 33:
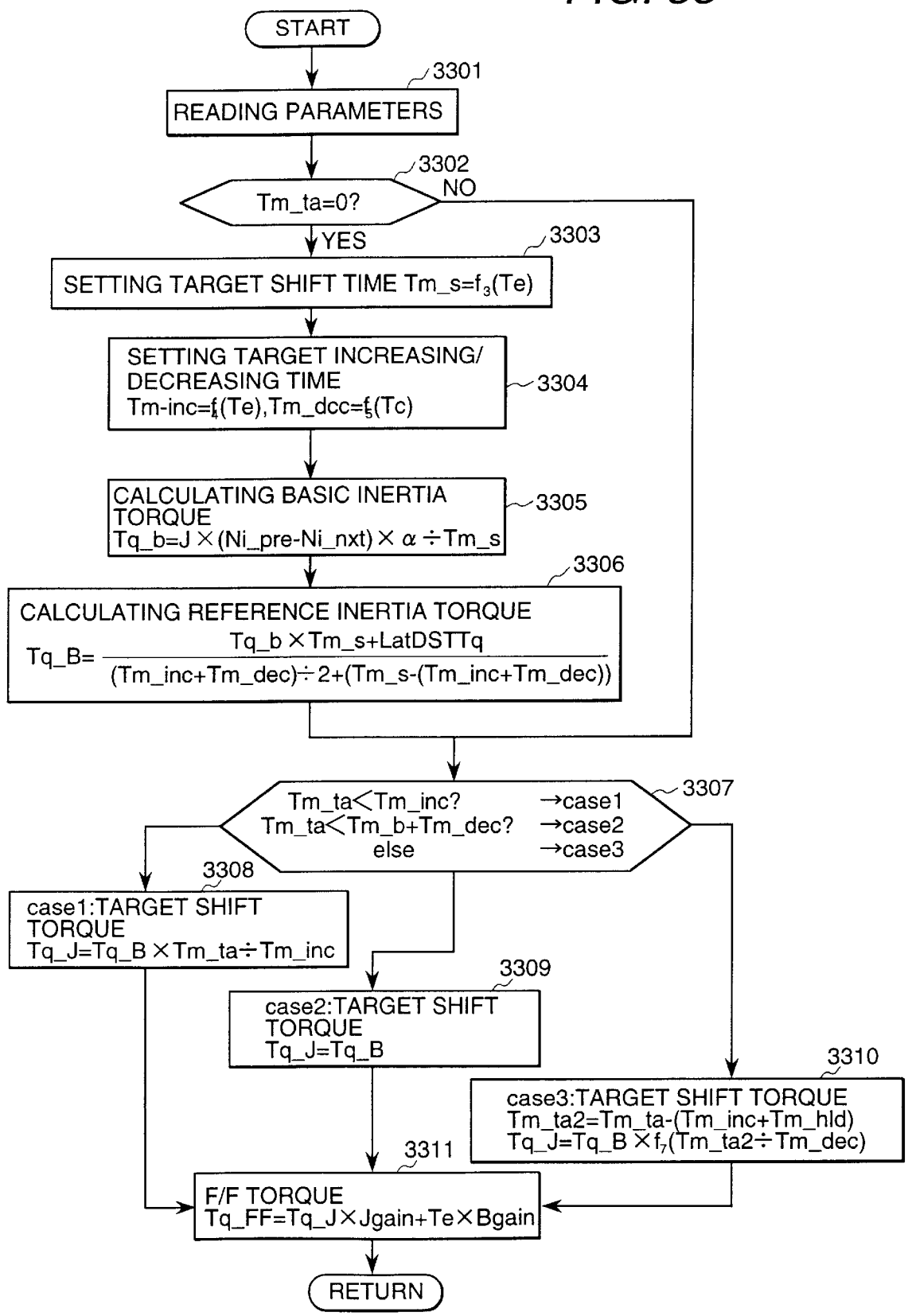
FIG. 33 is a flow chart showing the content of Step 3202 of FIG. 32.
Figure 34:
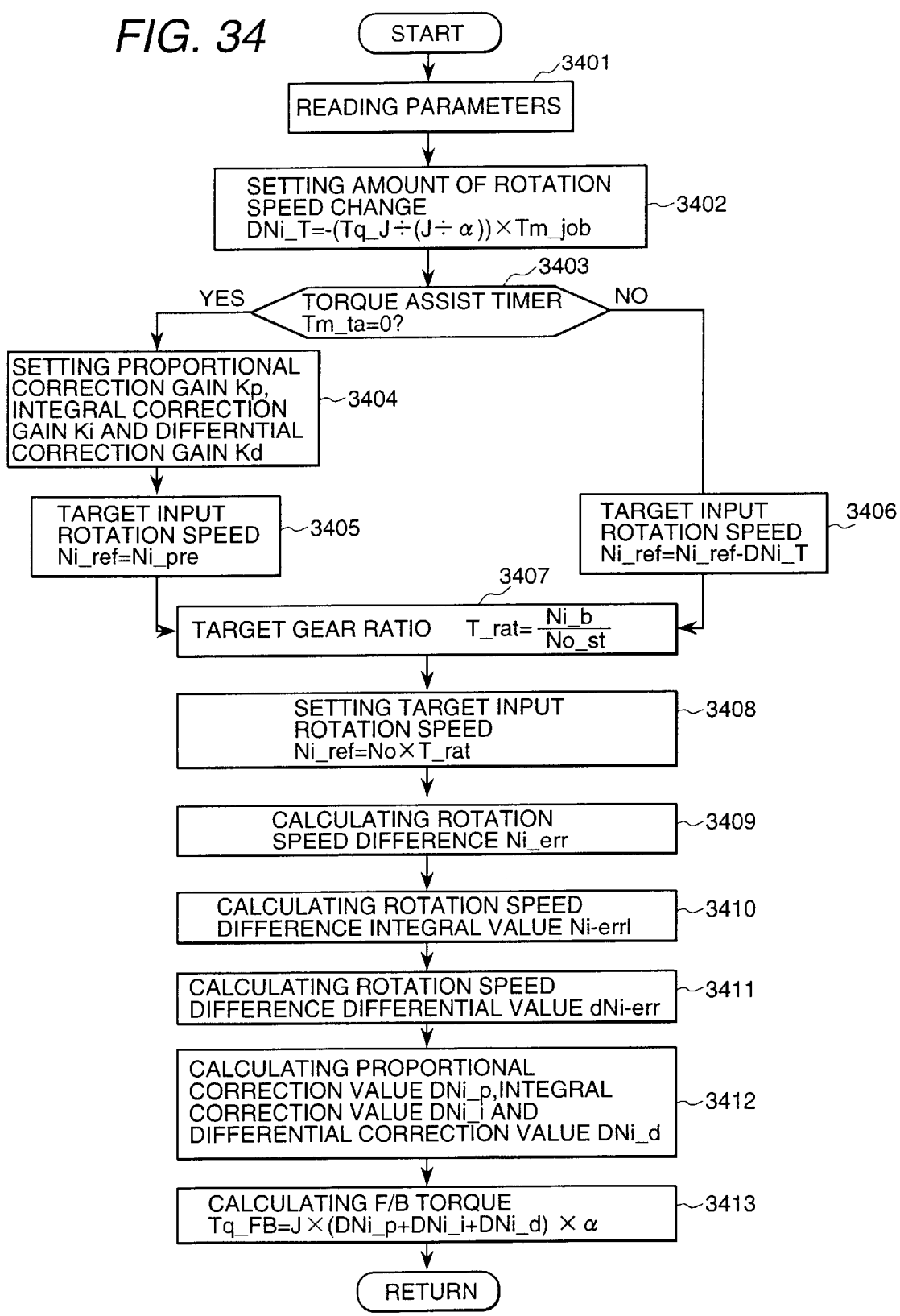
FIG. 34 is a flow chart showing the content of Step 3203 of FIG. 32.

There, the configuration of a vehicle control apparatus according to the present embodiment is similar to that shown in FIG. 1 or FIG. 2. The engaging relationship between the clutch and the driven gear in the present embodiment is similar to that shown in FIG. 3. The input-output signal relationship by the communication means 103 among the power train control unit 100, the engine control unit 101 and the hydraulic pressure control unit 102 in the system of controlling the vehicle according to the present embodiment is similar to that shown in FIG. 4. The overall control content of the system of controlling the vehicle according to the present embodiment are similar to those shown in FIG. 5. The content of the timer indicative of the elapsed time of the shift control by the vehicle control apparatus according to the present embodiment are similar to those shown in FIG. 6. The control content of the disengaging control phase of Step 503 of the shift control by the vehicle control apparatus according to the present embodiment are similar to those shown in FIG. 7, FIG. 8 and FIG. 14. Although the control content of the torque assist control phase of Step 505 of the shift control by the vehicle control apparatus according to the present embodiment is similar to those shown in FIGS. 9 to FIG. 11, the control content described later with reference to FIGS. 32 to FIG. 34 is adopted instead of that in FIGS. 9 to FIG. 14. The control content of the rotation synchronous control phase of Step 509 of the shift control by the vehicle control apparatus according to the present embodiment are similar to those shown in FIG. 12 and FIG. 14. The control content of the engaging control phase of Step 511 of the shift control by the vehicle control apparatus according to the present embodiment are similar to those shown in FIG. 13 and FIG. 14. The content of the correction value calculating processing is different from those of FIG. 16, FIG. 22 and FIG. 28, and is described later with reference to FIG. 37, etc.

First, the content of the processing of the torque assist phase in the shift control by the vehicle control apparatus according to the present embodiment will be explained with reference to FIGS. 32–FIG. 35.

Figure 35:
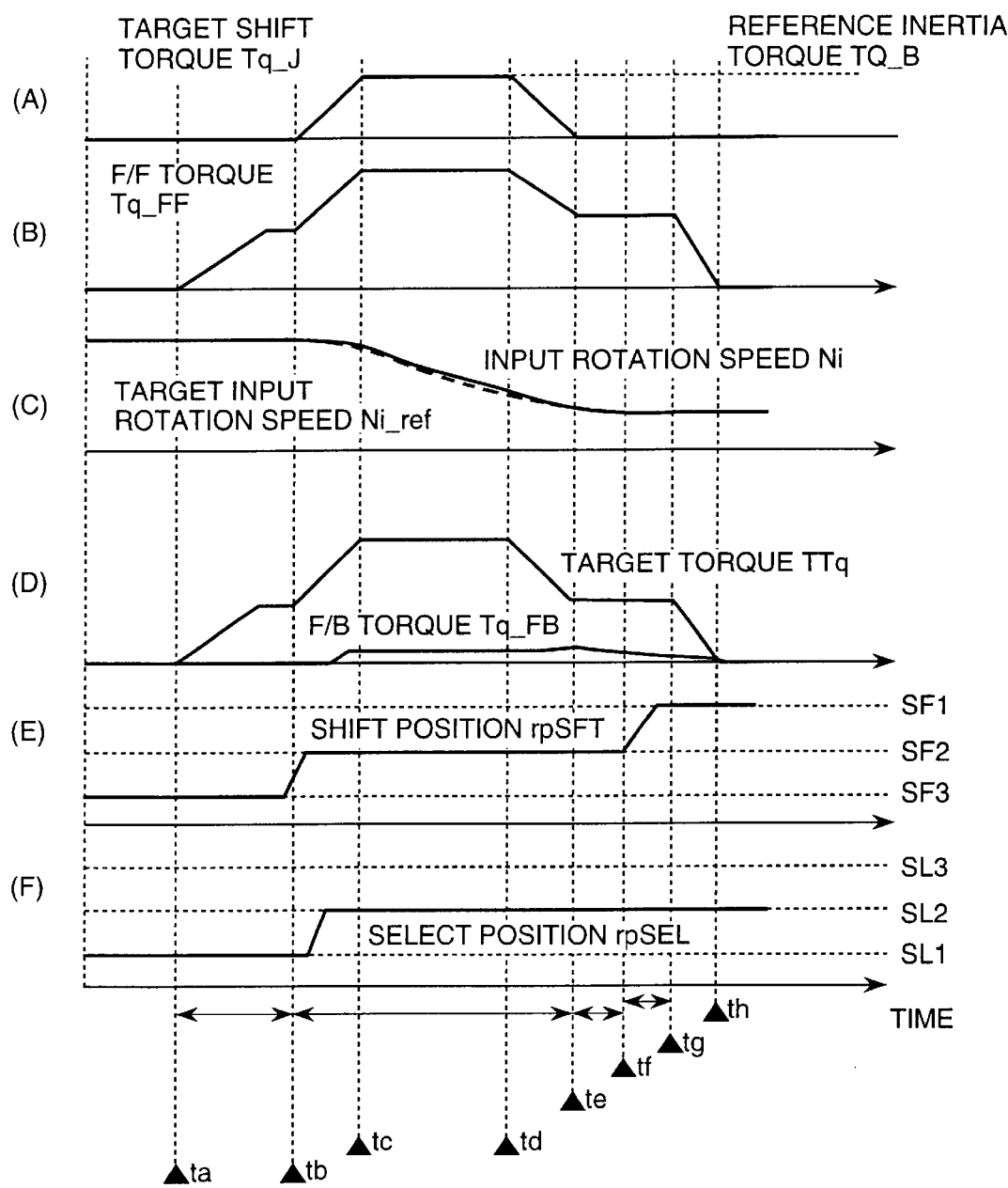
FIG. 35 is a time chart showing the control content of the shift control by the vehicle control apparatus according to the fourth embodiment of the present invention.

FIG. 32 is a flowchart showing the processing content of the torque assist phase in the shift control by the vehicle control apparatus according to the fourth embodiment of the present invention. FIG. 33 is a flow chart showing the content of Step 3202 in FIG. 32. FIG. 34 is a flow chart showing the content of Step 3203 in FIG. 32. FIG. 35 is a time chart showing the control content of the shift control by the vehicle control apparatus according to the fourth embodiment of the present invention.

FIG. 35 shows the time chart showing the control at the up-shift from the 2nd gear position to the 3rd gear position. In FIG. 35, the period of time ta to time tb designates the disengagement control phase, the period of time tb to time te torque assist control phase, the period of time te to time tf rotation synchronous control phase, the period of time tf to time tg engagement control phase, and the period of time tg to time th shift end. FIG. 35(A) shows target shifting torque Tq_J. FIG. 35(B) shows target torque TTq of the assist clutch. FIG. 35(C) shows the transfer torque of the assist clutch. FIG. 35(D) shows input rotation speed Ni and target synchronous rotation speed Ni_ref. FIG. 35(E) shows shift position rpSFT. FIG. 35(F) shows select position rpSEL.

The control content of the shift control to be described below are programmed in the computer 100c of the power train control unit 100, and repetitively executed in a predetermined cycle. That is, the processing from Step 3201 to Step 3204 described below is executed by the power train control unit 100.

In Step 3201 of FIG. 32, power train control unit 100 reads parameters, and calculates feedforward torque Tq_FF as the feedforward torque calculating processing in Step 3202. The detailed content of Step 3202 is described later with reference to FIG. 33. In Step 3203, power train control unit 100 calculates feedback torque Tq_FB as the feedback torque calculating processing in Step 3203. The detailed content of Step 3203 is described later with reference to FIG. 34.

Next, the target torque TTq of the assist clutch is calculated from feedforward torque Tq_FF and feedback torque Tq_FB in Step 3204.

Next, the content of the processing of Step 3202 (feedforward torque calculating processing) of FIG. 32 will be explained with reference to FIG. 33. Basic processing is similar to that of FIG. 8.

In Step 3301, the power train control unit 100 reads parameters, and then in Step 3302, judges whether it is just after the starting of the torque assist control phase. If the the torque assist control phase timer Tm_ta=0, Step 3303, Step 3304, Step 3305 and Step 3306 are executed, and after that, the processing advances to Step 3307. If the torque assist control phase timer Tm_ta≠0, the processing advances to Step 3307.

Target shift time Tm_s is set in Step 3303 (target shift time setting processing) immediately after the starting of the torque assist control phase. Target shift time Tm_s is assumed to be a function of the engine torque Te.

Next, the target increase time Tm_inc and target decrease time Tm_dec are set in Step 3304 (target increase time setting processing and target decrease time setting processing). Both target increase time Tm_inc and target decrease time Tm_dec are assumed to be a function of the engine torque Te.

Next, when shifting from rotation speed Ni_pre corresponding to the input before the shifting to rotation speed Ni_nxt corresponding to the input after the shifting during target shift time Tm_s set in Step 3303, the necessary torque for the shifting is calculated in Step 3305. Assumed that the inertia coefficient from the engine to the input shaft is J and the unit conversion coefficient is a, the torque necessary for the shifting or basic inertia torque becomes Tq_b is J×(Ni_pre−Ni_nxt)×α÷Tm_s. Where, input rotation speed Ni_pre before the shifting=output rotation speed No×the gear ratio before the shifting, and input rotation speed Ni_nxt after the shifting=output rotation speed No×the gear ratio after the shifting.

Next, the reference inertia torque Tq_B which is the torque that the area becomes equal to basic inertia torque Tq_b×target shift time Tm_s when increasing at target increase time Tm_inc (decrease in case of downshift), and decreasing at target decrease time Tm_dec (increase in case of downshift) within target shift time Tm_S is calculated in Step 3306. When reference inertia torque Tq_B is calculated, it is corrected by using assist torque learning correction value LatDSTTq. Assist torque learning correction value LatDSTTq is calculated by using the correction value calculating processing described later with reference to FIG. 37.

Step 3307, Step 3308, Step 3309 and Step 3310 are the target shift torque setting processing. In Step 3307, classification of cases is performed using the torque assist control phase timer Tm_ta. In Step 3308, Step 3309 and Step 3310, target shift torque Tq_J of each case (Case 1, Case 2, Case 3) is calculated.

Next, feedforward torque Tq_FF of the assist clutch is calculated in Step 3311. It is assumed feedforward torque Tq_FF=target shifting torque Tq_J×shifting torque adjustment gain Jgain+engine torque Te×engine torque adujustment gain Bgain. It is preferable to set shifting torque adjustment gain Jgain and engine torque adjustment gain Bgain in each shifting pattern. Further, it is preferable to do as a function of the input torque before the shifting (or engine torque).

Moreover, target shifting torque Tq_J can be calculated by setting the increase torque to be aimed and the decrease torque to be aimed although target shifting torque Tq_J is calculated by target increase time Tm_inc and target decrease time Tm_dec.

Next, the content of the processing of Step 3203 (feedback torque calculating processing) in FIG. 32 will be explained with reference to FIG. 34.

In Step 3401, power train control unit 100 reads parameters, and in Step 3402, it calculates change amount DNi_T of the rotation speed to obtain target shifting torque Tq_J calculated in Step 3308, Step 3309 and Step 3310 of FIG. 33. Assumed that the inertia coefficient from the engine to the input shaft is J, the unit conversion coefficient is a, and the control cycle time is Tm_job, Change amount DNi_T of the rotation speed becomes DNi_T=−(Tq_J (J×α))×Tm_job.

Next, in Step 3403, it is judged whether or not it is just after the starting of the torque assist control phase. If the torque assist control phase timer Tm_ta=0, Step 3404 and Step 3405 is executed, and after that, the processing advances to Step 3407. If the torque assist control phase timer Tm_at≠0, Step 3406 is executed and then the processing advances to Step 3407.

When it is just after starting of the torque assist control phase, in Step 3404, a proportional correction gain Kp, an integral correction gain Ki and a differential correction gain Kd for rotation speed feedback are set. There, it is preferable that each of the proportional correction gain Kp, the integral correction gain Ki and the differential correction gain Kd is separately set for each shifting pattern or for each target gear position.

Next, in Step 3405, an initial value of basic input rotation speed Ni_b is set. The initial value of basic input rotation speed Ni_b just after the starting of the torque assist control phase is set to input rotation speed Ni_pre before the shifting.

Basic input rotation speed Ni_b is set in Step 3406 when it is not immediately after the starting of the torque assist control phase. Basic input rotation speed Ni_b is changed in increments of change amount DNi_T of the rotation speed calculated in Step 3402. Basic input rotation speed Ni_b corresponds to the target input rotation speed in which the change in the rotation speed by the change of the vehicle speed is not considered.

Next, the target transmission gear ratio setting processing is executed in Step 3407. Target transmission gear ratio T_rat is calculated as T_rat=Ni_b÷No_st based on basic input rotation speed Ni_b and output rotation speed No_st at the beginning of the shifting. Here, (input rotation speed Ni_st at the beginning of the shifting÷transmission gear ratio) can be used instead of output rotation speed No_st at the beginning of the shifting Next, the target input rotation speed setting processing is executed in Step 3408. Target input rotation speed Ni_ref=output rotation speed No×target transmission gear ratio T_rat is calculated. As a result, the change in the rotation speed by the change in the vehicle speed can be reflected.

Next, difference Ni_err between target input rotation speed Ni_ref and input rotation speed Ni is calculated in Step 3409. Further, integral value Ni_errI of rotation speed difference Ni_err is calculated in Step 3410, and differential value dNi_err of rotation speed difference Ni_err is calculated in Step 3411.

Next, proportional correction value DNi_p, integral correction value DNi_i, and differential correction value DNi_err are calculated by using rotation speed difference Ni_err, rotation speed difference integral value Ni_errI, rotation speed difference differential value dNi_err, proportional correction gain Kp, integral correction gain Ki, and differential correction gain Kd in Step 3412.

Next, feedback torque Tq_FB is set in Step 3413. Assumed that the inertia coefficient from the engine to the input shaft is J, the unit conversion coefficient is α, feedback torque Tq_FB=J×(DNi_p+DNi_i+DNi_d)×α is calculated.

Here, output rotation speed No_st at the beginning of the shifting in Step 3407 is assumed to be output rotation speed No when changing from the disengaging control phase into the torque assist control phase. Furthermore, it is preferable to select the filtered value of the output rotation speed No when changing from from the disengaging control phase into the torque assist control phase, the average value of the values taken over several times immediately before changing from the disengaging control phase into the torque assist control phase in order to suppress the influence of the change of the rotation by the disengaging control.

Next, the content of the torque assist control will be explained with reference to FIG. 35.

In the disengaging phase (time ta to time tb), shift position rpSFT in FIG. 35(E) begins to move from position SF3 to position SF2 when target torque TTq of the assist clutch in FIG. 35(D) rises up.

When shift position rpSFT comes near of position SF2 (time tb), the torque assist control phase (time tb to time te) starts. In the torque assist control phase, feedforward torque Tq_FF of FIG. 35(B) rises and falls while target shifting torque Tq_J of FIG. 35(A) rises up to reference inertia torque Tq_B and then falls to 0. When feedforward torque Tq_FF of FIG. 35(B) rises and falls, input rotation speed Ni of FIG. 35(C) decreases. In addition, target input rotation speed Ni_ref of FIG. 35(C) which is the rotation speed to obtain target shifting torque Tq_J of FIG. 35(A) changes, and the feedback torque of FIG. 35(D) changes to improve the difference between target input rotation speed Ni_ref and input rotation speed Ni. Target torque TTq of FIG. 35(D) is set based on feedforward torque Tq_FF and feedback torque Tq_FB. As a result, input rotation speed Ni can be controlled to follow target input rotation speed Ni_ref, obtaining target shifting torque Tq_J. Moreover, select position rpSEL of FIG. 35(F) moves from position SL1 to position SL2.

In the rotation synchronous control phase (time te to time tf), target torque TTq of the assist clutch in FIG. 35(D) is controlled so that input rotation speed Ni in FIG. 35(C) may follow target input rotation speed Ni_ref.

In the engagement control phase (time tf to time tg), target torque TTq of the assist clutch in FIG. 35(D) is controlled so that input rotation speed Ni of FIG. 35(C) may continue to follow target input rotation speed Ni_ref, and shift position rpSFT in FIG. 35(E) moves from position SF2 to position SF1.

The shifting end phase (time tg to time th) starts at time tg when the movement of shift position rpSFT to position SF1 was completed, target torque TTq of the assist clutch of (D) becomes 0, and the shift control is ended.

Here, the example of up-shift from the 2nd gear position to the 3rd gear position when the shift time becomes long due to the machine difference between assist clutches or the deterioration with age when there is no correction by assist torque learning correction LatDSTTq in Step 3306 of FIG. 33 is explained with reference to FIG. 36.

Figure 36:
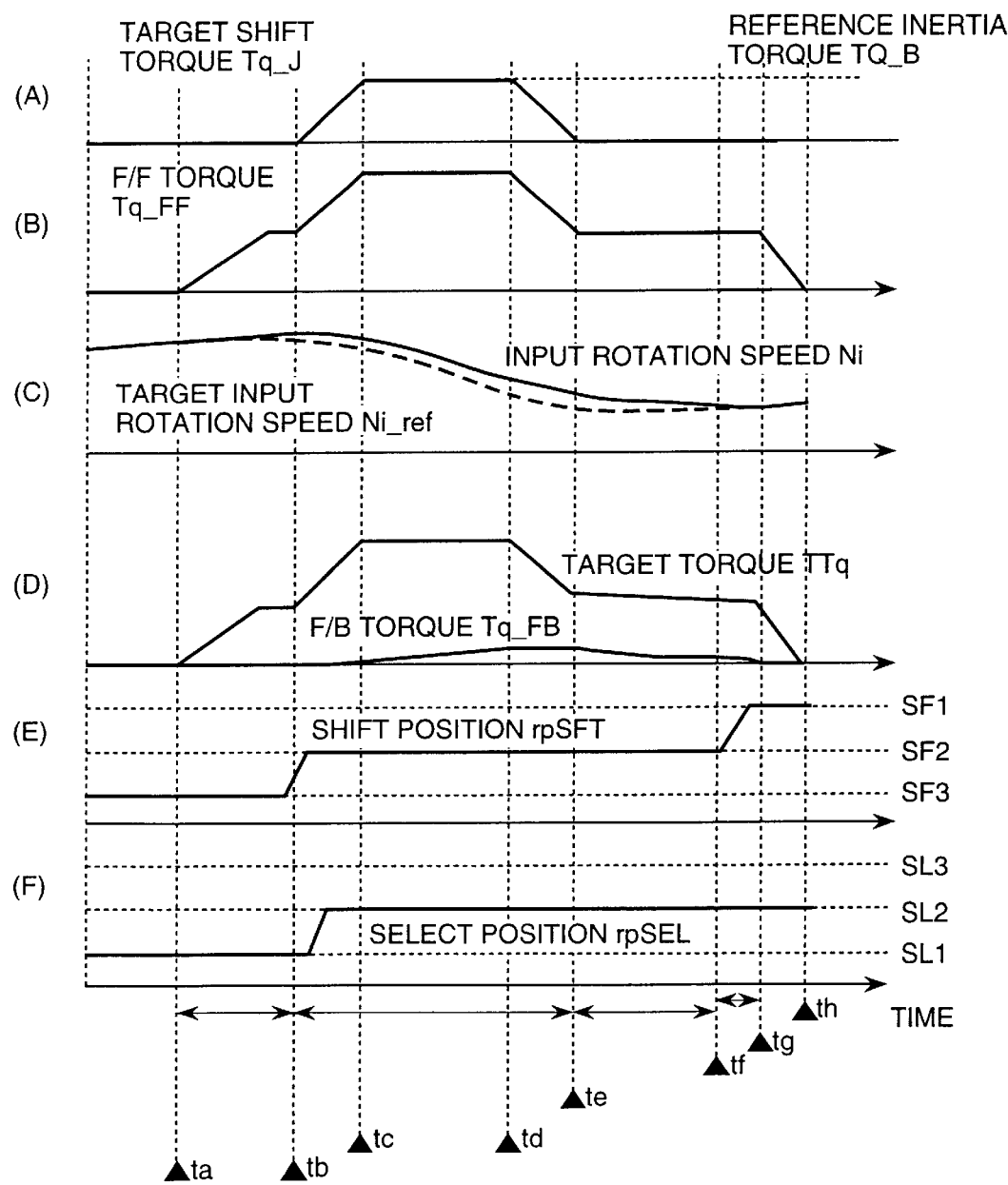
FIG. 36 is a time chart showing the content of the control when the assist torque is not corrected in the shift control by vehicle control apparatus according to the third embodiment of the present invention.

FIG. 36 is a time chart showing the content of the control when the assist torque is not corrected in the shift control by vehicle control apparatus according to the third embodiment of the present invention.

Compared with the example of FIG. 35, the decrease in input rotation speed Ni of FIG. 36(D) is slower, and the time until input rotation speed Ni synchronizes with target synchronous rotation speed Ni_ref is long. As a result, the time required of the rotation synchronous control phase from time te to time tf becomes long, and the entire shift time is long.

Next, the content of the correction value calculating processing in the shift control by the vehicle control apparatus according to the present embodiment will be explained with reference to FIG. 37 to FIG. 40.

Figure 37:
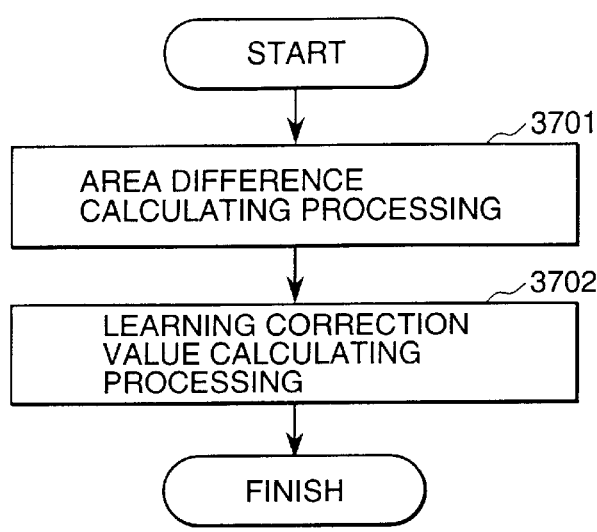
FIG. 37 is a flow chart showing the content of the correction value calculating processing in the shift control by the vehicle control apparatus according to the fourth embodiment of the present invention.
Figure 39:
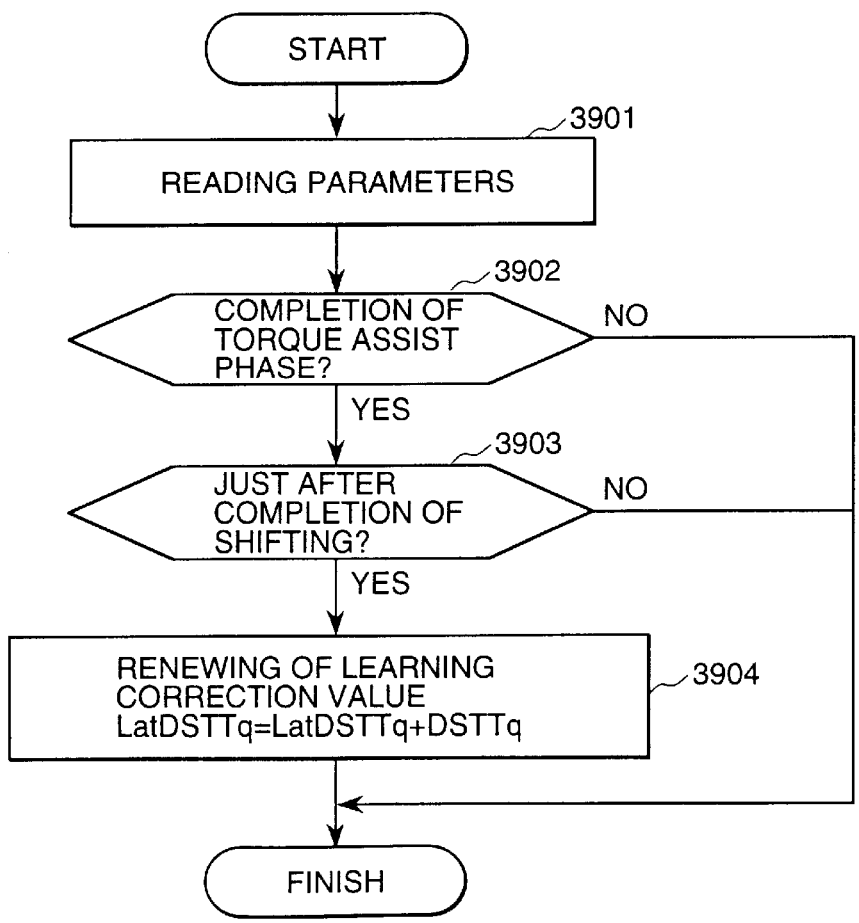
FIG. 39 is a flow chart showing the content of the learning correction value calculating processing shown in FIG. 37.
Figure 38:
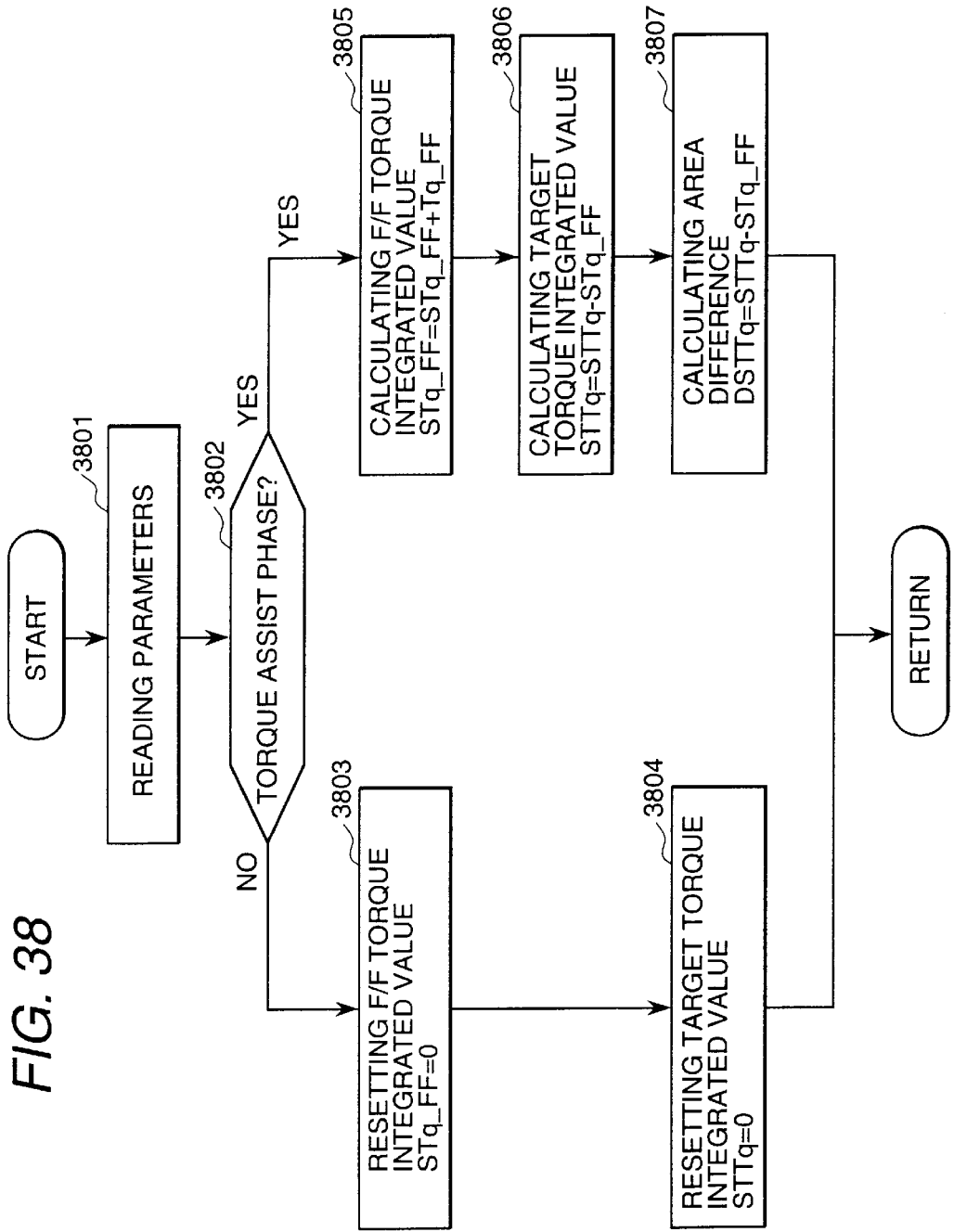
FIG. 38 is a flow chart showing the content of the area difference integral value calculating processing shown in FIG. 37.
Figure 40:
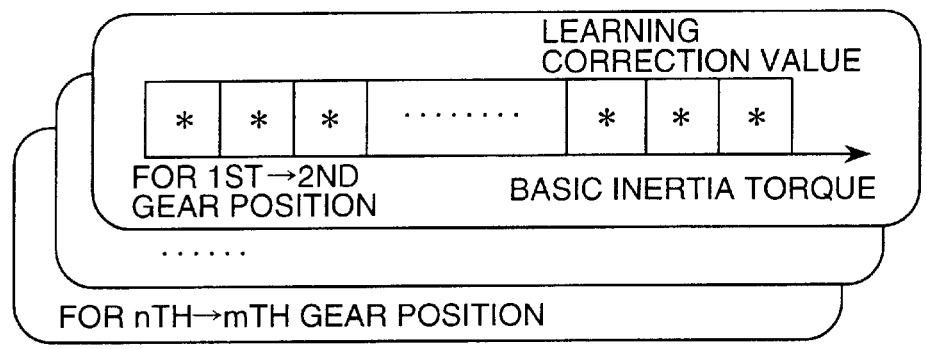
FIG. 40 is an illustration showing a renewing method of the learning correction value of the correction calculating processing in the shift control by the vehicle control apparatus according to the fourth embodiment of the present invention.

FIG. 37 is a flow chart showing the content of the correction value calculating processing in the shift control by the vehicle control apparatus according to the fourth embodiment of the present invention. FIG. 38 is a flow chart showing the content of the area difference integral value calculating processing shown in FIG. 37. FIG. 39 is a flow chart showing the content of the learning correction value calculating processing shown in FIG. 37. FIG. 40 is an illustration showing a renewing method of the learning correction value of the correction calculating processing in the shift control by the vehicle control apparatus according to the fourth embodiment of the present invention.

The control content of the shift control to be described below are programmed in the computer 100c of the power train control unit 100, and repetitively executed in a predetermined cycle. That is, the processing from Step 3701 to 3702 described below is executed by the power train control unit 100.

As shown in FIG. 37, the correction value calculating processing in Step 514 shown in FIG. 5 is composed of the area difference integral value calculating processing in Step 3701 and the learning correction value calculating processing in Step 3702 in this embodiment. The content of each processing is described later with reference to FIG. 38 and FIG. 39. Step 3701 and Step 3702 are called as the subroutine in the correction value calculating processing.

Here, the detailed content of the calculating processing of the area difference integral value in Step 3701 of FIG. 37 will be explained with reference to FIG. 38.

The power train control unit 100 reads parameters in Step 3801, and judges whether it is in a torque assist phase in Step 3802. If it is in the rotation synchronous phase, the processing advances to Step 3805. Otherwise, the processing advances to Step 3803.

When it is not in the torque assist control phase, feedforward torque integral value STq_FF=0 is set in Step 3803. Next, assist clutch target torque integral value STTq=0 is set in Step 3804, and the processing is ended.

When it is in the torque assist control phase, feedforward torque integral value STq_FF is updated to feedforward torque integral value STq_FF+feedforward torque Tq_FF in Step 3805. Next, the target torque integral value STTq is updated to assist clutch target torque integral value STTq+target torque TTq in Step 3806. Next, area difference DSTTq is calculated based on target torque integral value STTq and feedforward torque integral value STq_FF in Step 3807, and the processing is ended.

Next, the detailed content of the calculating processing of the learning correction value in Step 3702 of FIG. 37 will be explained with reference to FIG. 39.

Power train control unit 100 reads parameters in Step 3901. Next, it is judged whether the torque assist control phase is ended in Step 3902. When the processing is ended, the processing advances to Step 3903. Otherwise, the processing is ended.

when the torque assist control phase is ended, it is judged whether or not it is immediately after the end of the shifting in Step 3903. When it is immediately after the end of the shifting, the processing advances to Step 3904, Otherwise the processing is ended.

When it is immediately after the end of the shifting, Assist torque learning correction LatDSTTq is updated to assist torque learning correction LatDSTTq+area difference DSTTq in Step 3904, and the processing is ended.

Here, it is preferable to update assist torque learning correction value LatDSTTq after the upper limit and the lower limit of area difference DSTTq are limited to a fixed value. Further, it is preferable to update assist torque learning correction value LatDSTTq after area difference DSTTq is multiplied by the gain for adjusting the amount of the learning correction.

In addition, it is preferable to update assist torque learning correction value LatDSTTq with dividing the area by the operation area in the assist clutch. When the drive force source is engine 1, it is preferable to update assist clutch learning correction value LatDSTTq of each area after dividing the area according to basic inertia torque Tq_b, etc. as shown in FIG. 40. Other parameters indicative of the state of assist clutch such as a assist clutch oil pressure, assist clutch current, etc. may be used here instead of the basic inertia torque Tq_b.

As described above, it is possible to shift as shown in FIG. 35 to improve the shift quality by preventing the required shift time from becoming long or oppositely short as shown in FIG. 36 even if the machine difference between assist clutches or the deterioration with age occurs. Further, when the transfer torque characteristics of the assist clutch is changed by the replacement of the assist clutch or the exchange of the assist clutch hydraulic operating fluid, the required shift time is converged whenever shifting is repeated as shown in FIG. 20.

Next, the example of the modification of the area difference integral value calculating processing shown in FIG. 38 will be explained with reference to FIG. 41.

Figure 41:
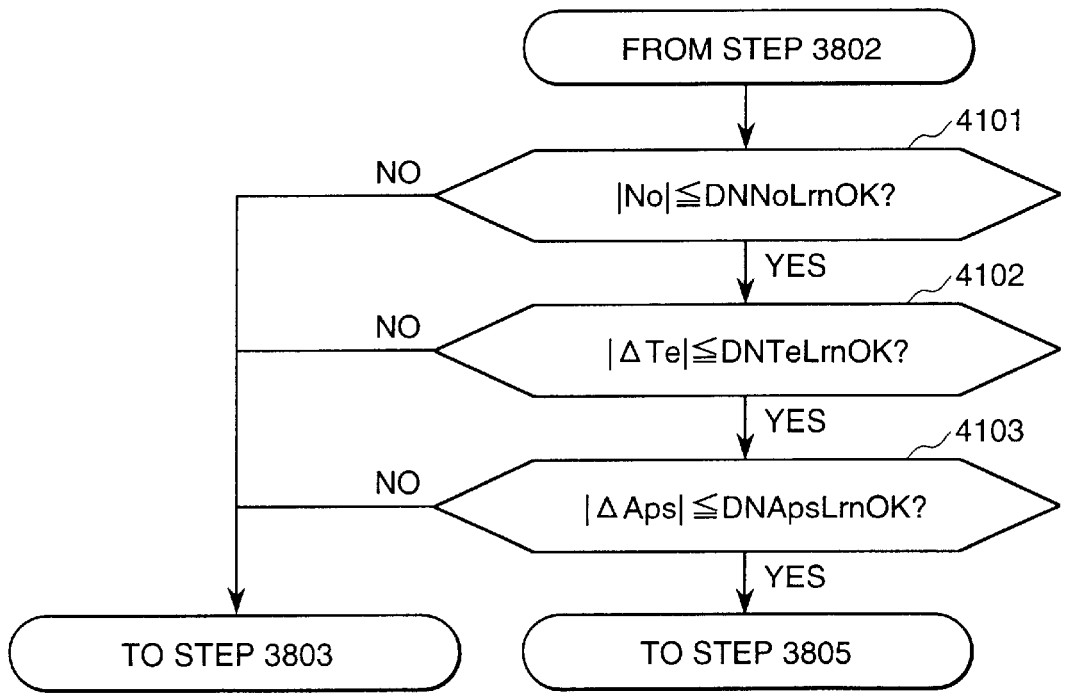
FIG. 41 is an illustration showing an example of the modification of the area difference integral value calculating processing of the correction value calculating processing in the shift control by the vehicle control apparatus according to the fourth embodiment of the present invention.

FIG. 41 is an illustration showing an example of the modification of the area difference integral value calculating processing of the correction value calculating processing in the shift control by the vehicle control apparatus according to the fourth embodiment of the present invention.

The processing of Step 4101 to Step 4104 in FIG. 41 is added between Step 3802 and Step 3805 in FIG. 38.

It is judged whether or not the amount of the change per unit time of engine torque Te is small in Step 4101. When |ΔNo| is small, the processing advances to Step 4102, and when |ΔNo| is large, the processing advances to Step 3803 in FIG. 38.

Next, when |ΔNo| is small, it is judged whether or not the amount of the change per unit time of engine torque Te is small in Step 4102. When |ΔTe| is small, the processing advances to Step 4103, and when |ΔTe| is large, the processing advances to Step 3803 in FIG. 38.

When |ΔTe| is small, it is judged whether or not the amount (ΔApe) of the change per unit time of accelerator control amount Aps is small in Step 4103. When |ΔApe| is small, the processing advances to Step 3805 in FIG. 38, and when |ΔApe| is large, the processing advances to Step 3803 in FIG. 38.

The accuracy of the learning correction can be improved more by composing as described above.

As described above, it is possible to improve the shift quality by preventing the required shift time from becoming long or oppositely short even if the machine difference between assist clutches or the deterioration with age occurs. Further, when the transfer torque characteristics of the assist clutch is changed by the replacement of the assist clutch or the exchange of the assist clutch hydraulic operating fluid, the required shift time is converged whenever shifting is repeated.

Figure 43:
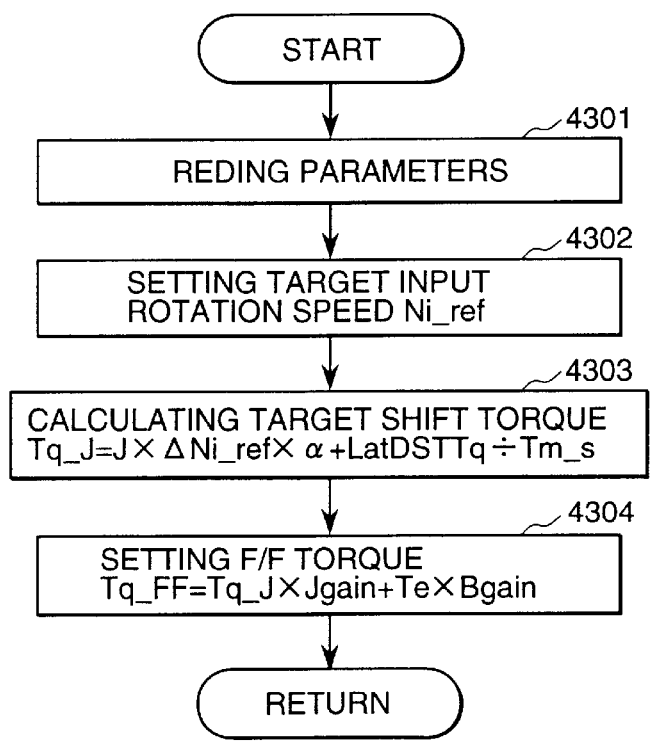
FIG. 43 is a flow chart showing the content of Step 4202 of FIG. 42.
Figure 44:
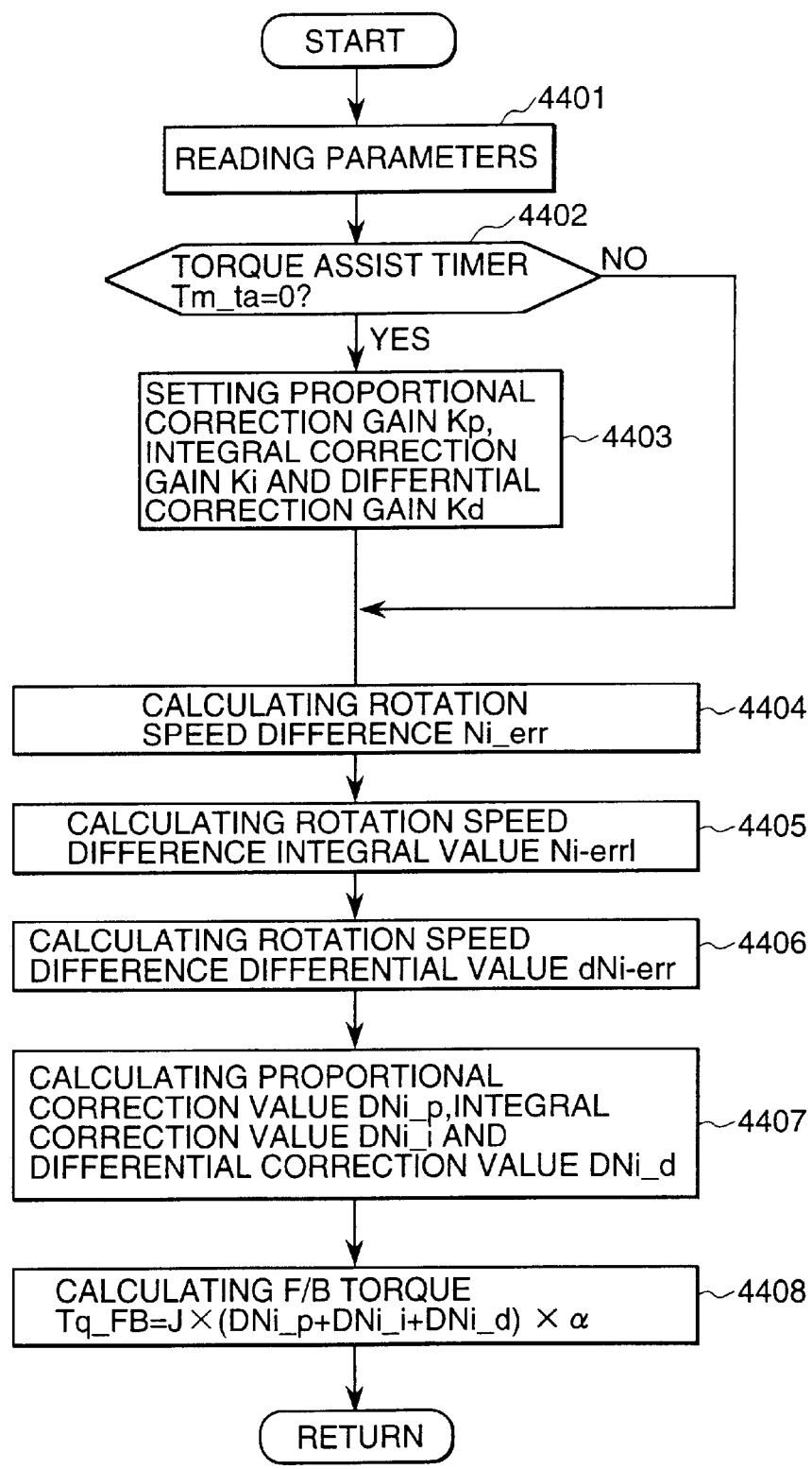
FIG. 44 is a flow chart showing the content of Step 4203 of FIG. 42.

The configuration and the operation of a fifth embodiment of a vehicle control apparatus according to the present invention will be described below, referring to FIGS. 42 to FIG. 44.

There, the configuration of a vehicle control apparatus according to second embodiment is similar to that shown in FIG. 1 or FIG. 2. The engaging relationship between the clutch and the driven gear in the present embodiment is similar to that shown in FIG. 3. The input-output signal relationship by the communication means 103 among the power train control unit 100, the engine control unit 101 and the hydraulic pressure control unit 102 in the system of controlling the vehicle according to the present embodiment is similar to that shown in FIG. 4. The overall control content of the system of controlling the vehicle according to the present embodiment are similar to those shown in FIG. 5. The content of the timer indicative of the elapsed time of the shift control by the vehicle control apparatus according to the present embodiment are similar to those shown in FIG. 6. The control content of the disengaging control phase of Step 503 of the shift control by the vehicle control apparatus according to the present embodiment are similar to those shown in FIG. 7, FIG. 8 and FIG. 14. Although the control content of the torque assist control phase of Step 505 of the shift control by the vehicle control apparatus according to the present embodiment are similar to those shown in FIGS. 9 to FIG. 11 and FIG. 14, the control content described later with reference to FIGS. 42 to FIG. 44 is adopted herein instead of those of FIGS. 9 to FIG. 11. The control content of the rotation synchronous control phase of Step 509 of the shift control by the vehicle control apparatus according to the present embodiment are similar to those shown in FIG. 12 and FIG. 14. The control content of the engaging control phase of Step 511 of the shift control by the vehicle control apparatus according to the present embodiment are similar to those shown in FIG. 13 and FIG. 14. The content of the correction value calculating processing is similar to that of FIG. 37 in this embodiment.

Here, the processing content of the torque assist phase in the shift control by the vehicle control apparatus according to the present embodiment will be explained with reference to FIGS. 42 to FIG. 44.

Figure 42:
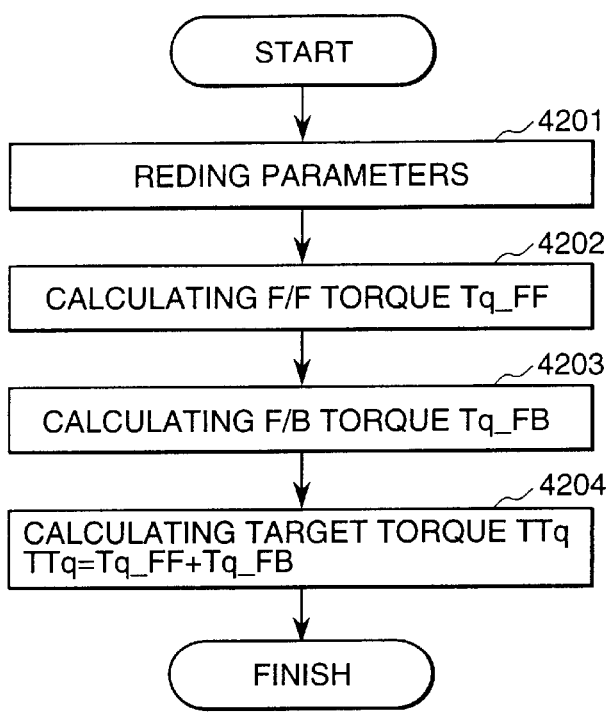
FIG. 42 is a flowchart showing the processing content of the torque assist phase in the shift control by the vehicle control apparatus according to the fifth embodiment of the present invention.

FIG. 42 is a flowchart showing the processing content of the torque assist phase in the shift control by the vehicle control apparatus according to the fifth embodiment of the present invention. FIG. 43 is a flow chart showing the content of Step 4202 of FIG. 42. FIG. 44 is a flow chart showing the content of Step 4203 of FIG. 42.

The control content of the correction value calculating processing are programmed in the computer 100c of the power train control unit 100, and repetitively executed in a predetermined cycle. That is, the processing from Step 4201 to 4204 described below is executed by the power train control unit 100.

In Step 4201 of FIG. 42, power train control unit 100 reads parameters, and calculates feedforward torque Tq_FF as the feedforward torque calculating processing in Step 4202. The detailed content of Step 4202 is described later with reference to FIG. 43. In Step 4203, power train control unit 100 calculates feedback torque Tq_FB as the feedback torque calculating processing in Step 4203. The detailed content of Step 4203 is described later with reference to FIG. 44.

Next, the target torque TTq of the assist clutch is calculated from feedforward torque Tq_FF and feedback torque Tq_FB in Step 4204.

Next, the content of the processing of Step 4202 (feedforward torque calculating processing) in FIG. 42 will be explained with reference to FIG. 43. Basic processing is similar to that of FIG. 8.

Power train control unit 100 reads parameters in Step 4301, and sets input rotation speed Ni_ref to be aimed in Step 4302. Target input rotation speed Ni_ref is set based on the shifting pattern or the output rotation speed, etc.

Next, shifting torque Tq_J to obtain target input rotation speed Ni_ref is calculated in Step 4303.
Assumed that the amount of the change in the target input rotation speed Ni_ref is ΔNi_ref, the inertia coefficient from the engine to the input shaft is J, the unit conversion coefficient is α, the target shift time is Tm_s, and the assist torque learning correction value is LatDSTTq, the target shifting torque is calculated as Tq_J=J×ΔNi_ref×α+LatDSTTq÷Tm_s.

Next, feedforward torque Tq_FF of the assist clutch is calculated in Step 3311. It is assumed feedforward torque Tq_FF=target shifting torque Tq_J×shifting torque adjustment gain Jgain+engine torque Te×engine torque adujustment gain Bgain. It is preferable to set shifting torque adjustment gain Jgain and engine torque adjustment gain Bgain in each shifting pattern as well as the case in FIG. 33. Further, it is preferable to do as a function of the input torque before the shifting (or engine torque).

Next, the content of the processing of Step 4203 (feedback torque calculating processing) in FIG. 42 will be explained with reference to FIG. 44.

In Step 4401, the power train control unit 100 reads parameters, and then in Step 4402, judges whether it is just after the starting of the torque assist control phase. When the the torque assist control phase timer Tm_ta=0, Step 4403 is executed, and after that, the processing advances to Step 4404. When the torque assist control phase timer Tm_ta≠0, the processing advances to Step 4406.

When it is just after starting of the torque assist control phase, in Step 4403, a proportional correction gain Kp, an integral correction gain Ki and a differential correction gain Kd for rotation speed feedback are set. There, it is preferable that each of the proportional correction gain Kp, the integral correction gain Ki and the differential correction gain Kd is separately set for each shifting pattern or for each target gear position.

Next, difference Ni_err between target input rotation speed Ni_ref and input rotation speed Ni is calculated in Step 4404. Further, integral value Ni_errI of rotation speed difference Ni_err is calculated in Step 4405, and differential value dNi_err of rotation speed difference Ni_err is calculated in Step 4406.

Next, proportional correction value DNi_p, integral correction value DNi_i, and differential correction value DNi_err are calculated by using rotation speed difference Ni_err, rotation speed difference integral value Ni_errI, rotation speed difference differential value dNi_err, proportional correction gain Kp, integral correction gain Ki, and differential correction gain Kd in Step 4407.

Next, feedback torque Tq_FB is set in Step 4408. Assumed that the inertia coefficient from the engine to the input shaft is J and the unit conversion coefficient is α, the feedback torque is calculated as Tq_FB=J×(Dni_p+Dni_I+Dni_d)×α.

As described above, it is possible to improve the shift quality by preventing the required shift time from becoming long or oppositely short as shown in FIG. 36 even if the machine difference between assist clutches or the deterioration with age occurs, and to shift as shown in FIG. 35. Further, when the transfer torque characteristics of the assist clutch is changed by the replacement of the assist clutch or the exchange of the assist clutch hydraulic operating fluid, the required shift time is converged whenever shifting is repeated as shown in FIG. 20.

Next, the content of the processing of the example to which the failure diagnosis function to the assist clutch is added to the shift control by the vehicle control apparatus by the second embodiment will be explained with reference to FIG. 45 and FIG. 46.

Figure 45:
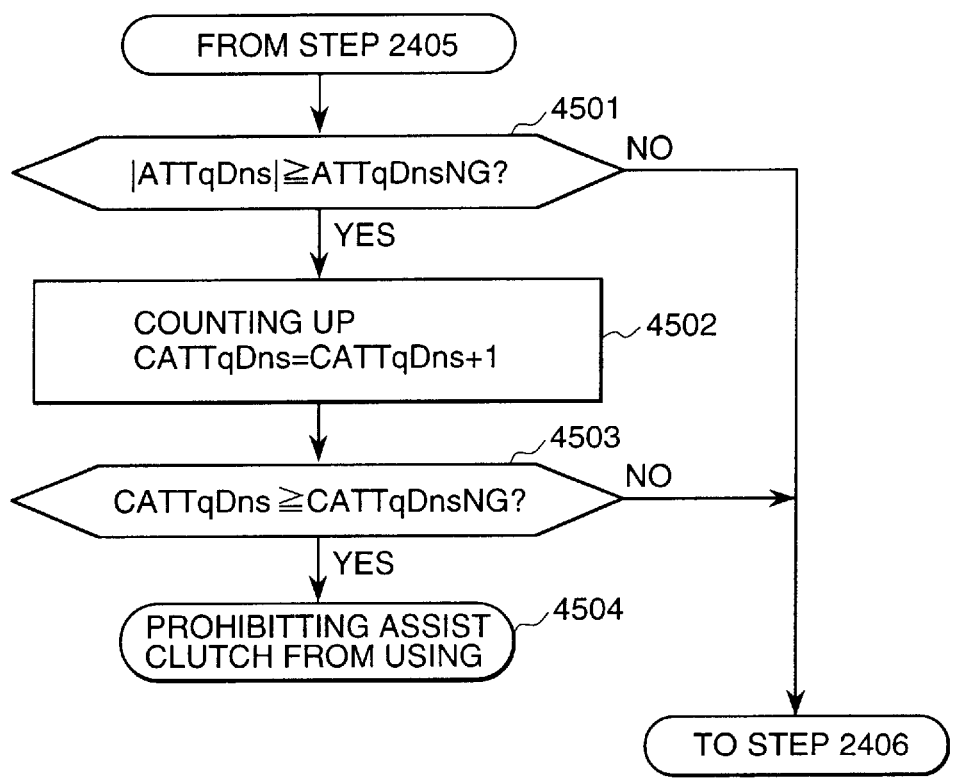
FIG. 45 is a flow chart showing the content of the failure diagnosis processing of the assist clutch added to the shift control by vehicle control apparatus according to the second embodiment of the present invention.

FIG. 45 is a flow chart showing the content of the failure diagnosis processing of the assist clutch added to the shift control by vehicle control apparatus according to the second embodiment of the present invention.

The failure diagnosis processing of the assist clutch according to this embodiment is added to the calculating processing of the learning correction value shown in FIG. 24. Namely, Step 4501, Step 4502 and Step 4503 are added between Step 2405 and Step 2406 in FIG. 24, and the processing of Step 4504 is newly added.

In Step 4501, power train control unit 100 judges whether or not the absolute value of torque difference average value ATTqDns calculated in Step 2405 of FIG. 24 is larger than the specified value ATTqDnSNG. When it is large, the processing advances to Step 4502, Otherwise, the processing returns to Step 4506 of FIG. 24.

When the absolute value of torque difference average value ATTqDns is larger than the specified value ATTqDnsNG, the frequency that the absolute value of torque difference average value ATTqDns becomes larger than the specified value ATTqDnsNG is counted in Step 4502. The counter CATTqDns is counted up, and the processing advances to Step 4503.

Next, in Step 4503, it is judged whether counter CATTqDns is larger than fixed count CATTqDnsNG. When it is small, the processing returns to Step 4506 of FIG. 24, and when it is large, the processing advances to Step 4504.

When counter CATTqDns is larger than fixed count CATTqDnsNG, the use of the assist clutch is prohibited in Step 4504. Further, it is preferable to light warning lamp 104 of FIG. 1 and inform the driver. Here, it is possible to use a buzzer as an information means to the driver instead of the warning lamp.

The shifting when the use of the assist clutch is prohibited in Step 4504 is performed by engaging input shaft clutch input disk 2 and output disk 3 after input shaft clutch input disk 2 and output disk 3 are disengaged in the beginning, and the shift position and the select position are changed to the target position.

Next, the content of the control of up-shift from the 2nd gear position to the 3rd gear position when the use of the assist clutch is prohibited will be explained with reference to FIG. 46.

Figure 46:
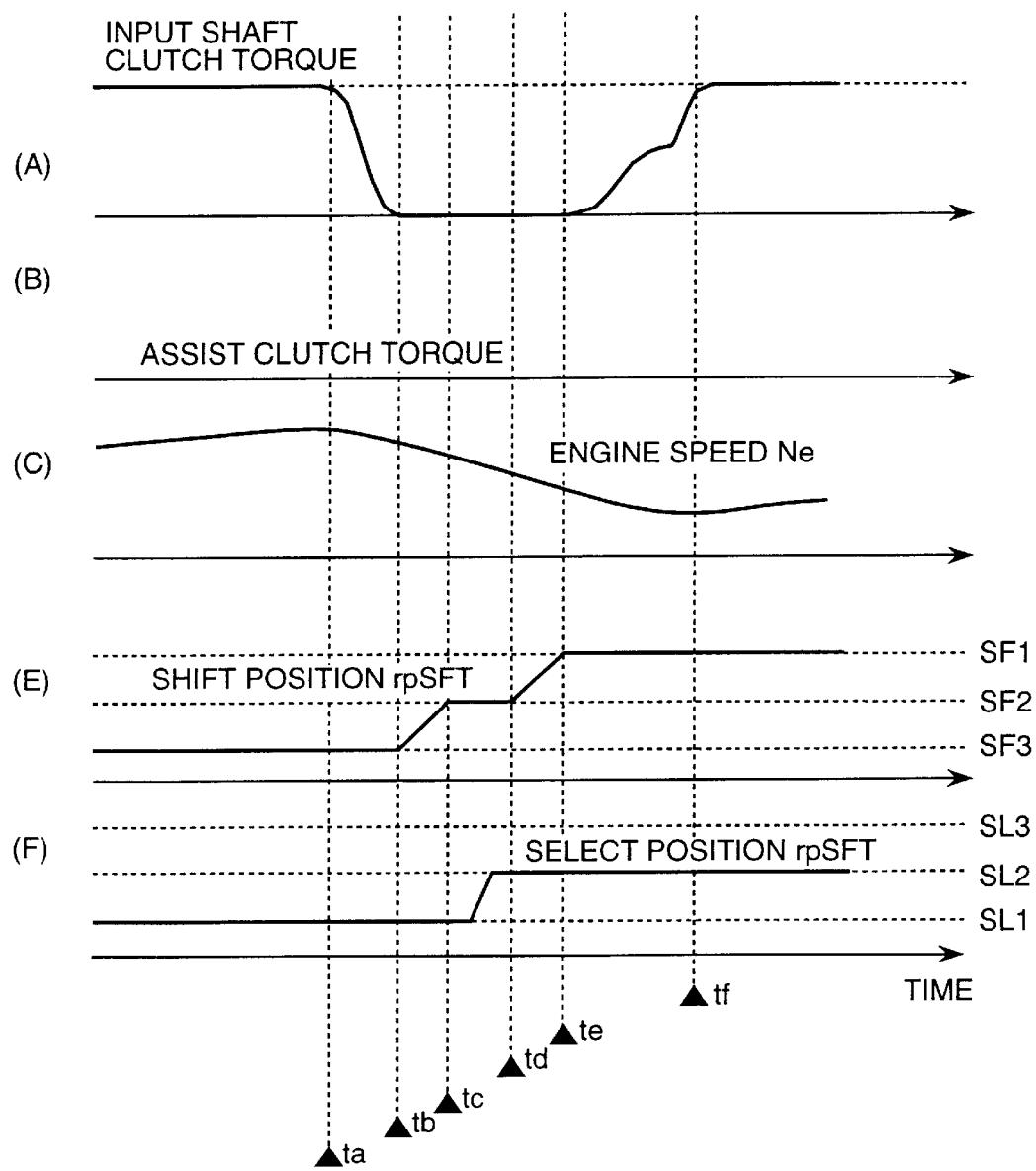
FIG. 46 is a time chart showing the processing when the use of the assist clutch is prohibited based on the diagnosis processing of the assist clutch added to the shift control by vehicle control apparatus according to the second embodiment of the present invention.

FIG. 46 is a time chart showing the processing when the use of the assist clutch is prohibited based on the diagnosis processing of the assist clutch added to the shift control by vehicle control apparatus according to the second embodiment of the present invention.

When the shifting is started at time ta, the input shaft clutch torque shown in FIG. 46(A) decreases in the beginning, and engine rotation speed Ne of FIG. 46(C) begins to decrease. Shift position rpSFT of FIG. 46(D) moves from SF3 to SF2 between time tb and time tc, select position rpSEL of FIG. 46(E) moves from SL1 to SL2 between time tc and time td, and shift position rpSFT of FIG. 46(D) moves from SF2 to SF1 between time td and time te. Finally, the input shaft clutch torque of FIG. 46(A) rises between time te and time tf, and the shifting is completed. The assist clutch torque is kept disengaging as shown in FIG. 46(B).

The assist clutch can be diagnosed by this embodiment as explained above, and the use of the assist clutch can be prohibited at the breakdown.

Next, the content of the processing of the example to which the failure diagnosis function of the assist clutch is added to the shift control by the vehicle control apparatus according to the third embodiment will be explained with reference to FIG. 47.

Figure 47:
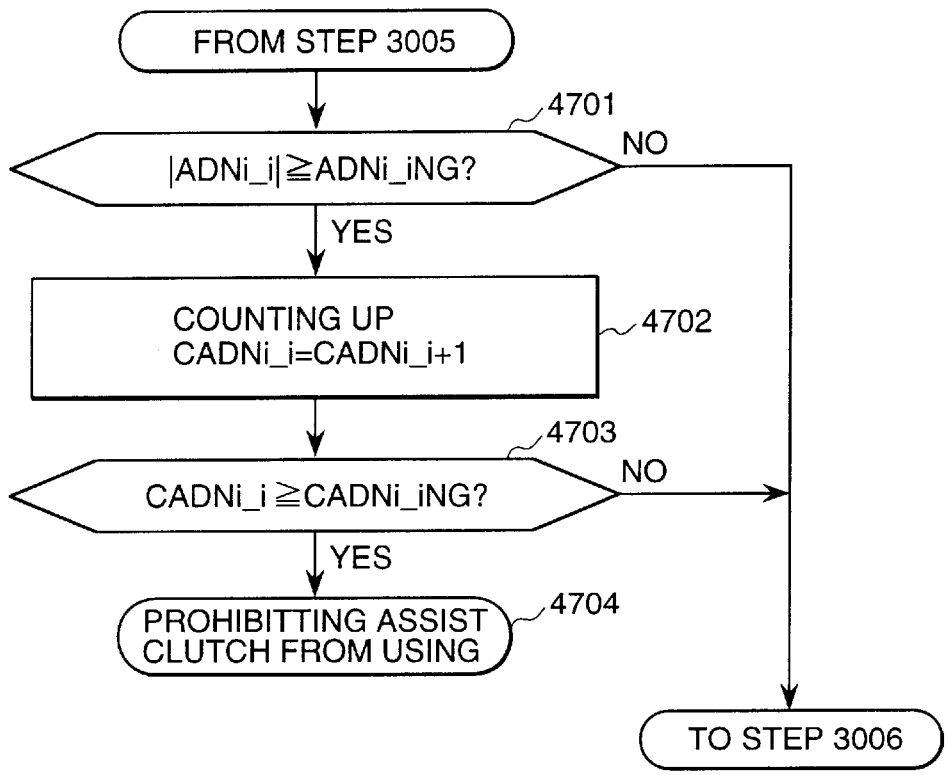
FIG. 47 is a flow chart showing the content of the failure diagnosis processing of the assist clutch added to the shift control by vehicle control apparatus according to the third embodiment of the present invention.

FIG. 47 is a flow chart showing the content of the failure diagnosis processing of the assist clutch added to the shift control by vehicle control apparatus according to the third embodiment of the present invention.

The failure diagnosis processing of the assist clutch according to this embodiment is added to the calculating processing of the learning correction value shown in FIG. 30. Namely, Step 4701, Step 4702 and Step 4703 are added between Step 3005 and Step 3006 in FIG. 30, and the processing of Step 4704 is newly added.

In Step 4701, power train control unit 100 judges whether or not the absolute value of integral correction average value ADNi_i calculated in Step 3005 of FIG. 30 is larger than the specified value ADNi_iNG. When it is large, the processing advances to Step 4702, Otherwise, the processing returns to Step 3006 of FIG. 30.

When the absolute value of integral correction average value ADNi_i is larger than the specified value ADNi_iNG, the frequency that the absolute value of integral correction average value ADNi_i becomes larger than specified value ADNi_iNG is counted in Step 4702. Counter CADNi_i is counted up, and the processing advances to Step 4703.

Next, in Step 4703, it is judged whether counter CADNi_i is larger than fixed count CADNi_iNG. When it is small, the processing returns to Step 3006 of FIG. 30, and when it is large, the processing advances to Step 4704.

When counter CADNi_i is larger than fixed count CADNi_iNG, the use of the assist clutch is prohibited in Step 4704. Further, it is preferable to light warning lamp 104 of FIG. 1 and inform the driver. Here, it is possible to use a buzzer as an information means to the driver instead of the warning lamp.

The shifting when the use of the assist clutch is prohibited in Step 4704 is performed by engaging input shaft clutch input disk 2 and output disk 3 after input shaft clutch input disk 2 and output disk 3 are disengaged in the beginning, and the shift position and the select position are changed to the target position. The time chart at up-shifting from the second gear position to the third gear position when the use of the assist clutch is prohibited in Step 4704 is similar to one of FIG. 46.

The assist clutch can be diagnosed by this embodiment as explained above, and the use of the assist clutch can be prohibited at the breakdown.

Next, the content of the processing of the example to which the deterioration diagnosis function of the assist clutch is added to the shift control by the vehicle control apparatus according to the second embodiment will be explained with reference to FIG. 48.

Figure 48:
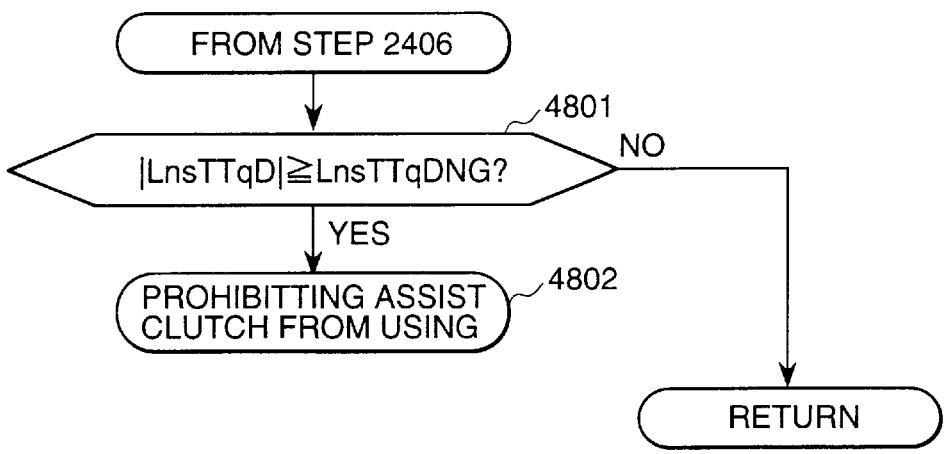
FIG. 48 is a flow chart showing the content of the deterioration diagnosis processing of the assist clutch added to the shift control by vehicle control apparatus according to the second embodiment of the present invention.

FIG. 48 is a flow chart showing the content of the deterioration diagnosis processing of the assist clutch added to the shift control by vehicle control apparatus according to the second embodiment of the present invention.

The dterioration diagnosis processing of the assist clutch according to this embodiment is added to the calculating processing of the learning correction value shown in FIG. 24.

Namely, Step 4801 and Step 4802 are added after Step 2406 in FIG. 24.

In Step 4801, power train control unit 100 judges whether or not the absolute value of learning correction value LnsTTqD calculated in Step 2406 of FIG. 24 is larger than the specified value LnsTTqDNG. When it is small, the processing is ended.

When it is large, the processing advances to Step 4802, and the use of the assist clutch is prohibited. Further, it is preferable to light warning lamp 104 of FIG. 1 and inform the driver. Here, it is possible to use a buzzer as an information means to the driver instead of the warning lamp.

The shifting when the use of the assist clutch is prohibited in Step 4802 is performed by engaging input shaft clutch input disk 2 and output disk 3 after input shaft clutch input disk 2 and output disk 3 are disengaged in the beginning, and the shift position and the select position are changed to the target position. The time chart at up-shifting from the second gear position to the third gear position when the use of the assist clutch is prohibited in Step 4802 is similar to one of FIG. 46.

Here, the deterioration diagnosis function of FIG. 48 can be added to the control flow of the embodiment shown in FIG. 30 as well as FIG. 24. Further, The function can be added to the control flow of the embodiment in which the failure diagnosis function is added as shown in FIG. 45 and FIG. 47. Preferably, the function is added to FIG. 45 or FIG. 47.

The assist clutch can be diagnosed by this embodiment as explained above, and the use of the assist clutch can be prohibited at the deterioration.

Next, the content of the processing of the example to which the deterioration diagnosis function of the assist clutch is added to the shift control by the vehicle control apparatus according to the fourth embodiment will be explained with reference to FIG. 49.

Figure 49:
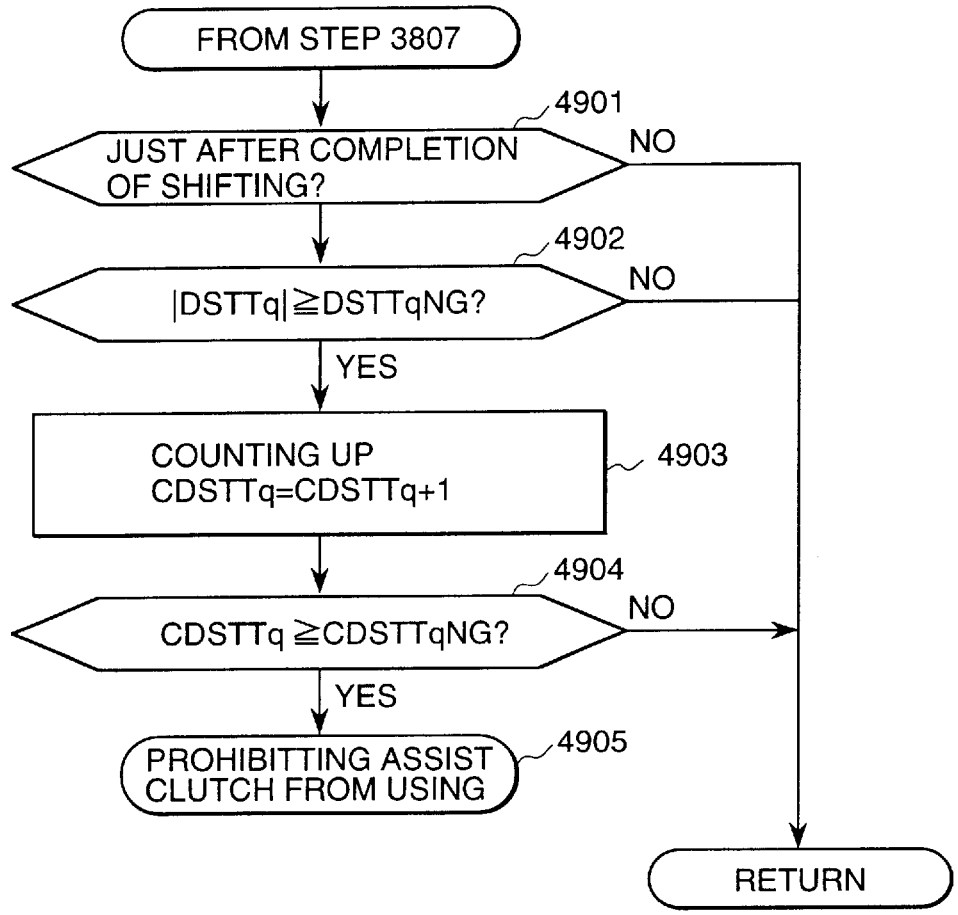
FIG. 49 is a flow chart showing the content of the deterioration diagnosis processing of the assist clutch added to the shift control by vehicle control apparatus according to the fourth embodiment of the present invention.

FIG. 49 is a flow chart showing the content of the deterioration diagnosis processing of the assist clutch added to the shift control by vehicle control apparatus according to the fourth embodiment of the present invention.

The deterioration diagnosis processing of the assist clutch according to this embodiment is added to the calculating processing of the learning correction value shown in FIG. 38. Namely, Step 4901, Step 4902, Step 4903 and Step 4904 are added after Step 3807 in FIG. 38, and the processing of Step 4905 is newly added.

In Step 4701, power train control unit 100 judges whether or not it is just after the shifting is completed. If so, the processing advances to Step 4902, Otherwise, the processing is ended.

It is judged whether the absolute value of area difference DSTTq calculated in Step 3807 of FIG. 38 is larger than specified value DSTTqNG in Step 4902 immediately after the shifting end. When it is large, the processing advances to Step 4903, and the processing is ended.

When the absolute value of area difference DSTTq is larger than the specified value DSTTqNG, the frequency that the absolute value of area difference-DSTTq becomes larger than specified value DSTTqNG is counted in Step 4903. Counter CDSTTq is counted up, and the processing advances to Step 4904.

Next, in Step 4904, it is judged whether counter CDSTTq is larger than fixed count CDSTTqNG. When it is small, the processing is completed. When it is large, the processing advances to Step 4905, and the use of the assist clutch is prohibited. Further, it is preferable to light warning lamp 104 of FIG. 1 and inform the driver. Here, it is possible to use a buzzer as an information means to the driver instead of the warning lamp.

The shifting when the use of the assist clutch is prohibited in Step 4905 is performed by engaging input shaft clutch input disk 2 and output disk 3 after input shaft clutch input disk 2 and output disk 3 are disengaged in the beginning, and the shift position and the select position are changed to the target position. The time chart at up-shifting from the second gear position to the third gear position when the use of the assist clutch is prohibited in Step 4802 is similar to one of FIG. 46.

The assist clutch can be diagnosed by this embodiment as explained above, and the use of the assist clutch can be prohibited at the deterioration.

Next, the content of the processing of a second example to which the deterioration diagnosis function of the assist clutch is added to the shift control by the vehicle control apparatus according to the fourth embodiment will be explained with reference to FIG. 50.

Figure 50:
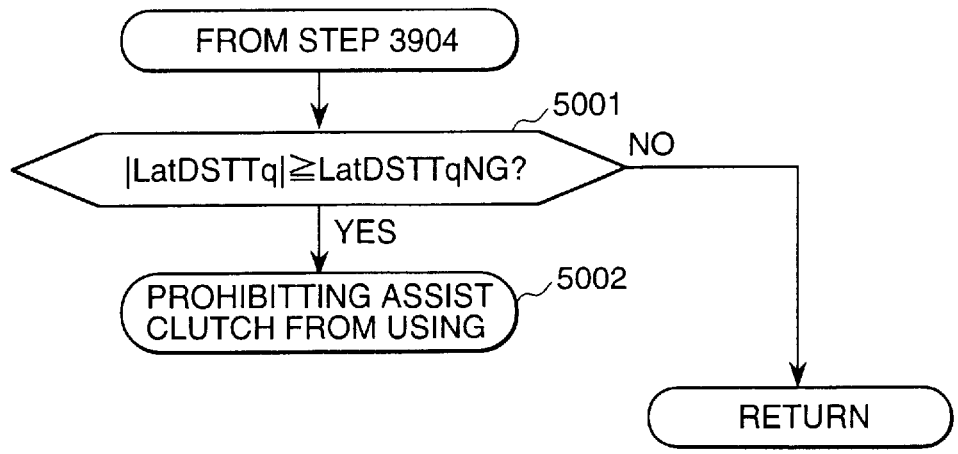
FIG. 50 is a flow chart showing the content of the deterioration diagnosis processing of the assist clutch added to the shift control by vehicle control apparatus according to the fourth embodiment of the present invention.

FIG. 50 is a flow chart showing the content of the deterioration diagnosis processing of the assist clutch added to the shift control by vehicle control apparatus according to the fourth embodiment of the present invention.

The deterioration diagnosis processing of the assist clutch according to this embodiment is added to the calculating processing of the learning correction value shown in FIG. 39. Namely, Step 5001 and Step 5002 are added after Step 3904 in FIG. 38.

In Step 5001, power train control unit 100 judges whether or not the absolute value of assist torque learning correction value LatDSTTq calculated in Step 3904 of FIG. 39 is larger than the specified value LatDSTTqNG. When it is small, the processing is completed.

When it is large, the processing advances to Step 5002, and the use of the assist clutch is prohibited. Further, it is preferable to light warning lamp 104 of FIG. 1 and inform the driver. Here, it is possible to use a buzzer as an information means to the driver instead of the warning lamp.

The shifting when the use of the assist clutch is prohibited in Step 4905 is performed by engaging input shaft clutch input disk 2 and output disk 3 after input shaft clutch input disk 2 and output disk 3 are disengaged in the beginning, and the shift position and the select position are changed to the target position. The time chart at up-shifting from the second gear position to the third gear position when the use of the assist clutch is prohibited in Step 4802 is similar to one of FIG. 46.

Here, the deterioration diagnosis function of FIG. 50 can be added to the control flow of the embodiment shown in FIG. 16 or FIG. 49 as well as FIG. 39.

The assist clutch can be diagnosed by this embodiment as explained above, and the use of the assist clutch can be prohibited at the deterioration.

As described above, the breakdown or the deterioration of the assist clutch can be judged by providing the function of the failure diagnosis or the deterioration diagnosis shown in FIG. 45 to FIG. 50, and a further breakdown and deterioration can be prevented from occurring.

The configuration and the operation of a sixth embodiment of a vehicle control apparatus according to the present invention will be described below, referring to FIG. 51.

Figure 51:
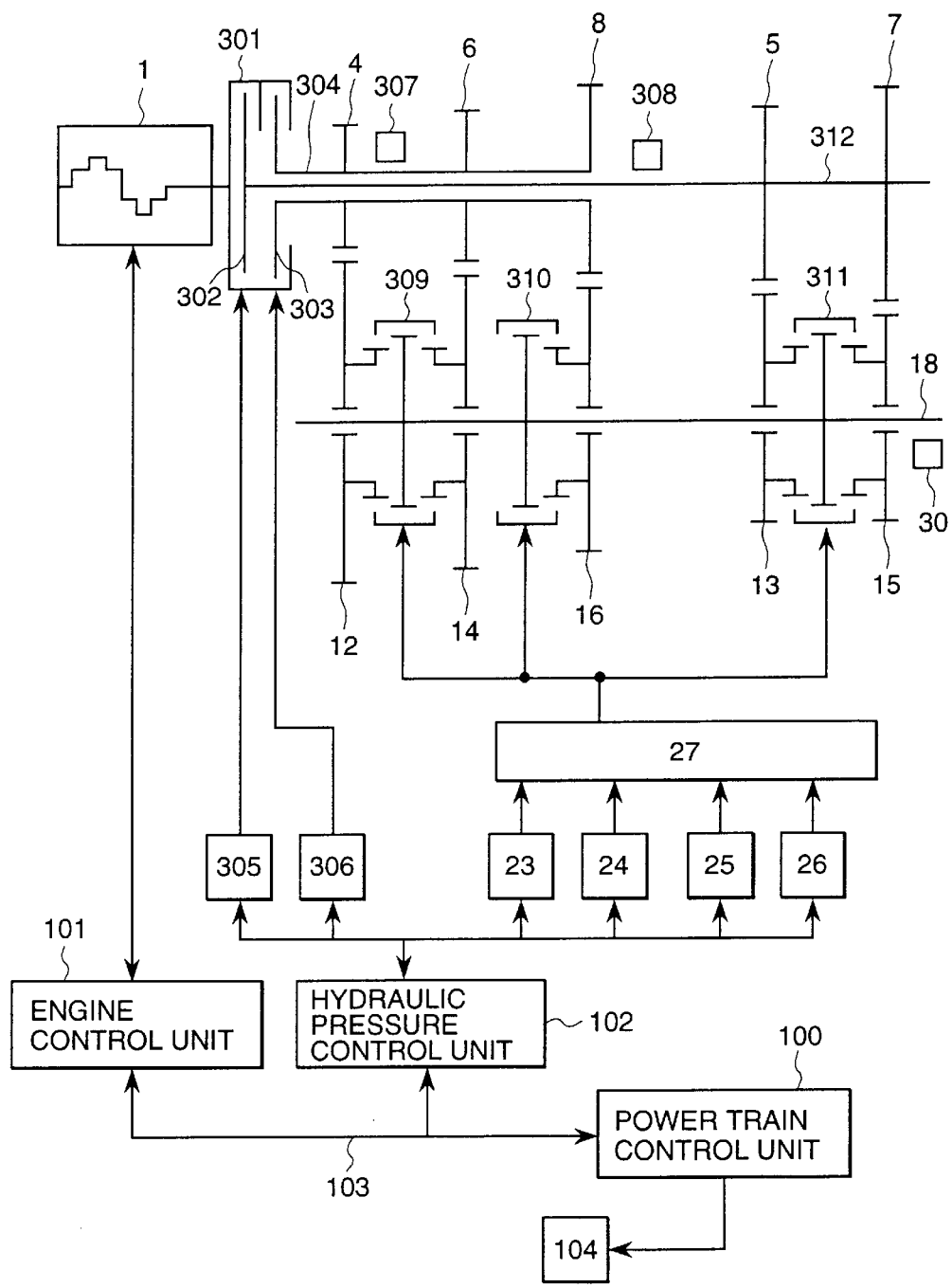
FIG. 51 is a system diagram showing the configuration of a vehicle control apparatus according to a sixth embodiment of the present invention.

FIG. 51 is a system diagram showing the configuration of a vehicle control apparatus of a sixth embodiment of the present invention. In the figure, the same numerals as in FIG. 1 designates like parts.

A point of the present embodiment different from the embodiment of FIG. 1 is as flows. Although the embodiment shown in FIG. 1 is constructed in that the torque of the engine 1 is transmitted to the transmission input shaft 10 by engaging the first clutch input disk 2 with the second clutch output disk 3, the present embodiment is constructed using a twin clutch. That is, a first clutch input disk 301 is directly connected to the engine 1, and a first clutch first output disk 302 is directly connected to a transmission first input shaft 312, and a first clutch second output disk 303 is directly connected to a transmission second input shaft 304. The transmission second input shaft 304 is formed in a hollow shaft, and the transmission first input shaft 312 is penetrated through the hollow portion of the transmission second input shaft 304 so that the transmission first input shaft 312 can be rotated in the rotation direction relative to the transmission second input shaft 304. The first drive gear 4, the third drive gear 6 and the fifth drive gear 8 are fixed to the transmission second input shaft 304, and are rotatable with respect to the transmission first input shaft 312. Further, the second drive gear 5 and the fourth drive gear 7 is fixed to the transmission first input shaft 312, and are rotatable with respect to the transmission second input shaft 304. The engaging and disengaging of the first clutch input disk 301 with and from the first clutch first output disk 302 is performed by a first clutch actuator 305, and the engaging and disengaging of the first clutch input disk 301 with and from the first clutch second output disk 303 is performed by a first clutch actuator 306.

Further, a first engaging clutch 309 having a synchronizer mechanism for engaging the first driven gear 12 with the transmission output shaft 18 and for engaging the third driven gear 14 with the transmission output shaft 18 is provided between the first driven gear 12 and the third driven gear 14. Accordingly, the rotation torque transmitted from the first drive gear 4 or the third drive gear 6 to the first driven gear 12 or the third driven gear 14 is transmitted to the first engaging clutch 309, and then transmitted to the transmission output shaft 18 through the first engaging clutch 309.

Further, a third engaging clutch 311 having a synchronizer mechanism for engaging the second driven gear 13 with the transmission output shaft 18 and for engaging the fourth driven gear 15 with the transmission output shaft 18 is provided between the third driven gear 13 and the fourth driven gear 15. Accordingly, the rotation torque transmitted from the second drive gear 5 or the fourth drive gear 7 to the second driven gear 13 or the fourth driven gear 15 is transmitted to the third engaging clutch 311, and then transmitted to the transmission output shaft 18 through the third engaging clutch 311.

Further, a second engaging clutch 310 having a synchronizer mechanism for engaging the fifth driven gear 15 with the transmission output shaft 18 is provided in the fifth driven gear 16. Accordingly, the rotation torque transmitted from the fifth drive gear 8 to the fifth driven gear 16 is transmitted to the second engaging clutch 310, and then transmitted to the transmission output shaft 18 through the second engaging clutch 310.

For example, letting a case where the torque is transmitted to the transmission output shaft 18 using the first drive gear 4 and the first driven gear 12 be a first gear position; a case where the torque is transmitted to the transmission output shaft 18 using the third drive gear 6 and the third driven gear 14 be a third gear position; and a case where the torque is transmitted to the transmission output shaft 18 using the fourth drive gear 7 and the fourth driven gear 15 be a fourth gear position, the up-shift shifting from the first gear position to the third gear position or the down-shift shifting from the third gear position to the first gear position is performed by executing control similar to the control of the assist clutch in the embodiment illustrated in FIG. 1 using the first clutch first output disk 302 from the condition of keeping the first clutch first output disk 302 in the disengaging state and keeping the third engaging clutch 311 and the fourth driven gear 15 in the engaging state. By doing so, the torque waveform and input rotation speed during shifting can be controlled.

Further, for example, letting a case where the torque is transmitted to the transmission output shaft 18 using the second drive gear 5 and the second driven gear 13 be a second gear position; a case where the torque is transmitted to the transmission output shaft 18 using the fourth drive gear 7 and the fourth driven gear 15 be a fourth gear position; and a case where the torque is transmitted to the transmission output shaft 18 using the fifth drive gear 8 and the fifth driven gear 16 be a fifth gear position, the up-shift shifting from the second gear position to the fourth gear position or the down-shift shifting from the fourth gear position to the second gear position is performed by executing control similar to the control of the assist clutch in the embodiment illustrated in FIG. 1 using the first clutch second output disk 303 from the condition of keeping the first clutch second output disk 303 in the disengaging state and keeping the second engaging clutch 310 and the fifth driven gear 16 in the engaging state. By doing so, the torque waveform and input rotation speed during shifting can be controlled.

Therefore, a thrust force (first input shaft clutch torque) between input shaft clutch input disk 301 and input shaft clutch first output disk 302, a thrust force (second input shaft clutch torque) between input shaft clutch input disk 301 and input shaft clutch second output disk 303, the learning and the failure diagnosis can be obtained.

Here, the correction value calculating processing can be composed by the combination of FIG. 16 and FIG. 22, or FIG. 16 and FIG. 28, or FIG. 37 and FIG. 22, or FIG. 37 and FIG. 28.

As described above, it is possible to improve the shift quality by preventing the rotation synchronous required time from becoming long or oppositely short even if the machine difference between assist clutches or the deterioration with age occurs. Further, it is possible to improve the shift quality by preventing the rotation synchronous required time from becoming long or oppositely short even if the transfer torque characteristics of the assist clutch is changed by the replacement of the assist clutch or the exchange of the assist clutch hydraulic operating fluid, the required shift time is converged whenever shifting is repeated.

As described above, because the command value of assist clutch is corrected so that the required shift time may approaches to the target required shift time, it is possible to improve the shift quality even if the machine difference between assist clutches or the deterioration with age occurs.

Further, it is possible to improve the shift quality by correcting the command value of assist clutch so that the required shift time may approaches to the target required shift time even if the transfer torque characteristics of the assist clutch is changed by the replacement of the assist clutch or the exchange of the assist clutch hydraulic operating fluid.

What is claimed is:

1. A method of controlling a vehicle including a driving force source for generating the driving force, a cogwheel type transmission provided with a plurality of cogwheel rows, and a plurality of torque transfer means provided between an input shaft and an output shaft of said transmission, at least one above torque transfer means being a friction transfer means, comprising the Steps of controlling said friction transfer means when shifting from one cogwheel row to the other cogwheel row, setting a target synchronous rotation speed based on an output rotation speed of said transmission and at least one of parameters indicative of the state of said driving force source or said transmission, and setting an command value to said friction transfer means so that an input rotation speed of said transmission may be synchronized with said target synchronous rotation speed, further comprising the Steps of:

setting a target required shift time based on at least one of parameters indicative of the state of said driving force source or said transmission, and correcting the command value to said friction transfer means so that a required shift time from a shifting start to a shifting end may approach at said target required shift time.

2. A method of controlling a vehicle according to claim 1, wherein the command value to said friction transfer means is corrected so that the transfer torque of said friction transfer means may be increased when said input rotation speed is larger than said target synchronous rotation speed.

3. A method of controlling a vehicle according to claim 1, wherein the command value to said friction transfer means is corrected so that the transfer torque of said friction transfer means may be decreased when said input rotation speed is smaller than said target synchronous rotation speed.

4. A method of controlling a vehicle according to claim 1, wherein the command value to said friction transfer means is corrected so that said required shift time may approach at said target required shift time whenever shifting is repeated.

5. A method of controlling a vehicle including a driving force source for generating the driving force, a cogwheel type transmission provided with a plurality of cogwheel rows, and a plurality of torque transfer means provided between an input shaft and an output shaft of said transmission, at least one above torque transfer means being a friction transfer means, comprising the Steps of controlling said friction transfer means when shifting from one cogwheel row to the other cogwheel row, setting a target synchronous rotation speed based on an output rotation speed of said transmission and at least one of parameters indicative of the state of said driving force source or said transmission, and setting an command value to said friction transfer means so that an input rotation speed of said transmission may be synchronized with said target synchronous rotation speed, further comprising the Steps of:

correcting the command value to said friction transfer means by calculating the correction of the command value to said friction transfer means based on the difference between said target synchronous rotation speed and said input rotation speed.

6. A method of controlling a vehicle including a driving force source for generating the driving force, a cogwheel type transmission provided with a plurality of cogwheel rows, and a plurality of torque transfer means provided between an input shaft and an output shaft of said transmission, at least one above torque transfer means being a friction transfer means, comprising the Steps of controlling said friction transfer means when shifting from one cogwheel row to the other cogwheel row, setting a feed forward command value to said friction transfer means based on at least one of parameters indicative of the state of said driving force source or said transmission, setting a target synchronous rotation speed based on at least one of parameters indicative of the state of said driving force source or said transmission, setting a feedback command value to said friction transfer means based on the difference between said target synchronous rotation speed and said input rotation speed of the transmission, controlling an input rotation speed of said transmission and an output shaft torque of said transmission under shifting by setting a command value to said friction transfer means based on said feedforward command value and said feedback command value, further comprising the Steps of:

correcting the command value to said friction transfer means by calculating the correction of the command value to said friction transfer means based on the difference between said feedforward command value and the command value to said friction transfer means.

7. A method of controlling a vehicle according to claim 5, wherein the command value to said friction transfer means is corrected by calculating the correction of said command value when the synchronous time required until said input rotation speed is synchronized with said target synchronous rotation speed becomes larger than the predetermined time.

8. A method of controlling a vehicle according to claim 5, wherein the command value to said friction transfer means is corrected by calculating the correction of said command value when the amount of the change per unit time in said input rotation speed is within the fixed range.

9. A method of controlling a vehicle according to claim 5, wherein the command value to said friction transfer means is corrected by calculating the correction of said command value when the amount of the change per unit time in said output rotation speed is within the fixed range.

10. A method of controlling a vehicle according to claim 5, wherein the command value to said friction transfer means is corrected by calculating the correction of said command value when the amount of the change per unit time in said input torque is within the fixed range.

11. A method of controlling a vehicle according to claim 5, wherein the command value to said friction transfer means is corrected by calculating the correction of said command value when the amount of the change per unit time in the opening of an accelerator pedal is within the fixed range.

12. A method of controlling a vehicle according to claim 5, wherein the command value to said friction transfer means is corrected so that the required shift time may approach at said target required shift time whenever shifting is repeated.

13. A method of controlling a vehicle including a driving force source for generating the driving force, a cogwheel type transmission provided with a plurality of cogwheel rows, and a plurality of torque transfer means provided between an input shaft and an output shaft of said transmission, at least one above torque transfer means being a friction transfer means, comprising the Steps of controlling said friction transfer means when shifting from one cogwheel row to the other cogwheel row, setting a feed forward command value to said friction transfer means based on at least one of parameters indicative of the state of said driving force source or said transmission, setting a target synchronous rotation speed based on at least one of parameters indicative of the state of said driving force source or said transmission, setting a feedback command value to said friction transfer means based on the difference between said target synchronous rotation speed and an input rotation speed of the transmission, controlling the input rotation speed of said transmission and an output shaft torque of said transmission under shifting by setting a command value to said friction transfer means based on said feedforward command value and said feedback command value, further comprising the Steps of:

correcting the command value to said friction transfer means by calculating the correction of the command value to said friction transfer means based on the difference between an integral value of said feedforward command value and an integral value of the command value to said friction transfer means.

14. A method of controlling a vehicle including a driving force source for generating the driving force, a cogwheel type transmission provided with a plurality of cogwheel rows, and a plurality of torque transfer means provided between an input shaft and an output shaft of said transmission, at least one above torque transfer means being a friction transfer means, comprising the Steps of controlling said friction transfer means when shifting from one cogwheel row to the other cogwheel row, setting a target input rotation speed based on at least one of parameters indicative of the state of said driving force source or said transmission, setting a feed forward command value to said friction transfer means based on at least one of parameters indicative of the state of said driving force source or said transmission, setting a target synchronous rotation speed based on at least one of parameters indicative of the state of said driving force source or said transmission, setting a feedback command value to said friction transfer means based on the difference between said target synchronous rotation speed and an input rotation speed of the transmission, controlling the input rotation speed of said transmission and an output shaft torque of said transmission under shifting by setting a command value to said friction transfer means based on said feedforward command value and said feedback command value, further comprising the Steps of:

correcting the command value to said friction transfer means by calculating the correction of the command value to said friction transfer means based on the difference between an integral value of said feedforward command value and an integral value of the command value to said friction transfer means.

15. A method of controlling a vehicle according to claim 5, wherein the command value to said friction transfer means is corrected by calculating the correction of said command value when the amount of the change per unit time in said output rotation speed is within the fixed range.

16. A method of controlling a vehicle according to claim 5, wherein the command value to said friction transfer means is corrected by calculating the correction of said command value when the amount of the change per unit time in said input torque is within the fixed range.

17. A method of controlling a vehicle according to claim 5, wherein the command value to said friction transfer means is corrected by calculating the correction of said command value when the amount of the change per unit time in the opening of an accelerator pedal is within the fixed range.

18. A method of controlling a vehicle according to claim 13, wherein the command value to said friction transfer means is corrected so that the required shift time from the shifting start to the shifting end may approach at said target required shift time whenever shifting is repeated.

19. A method of controlling a vehicle according to claim 1, wherein shifting is carried out with said friction transfer means opened when the correction value of said friction transfer means becomes larger than a fixed value.

20. A method of controlling a vehicle according to claim 1, wherein shifting is carried out with said friction transfer means opened when the correction value of said friction transfer means becomes smaller than a fixed value.

21. A vehicle control apparatus including a driving force source for generating the driving force, a cogwheel type transmission provided with a plurality of cogwheel rows, a plurality of torque transfer means provided between an input shaft and an output shaft of said transmission, at least one of said torque transfer means being a friction transfer means, and a shift control means for controlling said friction transfer means when shifting from one cogwheel row to the other cogwheel row, said shift control means setting a target synchronous rotation speed based on an output rotation speed of said transmission and at least one of parameters indicative of the state of said driving force source or said transmission, and setting an command value to said friction transfer means so that an input rotation speed of said transmission may be synchronized with said target synchronous rotation speed, wherein said shift control means sets a target required shift time based on at least one of parameters indicative of the state of said driving force source or said transmission, and corrects the command value to said friction transfer means so that a required shift time from a shifting start to a shifting end may approach at said target required shift time.

22. A vehicle control apparatus including a driving force source for generating the driving force, a cogwheel type transmission provided with a plurality-of cogwheel rows, a plurality of torque transfer means provided between an input shaft and an output shaft of said transmission, at least one of said torque transfer means being a friction transfer means, and a shift control means for controlling said friction transfer means when shifting from one cogwheel row to the other cogwheel row, said shift control means setting a target synchronous rotation speed based on an output rotation speed of said transmission and at least one of parameters indicative of the state of said driving force source or said transmission, and setting an command value to said friction transfer means so that an input rotation speed of said transmission may be synchronized with said target synchronous rotation speed, wherein:

said shift control means corrects the command value to said friction transfer means by calculating the correction of the command value to said friction transfer means based on the difference between said target synchronous rotation speed and said input rotation speed.

23. A vehicle control apparatus including a driving force source for generating the driving force, a cogwheel type transmission provided with a plurality of cogwheel rows, a plurality of torque transfer means provided between an input shaft and an output shaft of said transmission, at least one of said torque transfer means being a friction transfer means, and a shift control means for controlling said friction transfer means when shifting from one cogwheel row to the other cogwheel row, said shift control means setting a feed forward command value to said friction transfer means based on at least one of parameters indicative of the state of said driving force source or said transmission, setting a target synchronous rotation speed based on at least one of parameters indicative of the state of said driving force source or said transmission, setting a feedback command value to said friction transfer means based on the difference between said target synchronous rotation speed and an input rotation speed of the transmission, controlling the input rotation speed of said transmission and an output shaft torque of said transmission under shifting by setting a command value to said friction transfer means based on said feedforward command value and said feedback command value, wherein said shift control means corrects the command value to said friction transfer means by calculating the correction of the command value to said friction transfer means based on the difference between said feedforward command value and the command value to said friction transfer means.

24. A transmission comprising a cogwheel type transmission provided with a plurality of cogwheel rows, a plurality of torque transfer means provided between an input shaft and an output shaft of said transmission, at least one of said torque transfer means being a friction transfer means, and a shift control means for controlling said friction transfer means when shifting from one cogwheel row to the other cogwheel row, said shift control means setting a target synchronous rotation speed based on an output rotation speed of said transmission and at least one of parameters indicative of the state of said driving force source or said transmission, and setting an command value to said friction transfer means so that an input rotation speed of said transmission may be synchronized with said target synchronous rotation speed, wherein said shift control means sets an target required shift time based on at least one of parameters indicative of the state of said driving force source or said transmission, and corrects the command value to said friction transfer means so that a required shift time from a shifting start to a shifting end may approach at said target required shift time.

25. A transmission comprising a cogwheel type transmission provided with a plurality of cogwheel rows, a plurality of torque transfer means provided between an input shaft and an output shaft of said transmission, at least one of said torque transfer means being a friction transfer means, and a shift control means for controlling said friction transfer means when shifting from one cogwheel row to the other cogwheel row, said shift control means setting a target synchronous rotation speed based on an output rotation speed of said transmission and at least one of parameters indicative of the state of said driving force source or said transmission, and setting an command value to said friction transfer means so that an input rotation speed of said transmission may be synchronized with said target synchronous rotation speed, wherein said shift control means corrects the command value to said friction transfer means by calculating the correction of the command value to said friction transfer means based on the difference between said target synchronous rotation speed and said input rotation speed.

26. A transmission comprising a cogwheel type transmission provided with a plurality of cogwheel rows, a plurality of torque transfer means provided between an input shaft and an output shaft of said transmission, at least one of said torque transfer means being a friction transfer means, and a shift control means for controlling said friction transfer means when shifting from one cogwheel row to the other cogwheel row, said shift control means setting a feed forward command value to said friction transfer means based on at least one of parameters indicative of the state of said driving force source or said transmission, setting a target synchronous rotation speed based on at least one of parameters indicative of the state of said driving force source or said transmission, setting a feedback command value to said friction transfer means based on the difference between said target synchronous rotation speed and an input rotation speed of the transmission, controlling the input rotation speed of said transmission and an output shaft torque of said transmission under shifting by setting a command value to said friction transfer means based on said feedforward command value and said feedback command value, wherein:

said shift control means corrects the command value to said friction transfer means by calculating the correction of the command value to said friction transfer means based on the difference between said feedforward command value and the command value to said friction transfer means.

27. An apparatus for controlling a transmission comprising a shift control means for controlling a friction transfer means of a plurality of torque transfer means provided between an input shaft and an output shaft of said transmission when shifting from one cogwheel row of a cogwheel type transmission provided with a plurality of cogwheel rows to the other cogwheel row, said shift control means setting a target synchronous rotation speed based on an output rotation speed of said transmission and at least one of parameters indicative of the state of said driving force source or said transmission, and setting an command value to said friction transfer means so that an input rotation speed of said transmission may be synchronized with said target synchronous rotation speed, wherein said shift control means sets a target required shift time based on at least one of parameters indicative of the state of said driving force source or said transmission, and corrects the command value to said friction transfer means so that a required shift time from a shifting start to a shifting end may approach at said target required shift time.

28. A transmission comprising a shift control means for controlling a friction transfer means of a plurality of torque transfer means provided between an input shaft and an output shaft of said transmission when shifting from one cogwheel row of a cogwheel type transmission provided with a plurality of cogwheel rows to the other cogwheel row, said shift control means setting a target synchronous rotation speed based on an output rotation speed of said transmission and at least one of parameters indicative of the state of said driving force source or said transmission, and setting an command value to said friction transfer means so that an input rotation speed of said transmission may be synchronized with said target synchronous rotation speed, wherein said shift control means corrects the command value to said friction transfer means by calculating the correction of the command value to said friction transfer means based on the difference between said target synchronous rotation speed and said input rotation speed.

29. A transmission comprising a shift control means for controlling a friction transfer means of a plurality of torque transfer means provided between an input shaft and an output shaft of said transmission when shifting from one cogwheel row of a cogwheel type transmission provided with a plurality of cogwheel rows to the other cogwheel row, said shift control means setting a feed forward command value to said friction transfer means based on at least one of parameters indicative of the state of said driving force source or said transmission, setting a target synchronous rotation speed based on at least one of parameters indicative of the state of said driving force source or said transmission, setting a feedback command value to said friction transfer means based on the difference between said target synchronous rotation speed and an input rotation speed of the transmission, controlling the input rotation speed of said transmission and an output shaft torque of said transmission under shifting by setting a command value to said friction transfer means based on said feedforward command value and said feedback command value, wherein said shift control means corrects the command value to said friction transfer means by calculating the correction of the command value to said friction transfer means based on the difference between said feedforward command value and the command value to said friction transfer means.

* * * * *